United States Patent
Fevre et al.

(10) Patent No.: US 12,440,980 B1
(45) Date of Patent: Oct. 14, 2025

(54) ROBOTIC MANIPULATION WITH BIMANUAL AND NONPREHENSILE ASPECTS AND RELATED TECHNOLOGY

(71) Applicant: Agility Robotics, Inc., Pittsburgh, PA (US)

(72) Inventors: Martin Fevre, Pittsburgh, PA (US); Tyler Morrison, Pittsburgh, PA (US); Taylor Apgar, Portland, OR (US); Alejandro Perez, Manchester, NH (US)

(73) Assignee: Agility Robotics, Inc., Pittsburgh, PA (US)

( * ) Notice: Subject to any disclaimer, the term of this patent is extended or adjusted under 35 U.S.C. 154(b) by 301 days.

(21) Appl. No.: 18/187,976

(22) Filed: Mar. 22, 2023

Related U.S. Application Data

(60) Provisional application No. 63/487,596, filed on Feb. 28, 2023.

(51) Int. Cl.
| | |
|---|---|
| *B25J 9/00* | (2006.01) |
| *B25J 5/00* | (2006.01) |
| *B25J 9/10* | (2006.01) |
| *B25J 9/16* | (2006.01) |
| *B62D 57/032* | (2006.01) |

(52) U.S. Cl.
CPC .............. *B25J 9/1664* (2013.01); *B25J 5/00* (2013.01); *B25J 9/104* (2013.01); *B25J 9/106* (2013.01); *B62D 57/032* (2013.01)

(58) Field of Classification Search
CPC ... B25J 9/1664; B25J 5/00; B25J 9/104; B25J 9/106; B62D 57/032
See application file for complete search history.

(56) References Cited

U.S. PATENT DOCUMENTS

| | | | |
|---|---|---|---|
| 6,345,851 B1 * | 2/2002 | Friedman | H01L 21/687 294/90 |
| 6,798,120 B1 | 9/2004 | Fearing et al. | |
| 8,996,175 B2 | 3/2015 | Blumberg et al. | |
| 9,333,649 B1 | 5/2016 | Bradski et al. | |
| 10,981,272 B1 | 4/2021 | Nagarajan et al. | |

(Continued)

OTHER PUBLICATIONS

Ford Buys Digit Robot for Commercial Vehicle Deliveries, Agility Robotics, published Jan. 6, 2020. YouTube Link: https://www.youtube.com/watch?v=DmTVJw2P1PQ (Year: 2020).*

(Continued)

*Primary Examiner* — Khoi H Tran
*Assistant Examiner* — Tien Minh Le

(57) ABSTRACT

A method in accordance with at least some embodiments of the present technology includes moving a robot toward a shelf carrying a tote. The method further includes nonprehensilely tilting the tote and nonprehensilely pulling the tote toward a body of the robot. The tilting and pulling occur while the tote is in contact with the shelf and while exerting a first compressive force on the tote via contact between opposing arms of the robot and respective side portions of the tote spaced apart from one another along a width of the tote. Next, the method includes repositioning the arms and prehensilely lifting the tote from the shelf while exerting a second, greater compressive force on the tote via contact between the arms and the respective side portions of the tote. Finally, the method includes carrying the tote away from the shelf via legged locomotion.

20 Claims, 35 Drawing Sheets

(56) References Cited

U.S. PATENT DOCUMENTS

| | | |
|---|---|---|
| 11,034,018 B2 | 6/2021 | Kusano et al. |
| 11,180,353 B2 | 11/2021 | Shah et al. |
| 11,407,107 B2 | 8/2022 | Neville et al. |
| 11,548,152 B2 | 1/2023 | Drumwright et al. |
| 2005/0065654 A1 | 3/2005 | Hariki et al. |
| 2007/0239315 A1 | 10/2007 | Sato et al. |
| 2015/0343634 A1 | 12/2015 | Kiyosawa |
| 2019/0248003 A1 | 8/2019 | Nagarajan et al. |
| 2019/0361672 A1* | 11/2019 | Odhner .................. B25J 9/1679 |
| 2020/0055152 A1 | 2/2020 | Dafte et al. |
| 2020/0055680 A1 | 2/2020 | Dafte et al. |
| 2020/0339350 A1* | 10/2020 | Dooley .................. B65G 65/02 |
| 2021/0237266 A1 | 8/2021 | Kalashnikov et al. |
| 2021/0347060 A1* | 11/2021 | Byl ........................ B25J 11/009 |
| 2021/0370507 A1* | 12/2021 | Corcodel ............... B25J 9/1664 |
| 2022/0258342 A1 | 8/2022 | Gildert et al. |
| 2022/0305678 A1 | 9/2022 | Talebi et al. |
| 2022/0314443 A1 | 10/2022 | Gienger |

OTHER PUBLICATIONS

Made for Work, Agility Robotics 2, published Sep. 1, 2021. YouTube Link: https://www.youtube.com/watch?v=Jycdks836bY (Year: 2021).*
W. H. Huang and G. F. Holden, "Nonprehensile palmar manipulation with a mobile robot," Proceedings 2001 IEEE/RSJ International Conference on Intelligent Robots and Systems. (Cat. No.01CH37180), Maui, HI, USA, 2001, pp. 114-119 vol. 1, doi: 10.1109/IROS.2001.973345. (Year: 2001).*

* cited by examiner

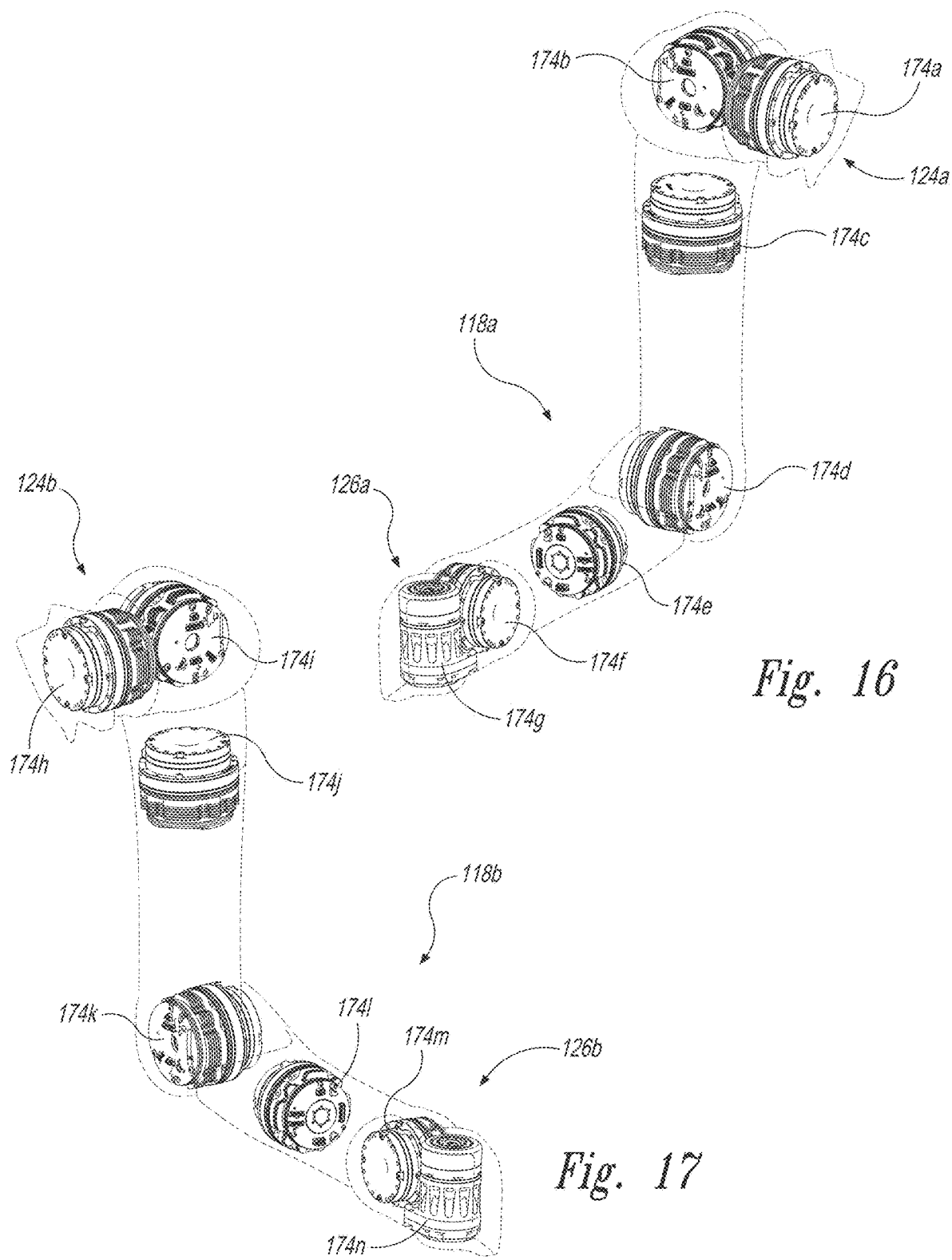

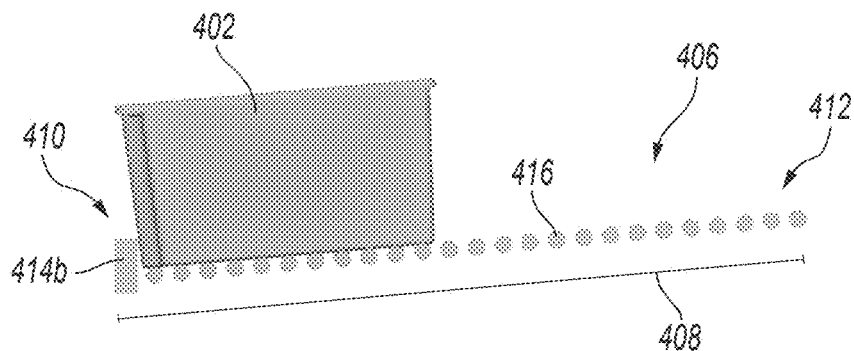
*Fig. 42 (prior art)*
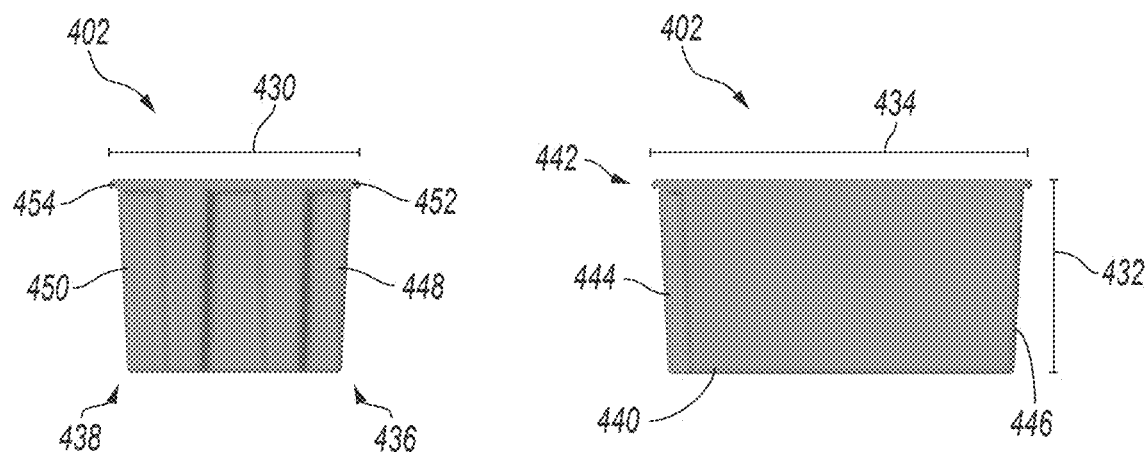
*Fig. 43 (prior art)*   *Fig. 44 (prior art)*

ROBOTIC MANIPULATION WITH BIMANUAL AND NONPREHENSILE ASPECTS AND RELATED TECHNOLOGY

CROSS-REFERENCE TO RELATED APPLICATION

This claims the benefit of U.S. Provisional Application No. 63/487,596, filed Feb. 28, 2023. The foregoing application is incorporated herein by reference in its entirety. To the extent the foregoing applications or any other material incorporated by reference conflicts with the present disclosure, the present disclosure controls.

TECHNICAL FIELD

The present technology relates to robotic manipulation of objects.

BACKGROUND

Many simple tasks that humans currently perform are amenable to automation using robotics. Among such tasks are those involving moving goods between locations within distribution centers. For example, after a trailer containing goods arrives at a distribution center, human workers may move the goods from the trailer onto conveyors that carry the goods to other locations within the distribution center for further processing. Similarly, although conveyors can be used to deliver outgoing goods to loading docks and to palletizing stations at distribution centers, human workers are still needed to move the goods from the conveyors onto outgoing trailers and pallets. As another example, human workers at order-fulfillment distribution centers are often tasked with retrieving specific goods for last-mile delivery. Modern order-fulfillment distribution centers are massive and handle thousands of different goods. Even with the aid of sophisticated route optimization systems, locating and retrieving specific goods to fill orders as needed is labor intensive. Indeed, it is not uncommon for human workers at order-fulfillment distribution centers to walk ten or more miles a day. Despite the apparent simplicity of loading and unloading trailers and pallets and of retrieving specific goods for last-mile delivery, these tasks have conventionally been difficult or impossible to fully automate.

In the forgoing examples and in other cases, the use of human workers to perform repetitive and time-consuming tasks is inefficient. Human effort would be far better applied to more complex tasks, particularly those involving creativity and advanced problem solving. Presently, however, the need for distribution centers is large and rapidly increasing. Some analysts forecast a shortage of a million or more distribution-center workers within the next ten to fifteen years. Due to the importance of this field, even small improvements in efficiency can have major impacts on macroeconomic productivity. For these and/or other reasons, there is a significant and growing need for innovation that supports automating simple tasks that humans currently perform at distribution centers and elsewhere.

BRIEF DESCRIPTION OF THE DRAWINGS

Certain aspects of the present technology can be better understood with reference to the following drawings. The relative dimensions in the drawings may be to scale with respect to some embodiments of the present technology. With respect to other embodiments, the drawings may not be to scale. The drawings may also be enlarged arbitrarily. For clarity, reference-number labels for analogous components or features may be omitted when the appropriate reference-number labels for such analogous components or features are clear in the context of the specification and all of the drawings considered together. Furthermore, the same reference numbers may be used to identify analogous components or features in multiple described embodiments.

FIGS. 16-19 are partially transparent perspective views of the first arm, the second arm, the first leg, and the second leg, respectively, of the robot shown in FIG. 1 illustrating corresponding arm and leg actuators.

FIG. 42 is a side profile view of the object shown in FIG. 41 and selected portions of the support structure shown in FIG. 41.

FIGS. 43 and 44 are, respectively, a front profile view and a side profile view of the object shown in FIG. 41.

DETAILED DESCRIPTION

Figure 1:
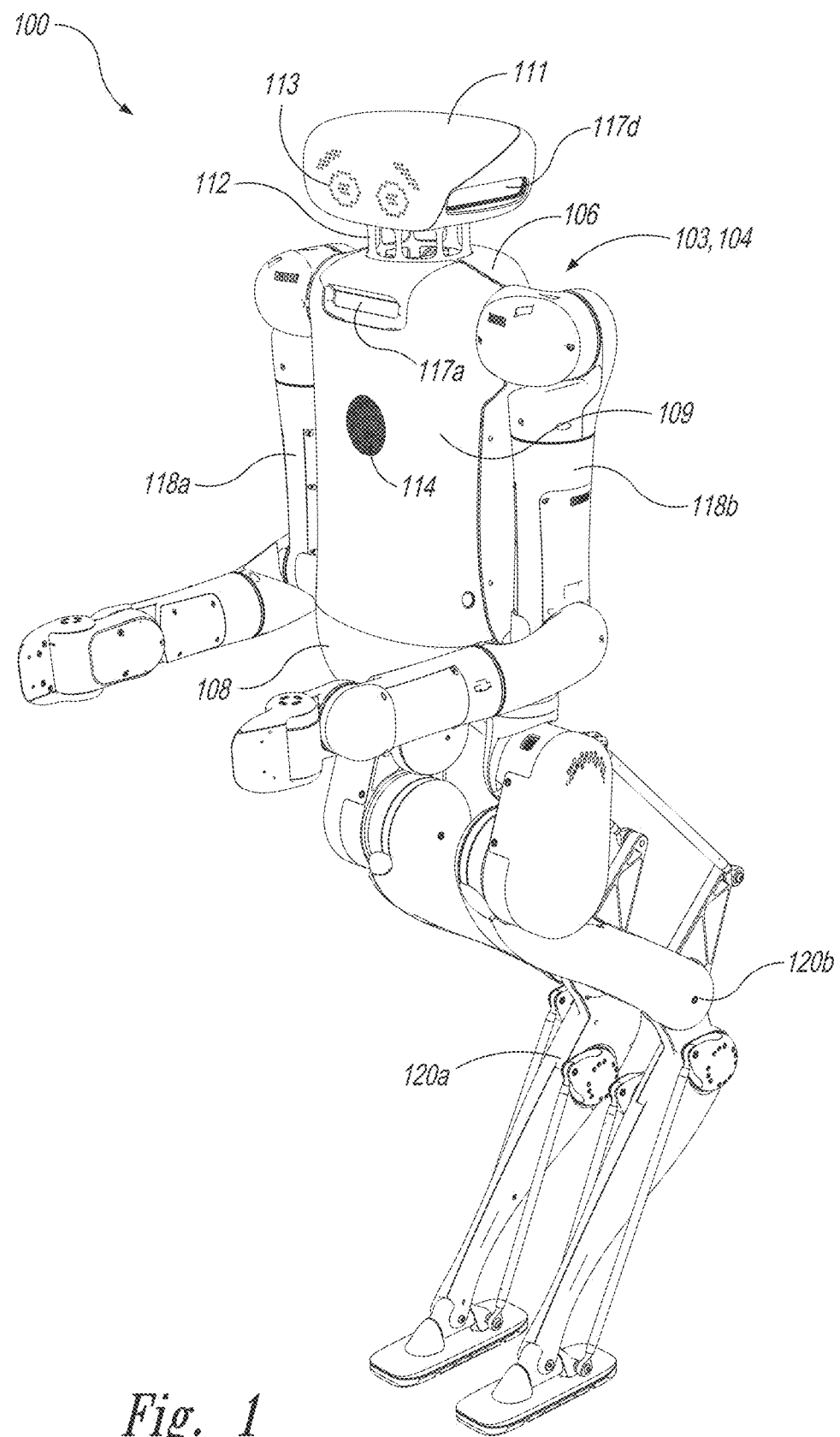
FIGS. 1-3 are, respectively, a first perspective view, a second perspective view, and a front profile view of a robot in accordance with at least some embodiments of the present technology with the robot being in a first state.

Disclosed herein are methods for robotically manipulating objects and related technology. Methods in accordance with at least some embodiments of the present technology include bimanual and nonprehensile aspects. Bimanual aspects can involve manipulating an object via two opposing arms. The arms can exert opposing forces on an object that constrain the object in at least one dimension, that cause the object to tilt, and/or that cause the object to shift, among other examples. Nonprehensile aspects can involve manipulating an object without fully constraining the object's position. For example, one or two arms can be used to move an object while the object remains free to move independently in at least one dimension. Features of the environment and/or of the object itself can influence this independent movement advantageously. Robotic manipulation that combines bimanual and nonprehensile aspects in the same motion primitive or in different motion primitives within the same sequence of motion primitives can be advantageous relative to conventional forms of robotic manipulation. Features and synergies of these aspects of robotic manipulation have heretofore been unrecognized or at least insufficiently developed.

A method in accordance with at least some embodiments of the present technology includes using a robot to reposition an object, to lift the object, and to support the object. These operations can be executed in connection with retrieving an object to be moved from one location to another location or in another context. At least one of the operations can be bimanual in that it involves the cooperative action of opposing arms of the robot. In addition, at least one of the operations can be nonprehensile in that it allows the object to move independently with at least one degree of freedom. The method or another method in accordance with at least some embodiments of the present technology can include exerting a compressive force on the object via the opposing arms while repositioning the object and then exerting a greater compressive force on the object via the opposing arms while lifting the object. Furthermore, the method or another method in accordance with at least some embodiments of the present technology can include repositioning the object via the opposing arms while the object remains in contact with a support and then lifting the object from the support via the opposing arms. Lifting the object in the foregoing and other examples can be prehensile in that it involves fully constraining the object's position. This can result from the forces the robot exerts on the object, the shapes of interfaces between the arms and the object, the positions of these interfaces on the object, and/or other factors. To be prehensile, aspects of manipulations in accordance with at least some embodiments of the present technology need not involve clasping, pinching, or cradling the object, although these types of interaction with the object are not precluded. Also disclosed herein are robots and systems well suited to implementing the foregoing and/or other innovative approaches to object manipulation.

Conventional approaches to robotic manipulation of objects are typically fully prehensile and involve a single robot arm. These approaches, for example, may involve firmly grasping an object with an end effector of a robot arm and then moving joints of the robot arm to move the object. Corresponding control algorithms typically rely on known positions of the robot arm to infer positions of the object during and after the manipulation. In this form of robotic manipulation, the position of an end effector of the robotic arm fully constrains the position of the object. The object is, in effect, part of the end effector during the manipulation for purposes of control. Although relatively simple and reliable, this form of robotic manipulation has significant limitations. As one example, the initial position of a real-world object can make establishing a firm robotic grip difficult or impossible without assistance from suction or magnetism. Accordingly, many conventional robots designed for prehensile object manipulation using a single arm include a vacuum gripper or a magnetic gripper. These grippers are often capable of firmly grasping an object even when only a small portion of the object is accessible. Use of suction or magnetism, however, introduces several new problems. For example, vacuum grippers tend to be poorly suited to gripping objects that have irregularly shaped surfaces. Vacuum grippers also tend to be prone to damaging objects with delicate surfaces. Magnetic grippers, of course, are only compatible with ferromagnetic objects. Magnetic grippers can also have problematic interactions with non-targeted objects. Moreover, both vacuum and magnetic grippers tend to be costly and complex.

A more subtle limitation of conventional approaches to robotic manipulation is that these approaches tend to make little or no use of an object's environment. As a result, these approaches tend to be inefficient or otherwise suboptimal for many manipulation tasks. In contrast, methods for manipulating an object in accordance with at least some embodiments of the present technology make beneficial use of the object's environment. An object's environment can guide the object's movement and/or support the object's weight before the object is lifted, among other examples. By way of demonstration, reaching an object at a first position at a far side of a table, grasping the object, lifting the object, and moving the object across the table in a suspended state to a closer second position is more complex and less efficient than sliding the object along the table from the first position to the second position. As a robot manipulates an object nonprehensilely, the object moves (or is at least capable of moving) with at least one degree of freedom relative to the robot. Features of the environment and/or of the object itself can therefore influence the object's movement. This introduces uncertainty, but also opportunity. For example, features of the environment and/or of the object itself can often be used to guide, support, and/or otherwise facilitate the object's manipulation more simply and reliably than active control.

Figure 70:
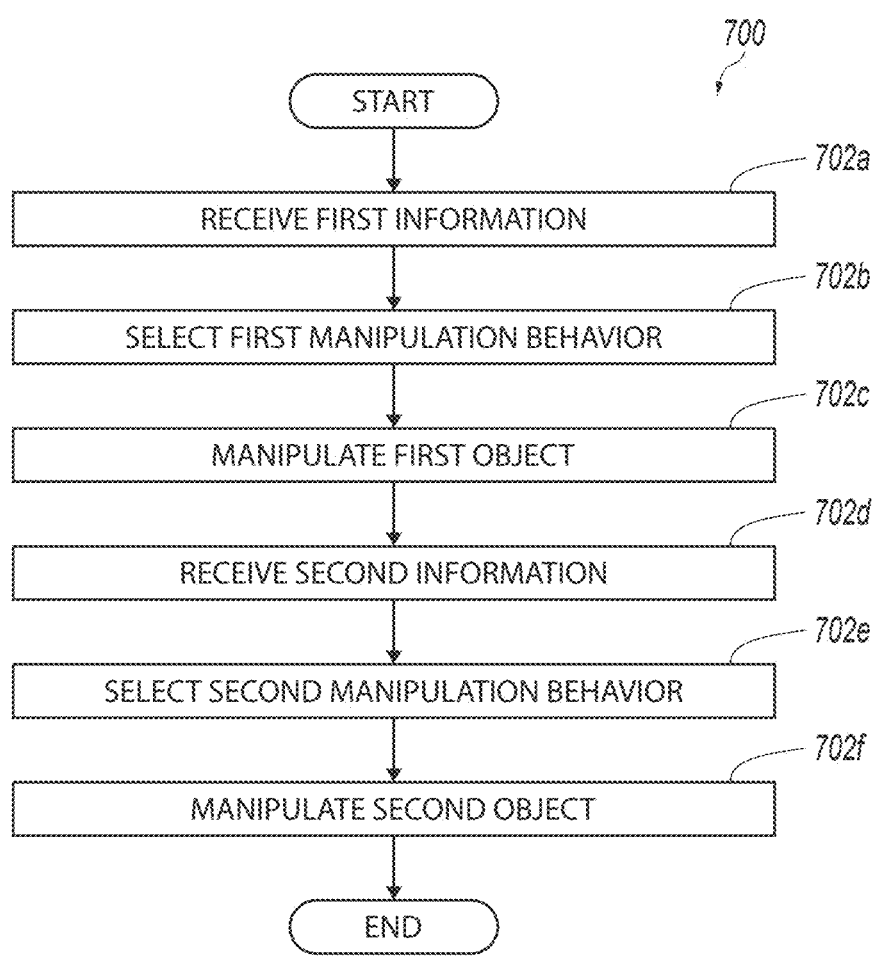
FIG. 70 is a block diagram corresponding to a method in accordance with at least some embodiments of the present technology.

The foregoing and other features of methods and associated devices and systems in accordance with various embodiments of the present technology are further described below with reference to FIGS. 1-70. Although methods, devices, and systems may be described herein primarily or entirely in the context of robotic, bimanual manipulation of boxes and totes, other contexts are within the scope of the present technology. For example, suitable features of described methods, devices, and systems can be implemented in the context of robotically manipulating boxes and totes using only one or more than two robotic arms. As another example, suitable features of described methods, devices, and systems can be implemented in the context of robotically manipulating objects other than boxes and totes, such as crates, non-packaged hard goods, irregularly shaped objects, etc. Furthermore, it should be understood, in general, that other methods, devices, and systems in addition to those disclosed herein are within the scope of the present technology. For example, methods, devices, and systems in accordance with embodiments of the present technology can have different and/or additional configurations, components, procedures, etc. than those disclosed herein. Moreover, methods, devices, and systems in accordance with embodiments of the present technology can be without one or more of the configurations, components, procedures, etc. disclosed herein without deviating from the present technology.

Examples of Robot Systems

Figure 2:
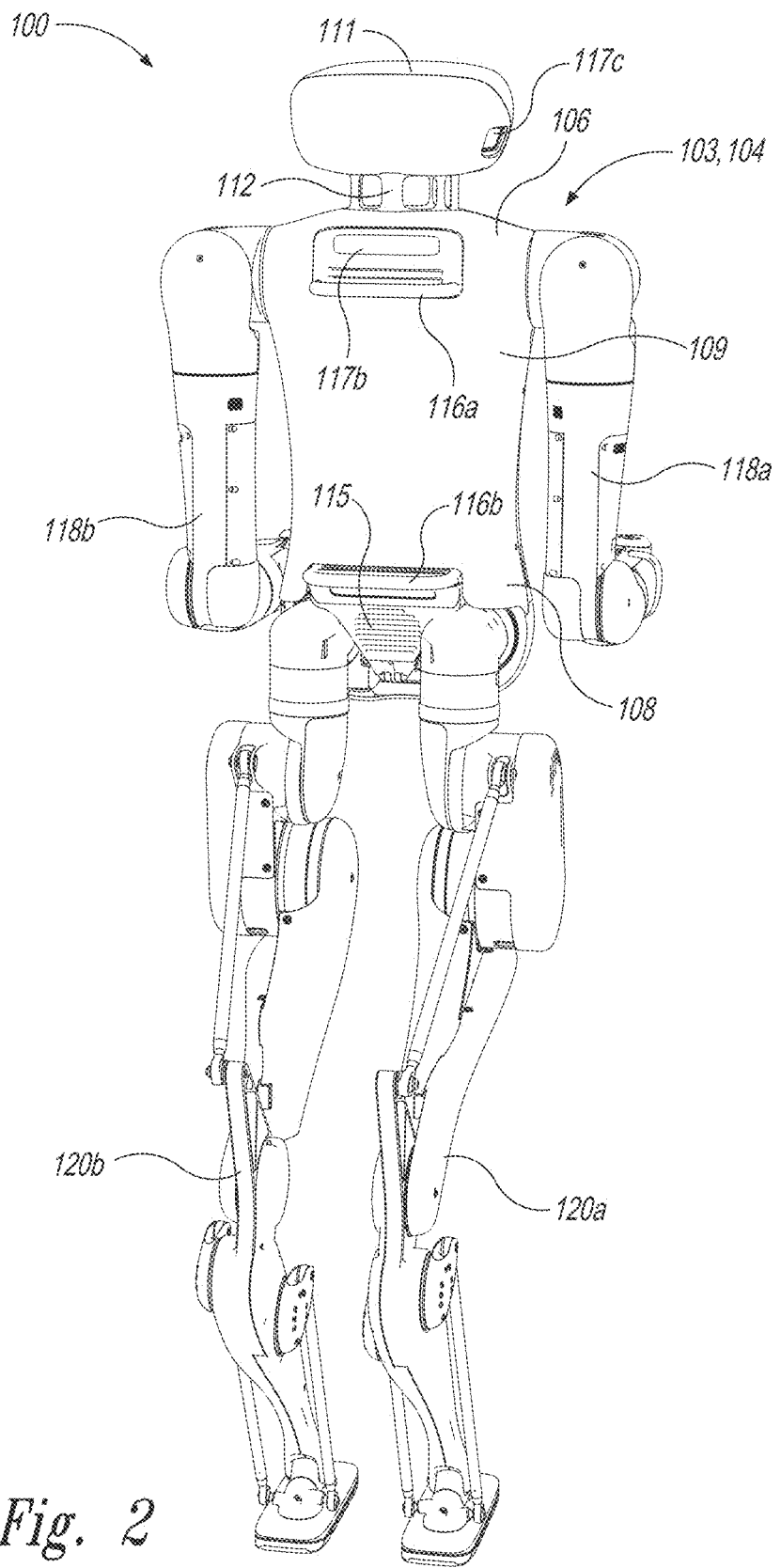
Figure 3:
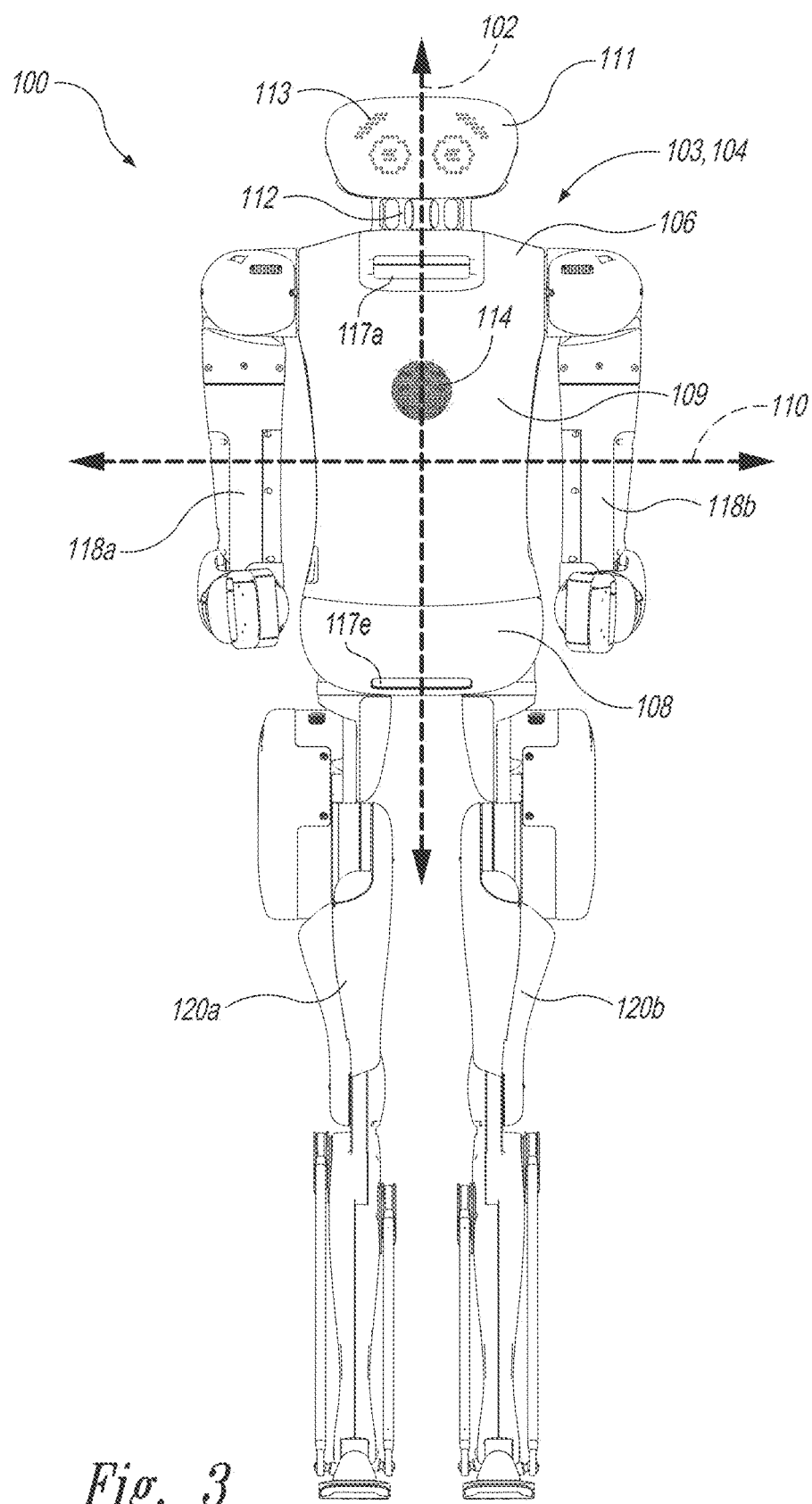
Figure 4:
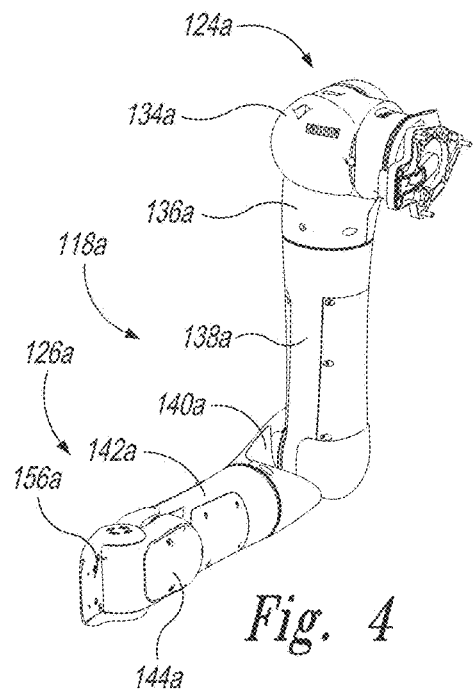
FIGS. 4-7 are perspective views of a first arm, a second arm, a first leg, and a second leg, respectively, of the robot shown in FIG. 1.
Figure 5:
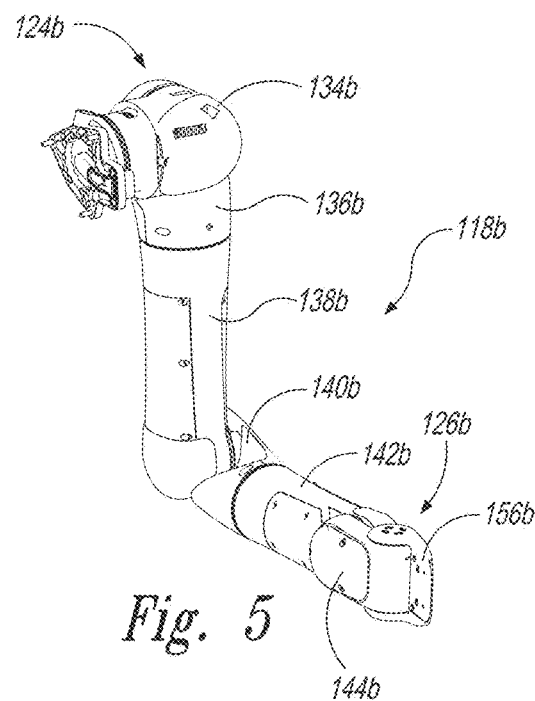
Figure 6:
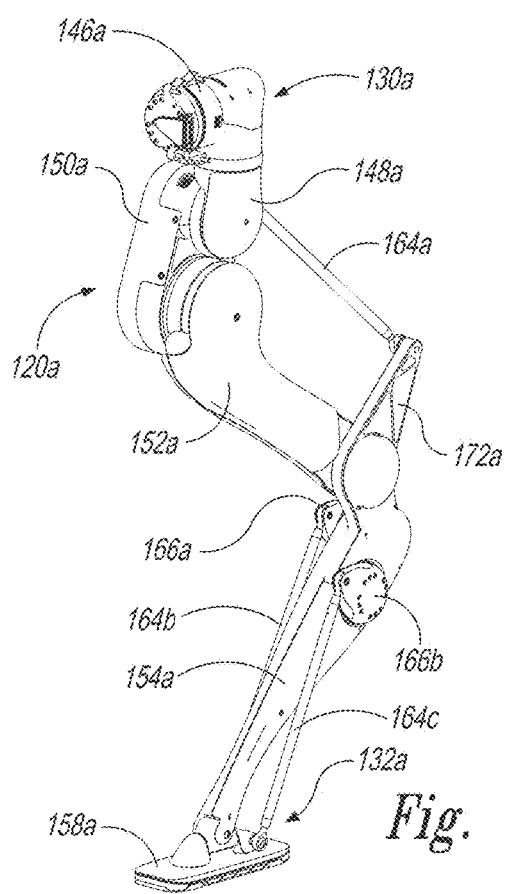
Figure 7:
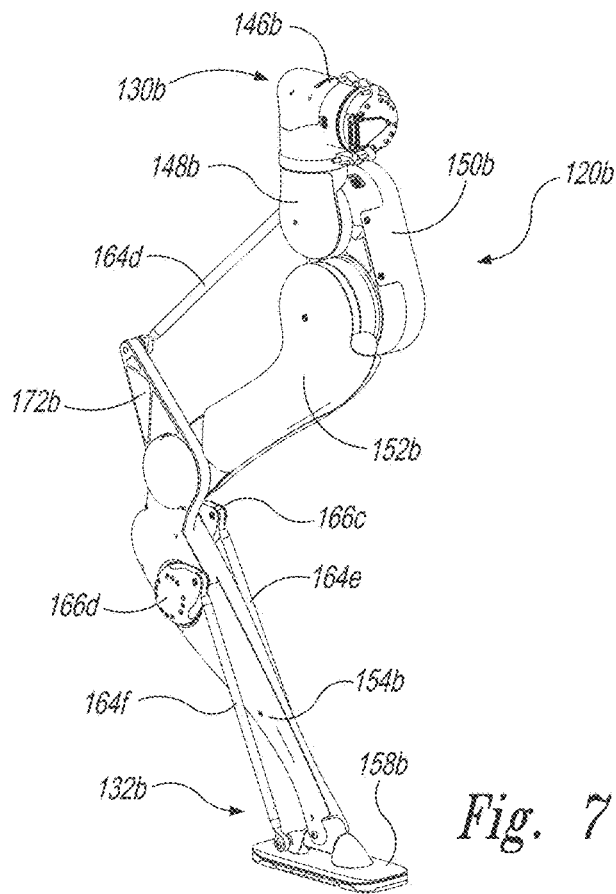

FIGS. 1 and 2 are different perspective views of a robot 100 in accordance with at least some embodiments of the present technology. FIG. 3 is a front profile view of the robot 100. As shown in FIGS. 1-3, the robot 100 can have a humanoid form. The robot 100 can include structures resembling human anatomy with respect to the features, positions, and/or other characteristics of such structures. In at least some cases, the robot 100 defines a midsagittal plane 102 about which the robot 100 is bilaterally symmetrical. In these and other cases, the robot 100 can be configured for bipedal locomotion similar to that of a human. Counterparts of the robot 100 can have other suitable forms and features. For example, a counterpart of the robot 100 can have a non-humanoid form, such as a canine form, an insectoid form, an arachnoid form, or a form with no animal analog. Furthermore a counterpart of the robot 100 can be asymmetrical or have symmetry other than bilateral. Still further, a counterpart of the robot 100 can be configured for non-bipedal locomotion. For example, a counterpart of the robot 100 can be configured for another type of legged locomotion (e.g., quadrupedal locomotion, octopedal locomotion, etc.) and/or non-legged locomotion (e.g., wheeled locomotion, continuous-track locomotion, etc.).

With reference again to FIGS. 1-3, the robot 100 can include a centrally disposed body 103 through which other structures of the robot 100 are interconnected. As all or a portion of the body 103, the robot 100 can include a torso 104 having a superior portion 106, an inferior portion 108, and an intermediate portion 109 therebetween. The robot 100 can define a transverse plane 110 from which the superior and inferior portions 106, 108 of the torso 104 are respectively superiorly and inferiorly spaced apart. The robot 100 can further include a head 111 superiorly spaced apart from the torso 104. The robot 100 can also include a neck 112 through which the head 111 is connected to the torso 104 via the superior portion 106 of the torso 104. The head 111 can have an anteriorly directed display 113 including light-emitting diodes selectively controllable to create a composite, pixelated image evocative of human facial expression. The robot 100 can further include an anteriorly directed audio transmissive window 114 at the intermediate portion 109 of the torso 104, a posteriorly directed exhaust vent 115 at the inferior portion 108 of the torso 104, and handles 116a, 116b extending, respectively, posteriorly from the superior portion 106 of the torso 104 and posteriorly from the inferior portion 108 of the torso 104. The robot 100 can still further include sensor arrays 117 (individually identified as sensor arrays 117a-117e) carried by the torso 104 and the head 111. The sensor arrays 117a, 117b can be at the superior portion 106 of the torso 104 and anteriorly and posteriorly directed, respectively. The sensor arrays 117c, 117d can be at opposite respective sides of the head 111 and can be directed in opposite respective lateral directions. The sensor array 117e can be at the inferior portion 108 of the torso 104 and directed anteriorly and inferiorly toward a ground level in front of the robot 100.

The robot 100 can further include articulated appendages carried by the torso 104. Among these articulated appendages, the robot 100 can include arms 118a, 118b and legs 120a, 120b. In at least some cases, the robot 100 is configured to manipulate objects via the arms 118a, 118b, such as bimanually. In these and other cases, the robot 100 can be configured to ambulate via the legs 120a, 120b, such as bipedally. FIGS. 4-15 show selected features of the arms 118a, 118b and legs 120a, 120b in greater detail. In particular, FIGS. 4-7 are perspective views of the arms 118a, 118b and legs 120a, 120b, respectively. FIGS. 8-11 are silhouette views of the arms 118a, 118b and legs 120a, 120b, respectively. Finally, FIGS. 12-15 are partially schematic diagrams showing kinematic chains corresponding to the arms 118a, 118b and legs 120a, 120b, respectively. In FIGS. 12-15, lines represent links, filled circles represent active joints, and open circles represent inactive joints.

With reference to FIGS. 1-15 together, the arms 118a, 118b can define respective arm lengths 122a, 122b extending from the torso 104. For clarity of illustration, the arm lengths 122a, 122b are only indicated in FIGS. 8 and 9, respectively. The arms 118a, 118b can have respective proximal end portions 124a, 124b and respective distal end portions 126a, 126b at opposite ends of the respective arm lengths 122*a*, 122*b*. The arms 118*a*, 118*b* can be connected to the torso 104 via the respective proximal end portions 124*a*, 124*b* thereof and the superior portion 106 of the torso 104. Similar to the arms 118*a*, 118*b*, the legs 120*a*, 120*b* can define respective leg lengths 128*a*, 128*b* extending from the torso 104. For clarity of illustration, the leg lengths 128*a*, 128*b* are only indicated in FIGS. 10 and 11, respectively. The legs 120*a*, 120*b* can have respective proximal end portions 130*a*, 130*b* and respective distal end portions 132*a*, 132*b* at opposite ends of the respective leg lengths 128*a*, 128*b*. The legs 120*a*, 120*b* can be connected to the torso 104 via the respective proximal end portions 130*a*, 130*b* thereof and the inferior portion 108 of the torso 104.

The arms 118*a*, 118*b* and the legs 120*a*, 120*b* can define kinematic chains. In at least some cases, the kinematic chains corresponding to the arms 118*a*, 118*b* provide at least five degrees of freedom, such as exactly five or exactly six degrees of freedom. In these and other cases, the kinematic chains corresponding to the legs 120*a*, 120*b* can provide at least four degrees of freedom, such as exactly four, exactly five, or exactly six degrees of freedom. The robot 100 can include links at progressively more distal (i.e., lower) levels within the kinematic chains corresponding to the arms 118*a*, 118*b* and the legs 120*a*, 120*b* and at progressively more distal (i.e., farther) positions along the arm lengths 122*a*, 122*b* and the leg lengths 128*a*, 128*b*. As parts of the arms 118*a*, 118*b*, the robot 100 can include proximal shoulder links 134*a*, 134*b*, distal shoulder links 136*a*, 136*b*, upper arm links 138*a*, 138*b*, elbow links 140*a*, 140*b*, lower arm links 142*a*, 142*b*, and wrist links 144*a*, 144*b*. Similarly, as parts of the legs 120*a*, 120*b*, the robot 100 can include proximal hip links 146*a*, 146*b*, distal hip links 148*a*, 148*b*, proximal thigh links 150*a*, 150*b*, distal thigh links 152*a*, 152*b*, and calf links 154*a*, 154*b*.

As further parts of the arms 118*a*, 118*b*, the robot 100 can include end effectors 156*a*, 156*b* opposite to the proximal end portions 124*a*, 124*b* along the arm lengths 122*a*, 122*b* and distal to the wrist links 144*a*, 144*b*. As further parts of the legs 120*a*, 120*b*, the robot 100 can include feet 158*a*, 158*b* opposite to the proximal end portions 130*a*, 130*b* along the leg lengths 128*a*, 128*b* and distal to the calf links 154*a*, 154*b*. The end effectors 156*a*, 156*b* can be at distalmost positions along the arm lengths 122*a*, 122*b*. Similarly, the feet 158*a*, 158*b* can be at distalmost positions along the leg lengths 128*a*, 128*b*. In the illustrated embodiment, the end effectors 156*a*, 156*b* and the feet 158*a*, 158*b* are not articulated. In other embodiments, counterparts of some or all of the end effectors 156*a*, 156*b* and the feet 158*a*, 158*b* can be articulated, such as with one or more movable fingers or toes.

With reference again to FIGS. 1-15, the robot 100 can include arm joints 160 (individually identified as arm joints 160*a*-160*n*) as parts of the arms 118*a*, 118*b*. The arm joints 160*a*-160*n* can be disposed between neighboring links within the kinematic chains corresponding to the arms 118*a*, 118*b* and at opposite ends of these kinematic chains. For clarity of illustration, the arm joints 160 are only indicated in FIGS. 12 and 13. The robot 100 can further include leg joints 162 (individually identified as leg joints 162*a*-162*l*) as parts of the legs 120*a*, 120*b*. Similar to the arm joints 160*a*-160*n*, the leg joints 162*a*-162*l* can be disposed between neighboring links within the kinematic chains corresponding to the legs 120*a*, 120*b* and at opposite ends of these kinematic chains. For clarity of illustration, the leg joints 162 are only indicated in FIGS. 14 and 15. The arm joints 160*a*-160*n* and the leg joints 162*a*-162*l* may be referenced herein in connection with the distally neighboring link along the kinematic chain of the corresponding one of the arms 118*a*, 118*b* and the legs 120*a*, 120*b*. For example, the arm joints 160*f*, 160*m* may be referenced herein as the wrist joints 160*f*, 160*m*.

In FIGS. 1-3, the robot 100 is shown in a first state, which can correspond to a home pose, a neutral pose, etc. well-suited to an object-manipulation task. In the first state, the proximal shoulder links 134*a*, 134*b* can extend laterally from the torso 104. Also, in the first state, the distal shoulder links 136*a*, 136*b* and the upper arm links 138*a*, 138*b* can extend inferiorly from the proximal shoulder links 134*a*, 134*b*. Also, in the first state, the elbow links 140*a*, 140*b*, the lower arm links 142*a*, 142*b*, and the wrist links 144*a*, 144*b* can extend anteriorly from the upper arm links 138*a*, 138*b*. Also, in the first state, the proximal hip links 146*a*, 146*b* can extend posteriorly from the torso 104. Also, in the first state, the distal hip links 148*a*, 148*b* and the proximal thigh links 150*a*, 150*b* can extend inferiorly from the proximal hip links 146*a*, 146*b*. Also, in the first state, the distal thigh links 152*a*, 152*b* can extend inferiorly and posteriorly from the proximal thigh links 150*a*, 150*b*. Finally, in the first state, the calf links 154*a*, 154*b* can extend inferiorly and anteriorly from the distal thigh links 152*a*, 152*b*.

In at least some cases, the calf joints 162*e*, 162*k* and the foot joints 162*f*, 162*l* are passive. As additional parts of the legs 120*a*, 120*b*, the robot 100 can include connection shafts 164 (individually identified as connection shafts 164*a*-164*f*), cranks 166 (individually identified as cranks 166*a*-166*d*), ancillary active joints 168 (individually identified as ancillary active joints 168*a*-168*d*), and ancillary passive joints 170 (individually identified as ancillary passive joints 170*a*-170*l*). The connection shafts 164*a*, 164*d* can extend between the proximal thigh links 150*a*, 150*b* and the calf links 154*a*, 154*b*. When the robot 100 is in the first state, the connection shafts 164*a*, 164*d* can be posteriorly spaced apart from the distal thigh links 152*a*, 152*b* and within 10 degrees of parallel to (e.g., within 5 degrees of parallel to and/or substantially parallel to) corresponding portions of the leg lengths 128*a*, 128*b*. Moving the distal thigh joints 162*d*, 162*j* from their positions when the robot 100 is in the first state can cause the connection shafts 164*a*, 164*d* to move increasingly off parallel from the corresponding portions of the leg lengths 128*a*, 128*b*.

The calf links 154*a*, 154*b* can include projections 172*a*, 172*b* extending posteriorly and superiorly from the calf joints 162*e*, 162*k*. The ancillary passive joints 170*a*, 170*b* can be at opposite ends of the connection shaft 164*a*. Similarly, the ancillary passive joints 170*g*, 170*h* can be at opposite ends of the connection shaft 164*d*. Due to their kinematic arrangement, an actuated position of the distal thigh joint 162*d* can dictate positions of the calf joint 162*e* and of the ancillary passive joints 170*a*, 170*b*. Similarly, due to their kinematic arrangement, an actuated position of the distal thigh joint 162*j* can dictate positions of the calf joint 162*k* and of the ancillary passive joints 170*g*, 170*h*. The calf links 154*a*, 154*b* can carry the cranks 166*a*, 166*c* laterally. The calf links 154*a*, 154*b* can further carry the cranks 166*b*, 166*d* medially. The ancillary active joints 168*a*, 168*b* can be between the cranks 166*a*, 166*b* and the calf link 154*a*. Similarly, the ancillary active joints 168*c*, 168*d* can be between the cranks 166*c*, 166*d* and the calf link 154*b*.

The connection shafts 164*b*, 164*c* can extend between the cranks 166*a*, 166*b* and the foot 158*a* and can be spaced apart laterally and medially, respectively, from the calf link 154*a*. Similarly, the connection shafts 164*e*, 164*f* can extend between the cranks 166*c*, 166*d* and the foot 158*b* and can be spaced apart laterally and medially, respectively, from the calf link 154b. The ancillary passive joints 170c, 170e can be at opposite ends of the connection shaft 164b. The ancillary passive joints 170d, 170f can be at opposite ends of the connection shaft 164c. The ancillary passive joints 170i, 170k can be at opposite ends of the connection shaft 164e. Finally, the ancillary passive joints 170j, 170l can be at opposite ends of the connection shaft 164f. The ancillary active joints 168a, 168b can be configured to operate in concert to move the foot 158a relative to the calf link 154a. Due to their kinematic arrangement, actuated positions of the ancillary active joints 168a, 168b can dictate positions of the foot joint 162f and of the ancillary passive joints 170c-170f. Similarly, the ancillary active joints 168c, 168d can be configured to operate in concert to move the foot 158b relative to the calf link 154b. Due to their kinematic arrangement, actuated positions of the ancillary active joints 168c, 168d can dictate positions of the foot joint 162l and of the ancillary passive joints 170i-170l.

The relative orientations of the arm joints 160a-160l, the relative positions of the arm joints 160a-160l, the dimensions of the links within the kinematic chains corresponding to the arms 118a, 118b, the shapes of these links, and/or other features of the arms 118a, 118b can provide advantages over conventional alternatives. Examples of these advantages include enhanced maneuverability, enhanced range of motion, enhanced economy of motion, reduced occurrence of kinematic singularities during certain operations (e.g., object lifting, object carrying, etc.), closer emulation of human arm kinematics, and closer emulation of human arm conformation, among others. Furthermore, the relative orientations of the leg joints 162a-162l, the relative positions of the leg joints 162a-162l, the dimensions of the links within the kinematic chains corresponding to the legs 120a, 120b, the shapes of these links, and/or other features of the legs 120a, 120b can provide advantages over conventional alternatives. Examples of these advantages include enhanced maneuverability, enhanced range of motion, enhanced economy of motion, reduced occurrence of kinematic singularities during certain operations (e.g., walking, running, etc.), closer emulation of human leg kinematics, and closer emulation of human leg conformation, among others.

FIGS. 16 and 17 are partially transparent perspective views of the arms 118a, 118b, respectively. As shown in FIGS. 16 and 17, the robot 100 can include arm actuators 174 (individually identified as arm actuators 174a-174n) as parts of the arms 118a, 118b. The arm actuators 174a-174n can be embedded within, mounted to, or otherwise carried by the links within the kinematic chains corresponding to the arms 118a, 118b. In the illustrated embodiment, the arm actuators 174a-174n are incorporated into the arms 118a, 118b in the following manner. The arm actuators 174a, 174h are embedded within portions of the proximal shoulder links 134a, 134b at the proximal shoulder joints 160a, 160h. The arm actuators 174b, 174i are embedded within portions of the proximal shoulder links 134a, 134b at the distal shoulder joints 160b, 160i. The arm actuators 174c, 174j are embedded within portions of the upper arm links 138a, 138b at the upper arm joints 160c, 160j. The arm actuators 174d, 174k are embedded within portions of the upper arm links 138a, 138b at the elbow joints 160d, 160k. The arm actuators 174e, 174l are embedded within portions of the lower arm links 142a, 142b at the lower arm joints 160e, 160l. The arm actuators 174f, 174m are embedded within portions of the lower arm links 142a, 142b at the wrist joints 160f, 160m. Finally, the arm actuators 174g, 174n are embedded within portions of the wrist links 144a, 144b at the end effector joints 160g, 160n.

Figure 18:
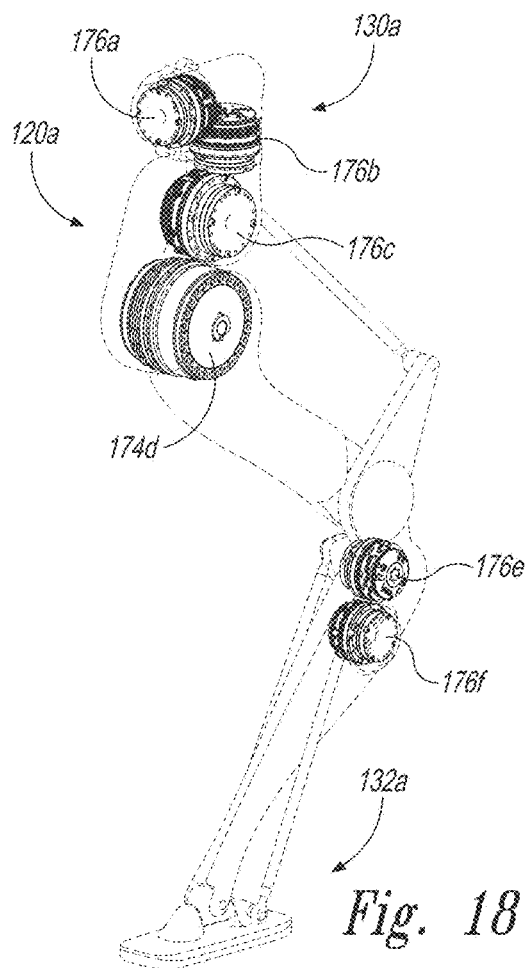
Figure 19:
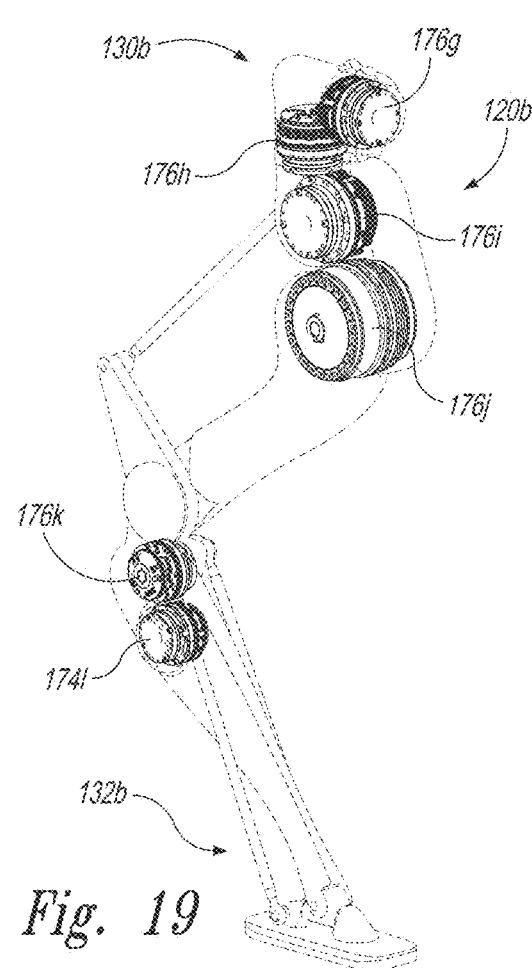
Figure 20:
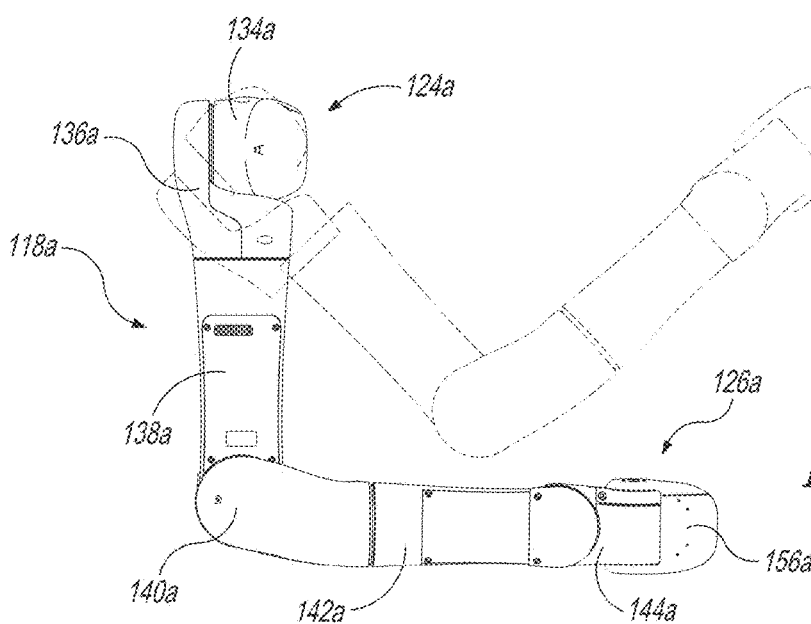
FIG. 20 is a side profile view of the first arm of the robot shown in FIG. 1 indicating isolated motion about an arm joint of the robot.
Figure 21:
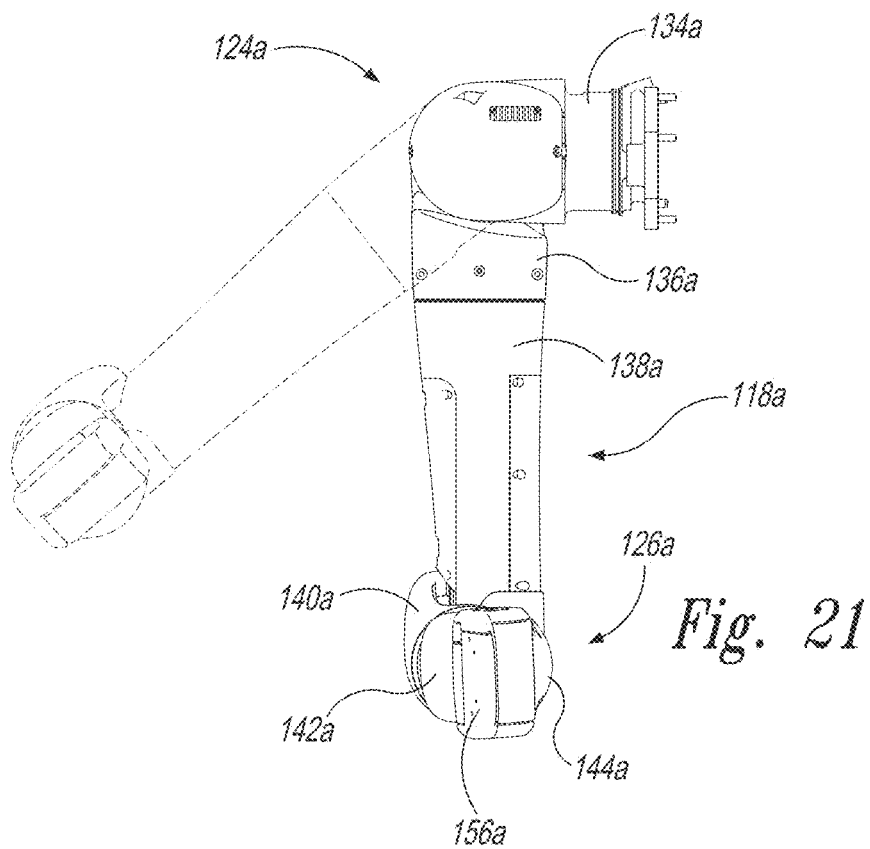
FIG. 21 is a front profile view of the first arm of the robot shown in FIG. 1 indicating isolated motion about an arm joint of the robot distal to the arm joint of FIG. 20 along the kinematic chain of FIG. 12.
Figure 22:
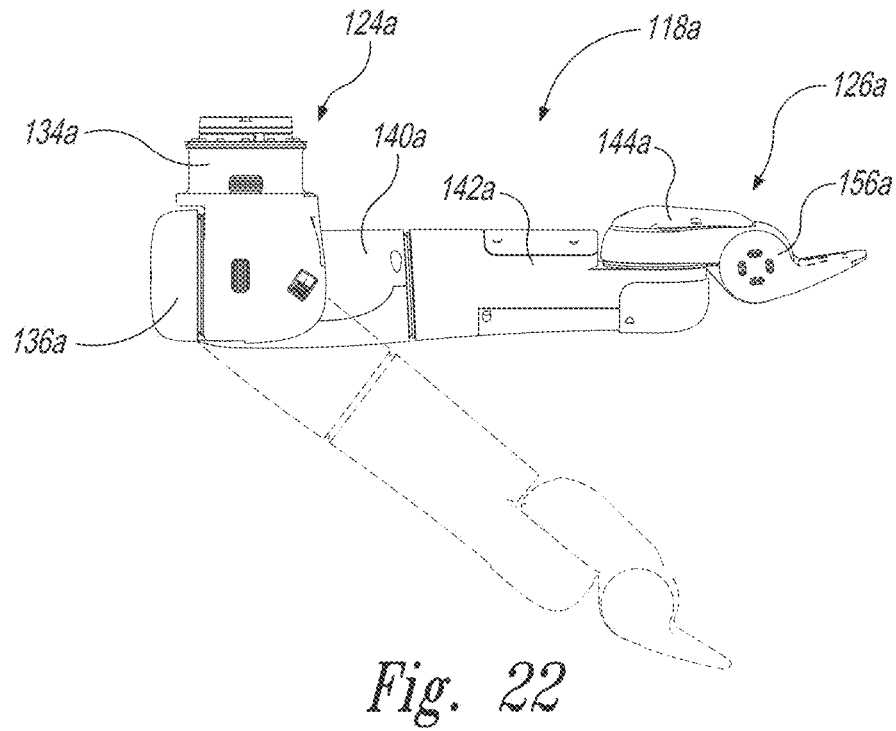
FIG. 22 is a top plan view of the first arm of the robot shown in FIG. 1 indicating isolated motion about an arm joint of the robot distal to the arm joint of FIG. 21 along the kinematic chain of FIG. 12.
Figure 23:
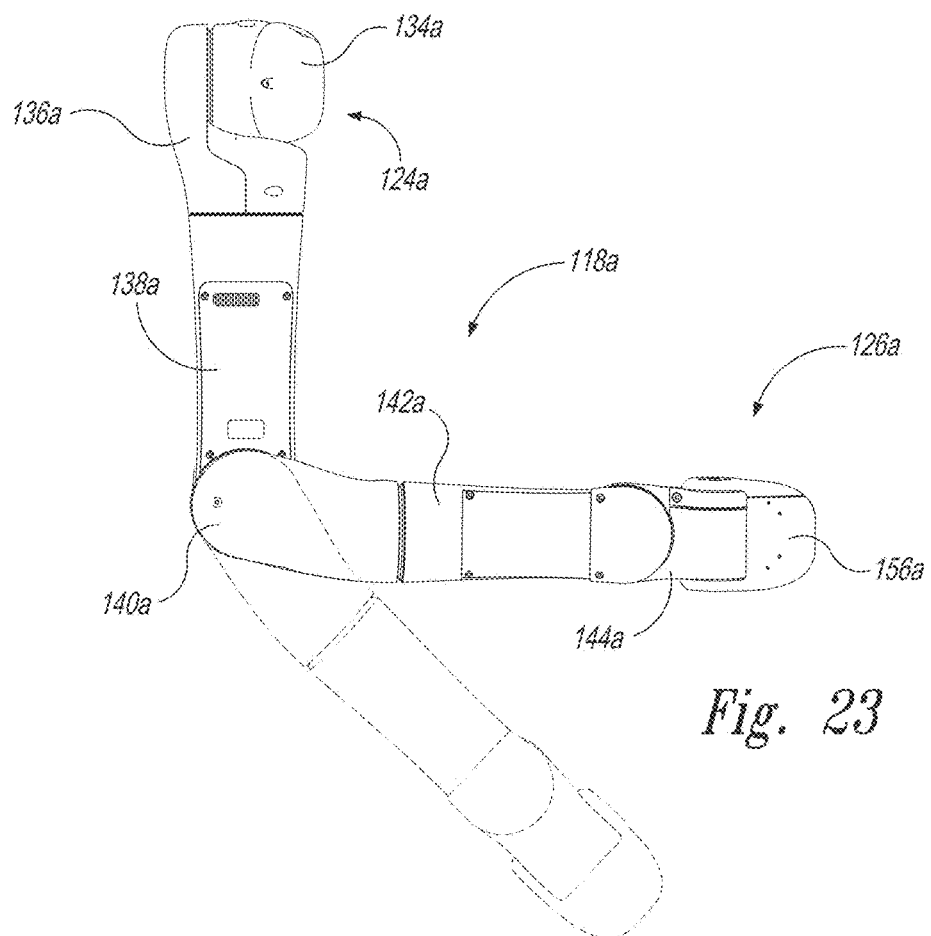
FIG. 23 is a side profile view of the first arm of the robot shown in FIG. 1 indicating isolated motion about an arm joint of the robot distal to the arm joint of FIG. 22 along the kinematic chain of FIG. 12.

FIGS. 18 and 19 are partially transparent perspective views of the legs 120a, 120b, respectively. As shown in FIGS. 18 and 19, the robot 100 can include leg actuators 176 (individually identified as leg actuators 176a-176l) as parts of the legs 120a, 120b. The leg actuators 176a-176l can be embedded within, mounted to, or otherwise carried by the links within the kinematic chains corresponding to the legs 120a, 120b. In the illustrated embodiment, the leg actuators 176a-176l are incorporated into the legs 120a, 120b in the following manner. The leg actuators 176a, 176g are embedded within portions of the proximal hip links 146a, 146b at the proximal hip joints 162a, 162g. The leg actuators 176b, 176h are embedded within portions of the proximal hip links 146a, 146b at the distal hip joints 162b, 162h. The leg actuators 176c, 176i are embedded within portions of the proximal thigh links 150a, 150b at the proximal thigh joints 162c, 162i. The leg actuators 176d, 176j are embedded within portions of the proximal thigh links 150a, 150b at the distal thigh joints 162d, 162j. The leg actuators 176e, 176k are embedded within portions of the calf links 154a, 154b spaced apart from the foot joints 162f, 162l along the corresponding leg lengths 128a, 128b and are operably connected to the foot joints 162f, 162l via the cranks 166a, 166c and the connection shafts 164a, 164c. Finally, the leg actuators 176f, 176l are embedded within portions of the calf links 154a, 154b spaced apart from the foot joints 162f, 162l and distal to the leg actuators 176e, 176k along the corresponding leg lengths 128a, 128b and are operably connected to the foot joints 162f, 162l via the cranks 166b, 166d and the connection shafts 164b, 164d.

In at least some cases, the arm actuators 174a-174n and the leg actuators 176a-176l are rotary actuators including electric servo motors and corresponding strain wave gear units. This combination can be characterized by relatively high torque density, compact size, high efficiency, and low backlash, among other potentially advantageous features. In other cases, counterparts of some or all of the arm actuators 174 and the leg actuators 176 can be pneumatic or hydraulic rather than electric, be linear rather than rotary, be stepper-type rather than servo-type, be direct drive rather than geared, and/or have gearing other than strain wave (e.g., cycloidal, spur, helical, miter, worm, rack, bevel, screw, etc.).

Figure 24:
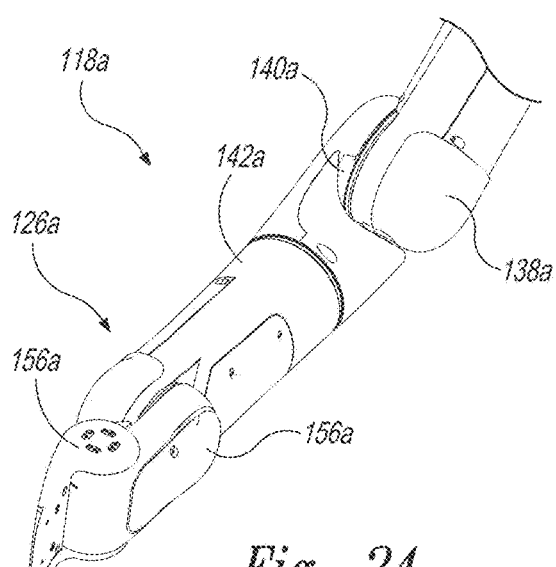
FIGS. 24 and 25 are perspective views of a distal portion of the first arm of the robot shown in FIG. 1 indicating isolated motion about an arm joint of the robot distal to the arm joint of FIG. 23 along the kinematic chain of FIG. 12.
Figure 25:
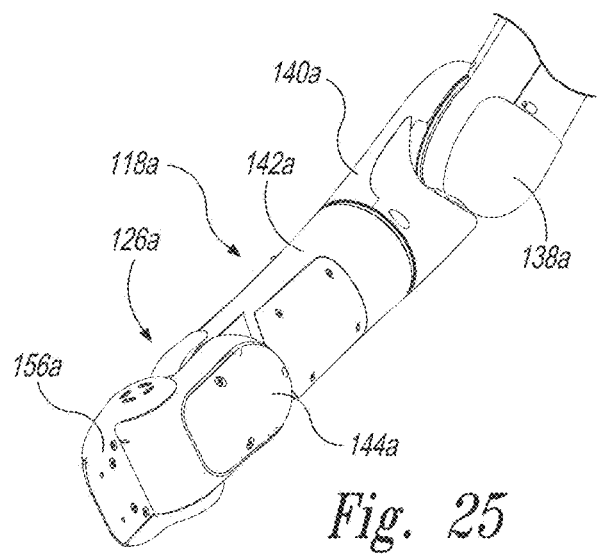
Figure 26:
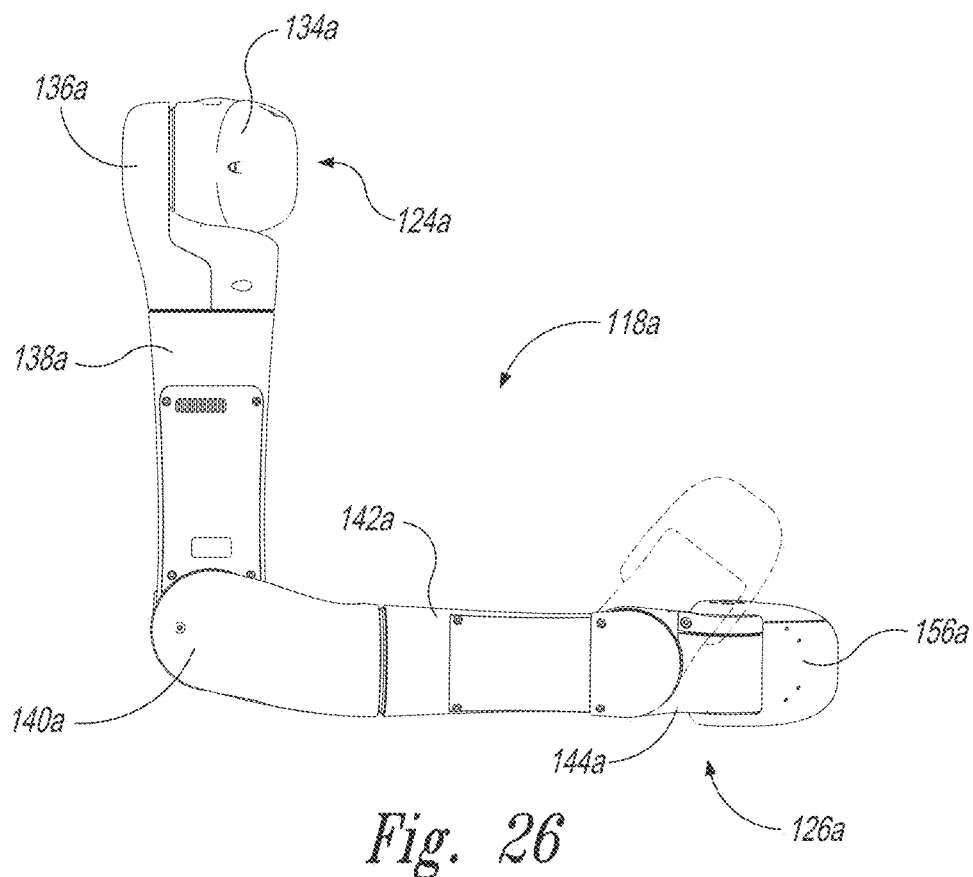
FIG. 26 is a side profile view of the first arm of the robot shown in FIG. 1 indicating isolated motion about an arm joint of the robot distal to the arm joint of FIGS. 24 and 25 along the kinematic chain of FIG. 12.
Figure 27:
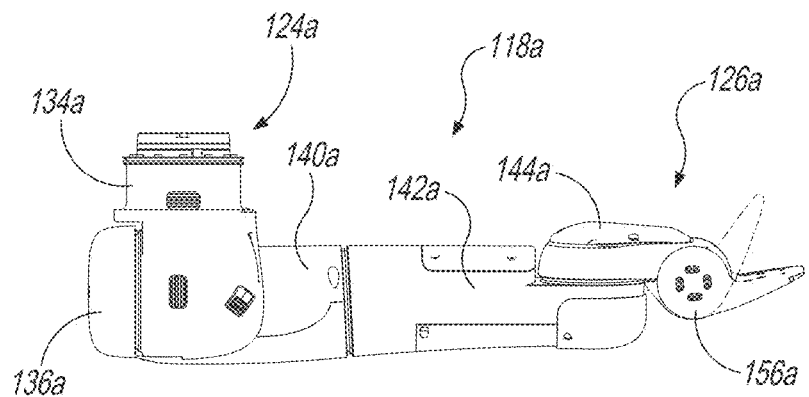
FIG. 27 is a top plan view of the first arm of the robot shown in FIG. 1 indicating isolated motion about an arm joint of the robot distal to the arm joint of FIG. 26 along the kinematic chain of FIG. 12.

FIGS. 20-23 are various views of the arm 118a indicating isolated motion about the proximal shoulder joint 160a, the distal shoulder joint 160b, the upper arm joint 160c, and the elbow joint 160d, respectively. FIGS. 24 and 25 are perspective views of a distal portion of the arm 118a indicating isolated motion about the lower arm joint 160e. FIGS. 26 and 27 are a side profile view and a top plan view, respectively, of the arm 118a indicating isolated motion about the wrist joint 160f and the end effector joint 160g, respectively. Motion about the arm joints 160h-160n of the arm 118b can correspond symmetrically about the midsagittal plane 102 (FIG. 3) to the motion about the arm joints 160a-160g of the arm 118a shown in FIGS. 20-27. In at least some cases, the proximal shoulder joints 160a, 160h, the upper arm joints 160c, 160j, and the lower arm joints 160e, 160l are configured to rotate about respective axes parallel to the corresponding arm lengths 122a, 122b. In these and other cases, the distal shoulder joints 160b, 160i, the elbow joints 160d, 160k, the wrist joints 160f, 160m, and the end effector joints 160g, 160n can be configured to rotate about respective axes off-parallel to (e.g., within 10 degrees of perpendicular to, within 5 degrees of perpendicular to and/or substantially perpendicular to) the corresponding arm lengths 122a, 122b.

Figure 28:
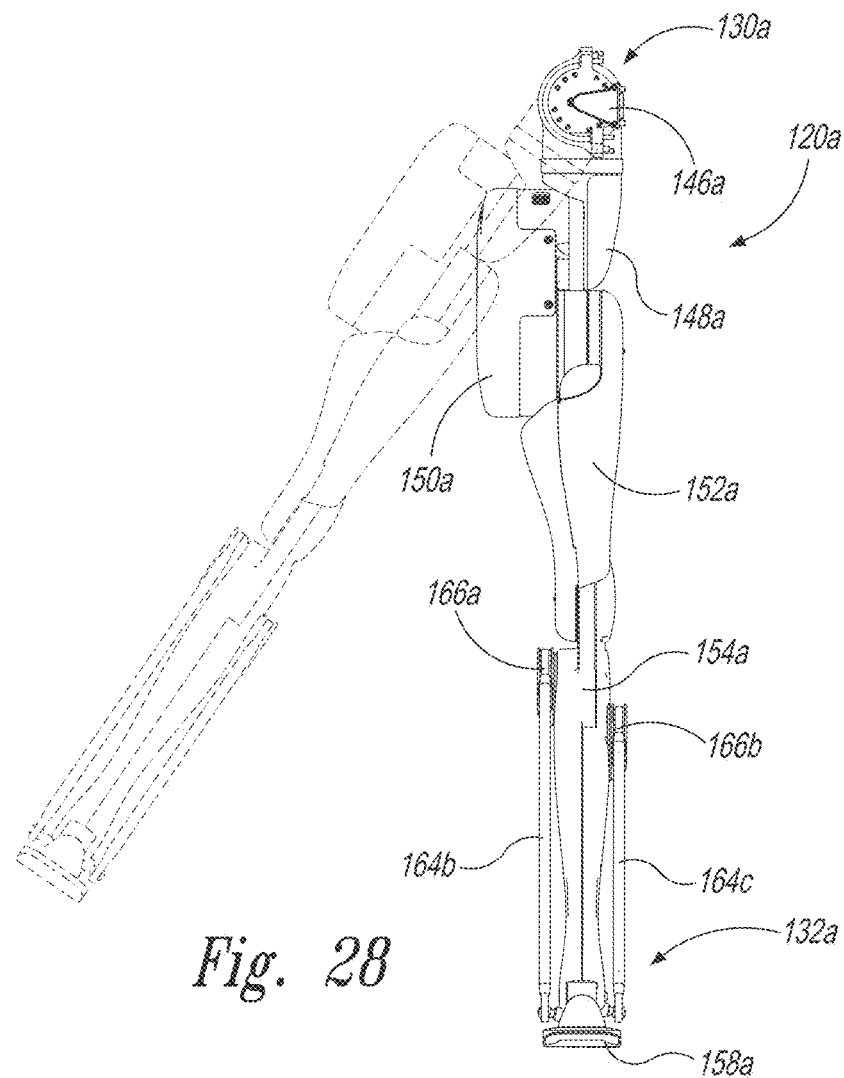
FIG. 28 is a front profile view of the first leg of the robot shown in FIG. 1 indicating isolated motion about a leg joint of the robot along the kinematic chain of FIG. 14.
Figure 29:
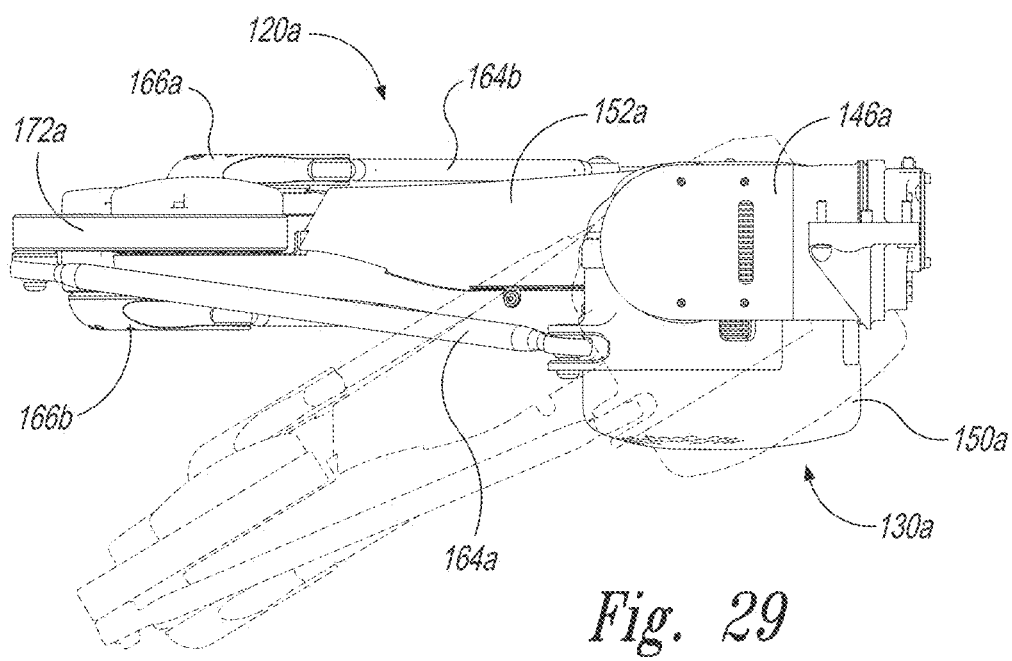
FIG. 29 is a top plan view of the first leg of the robot shown in FIG. 1 indicating isolated motion about a leg joint of the robot distal to the leg joint of FIG. 28 along the kinematic chain of FIG. 14.
Figure 30:
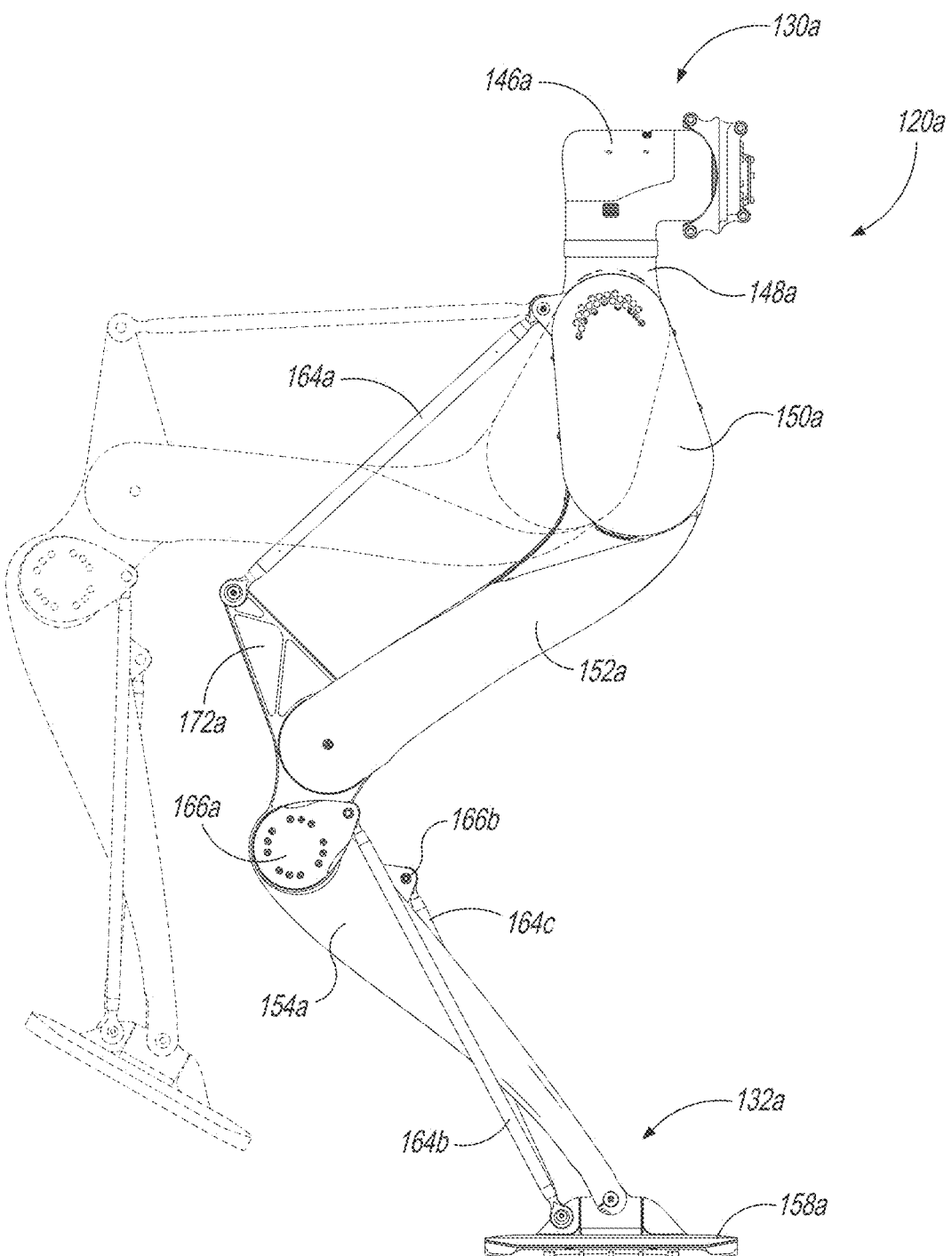
FIG. 30 is a side profile view of the first leg of the robot shown in FIG. 1 indicating isolated motion about a leg joint of the robot distal to the leg joint of FIG. 29 along the kinematic chain of FIG. 14.
Figure 31:
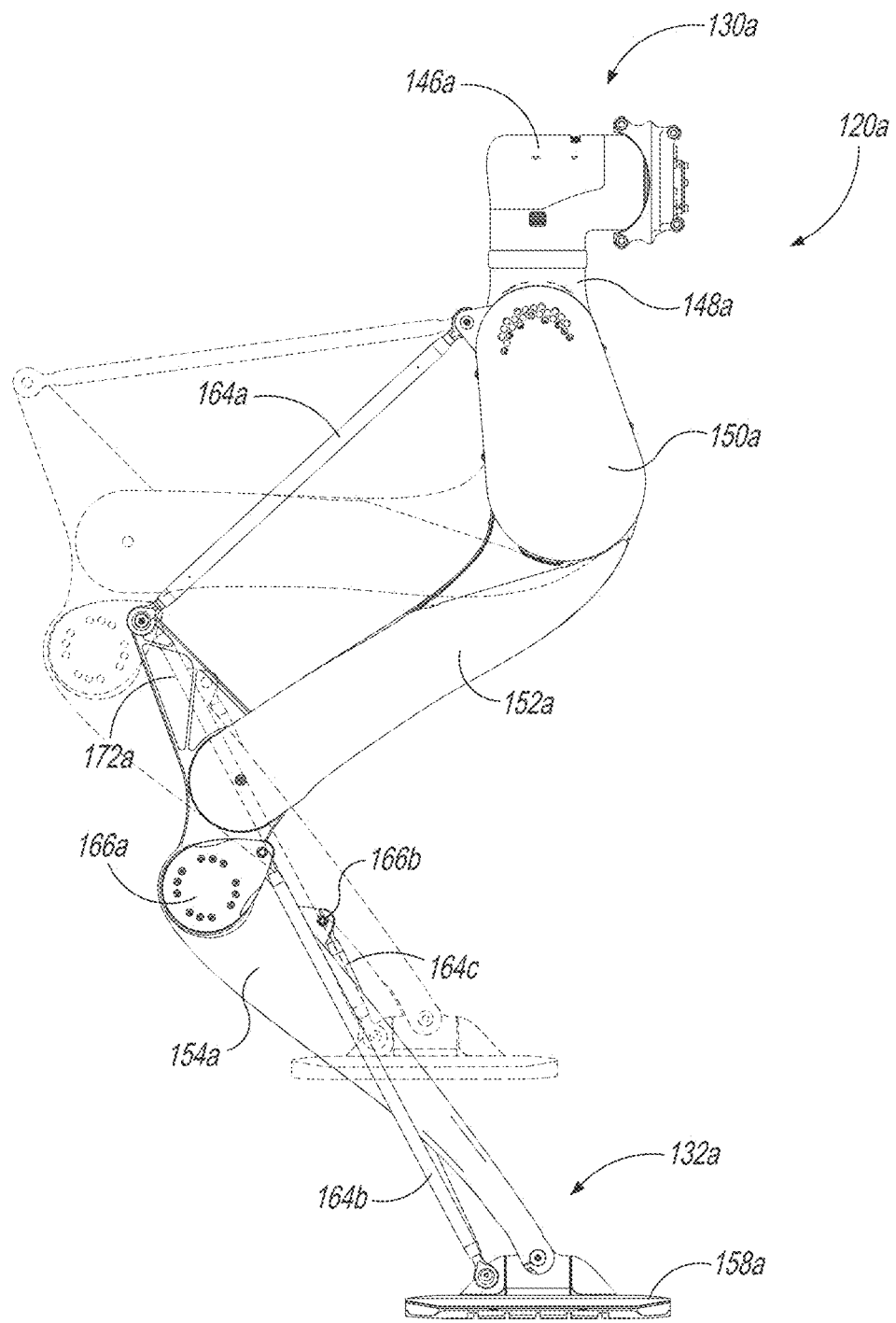
FIG. 31 is a side profile view of the first leg of the robot shown in FIG. 1 indicating isolated motion about two leg joints of the robot distal to the leg joint of FIG. 30 along the kinematic chain of FIG. 14.
Figure 32:
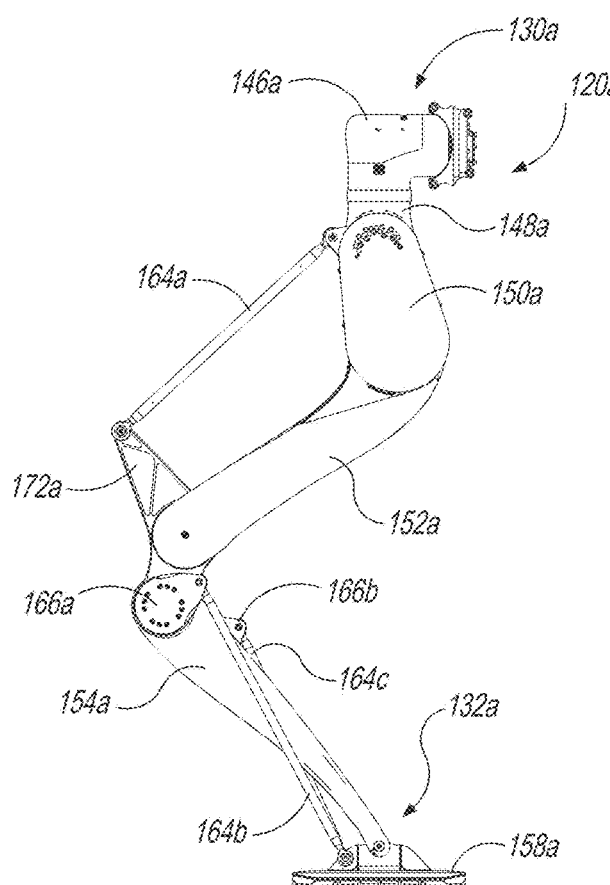
FIGS. 32 and 33 are side profile views of the first leg of the robot shown in FIG. 1 indicating isolated motion about a leg joint of the robot distal to the leg joints of FIG. 31 along the kinematic chain of FIG. 14.
Figure 33:
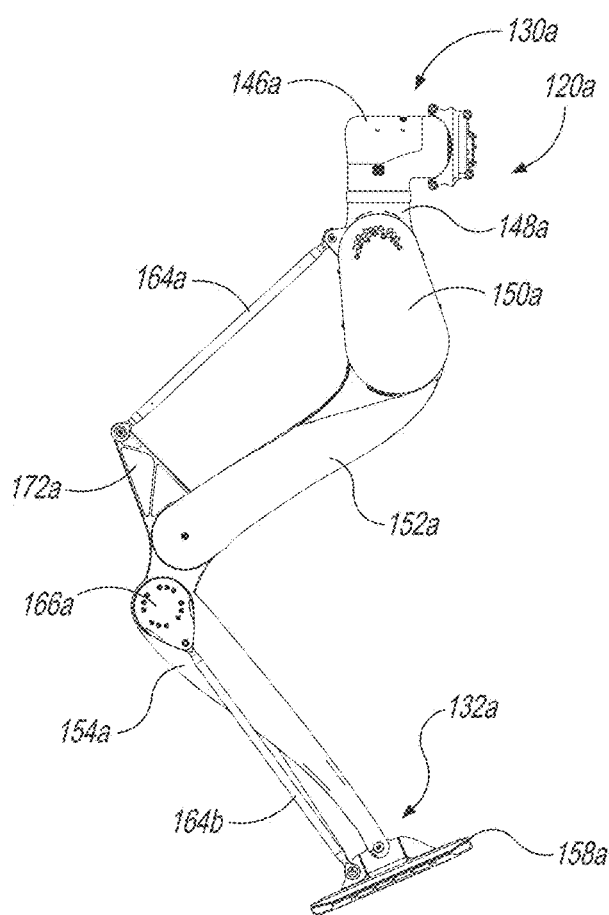

FIGS. 28-30 are various views of the leg 120a indicating isolated motion about the proximal hip joint 162a, the distal hip joint 162b, and the proximal thigh joint 162c, respectively. FIG. 31 is a side profile view of the leg 120a indicating isolated motion about both the distal thigh joint 162d and the calf joint 162e. FIGS. 32 and 33 are side profile views of the leg 120a indicating isolated motion about the foot joint 162f. Motion about the leg joints 162g-162l of the leg 120b can correspond symmetrically about the midsagittal plane 102 (FIG. 3) to the motion about the leg joints 162a-160f of the leg 120a shown in FIGS. 28-33. In at least some cases, the proximal hip joints 162a, 162g and the distal hip joints 162b, 162h are configured to rotate about respective axes parallel to the corresponding leg lengths 128a, 128b. In these and other cases, proximal thigh joints 162c, 162i, the distal thigh joints 162d, 162j, the calf joints 162e, 162k, and the foot joints 162f, 162l can be configured to rotate about respective axes off-parallel to (e.g., within 10 degrees of perpendicular to, within 5 degrees of perpendicular to and/or substantially perpendicular to) the corresponding leg lengths 128a, 128b.

Examples of Electrical and Computer Systems

Figure 34:
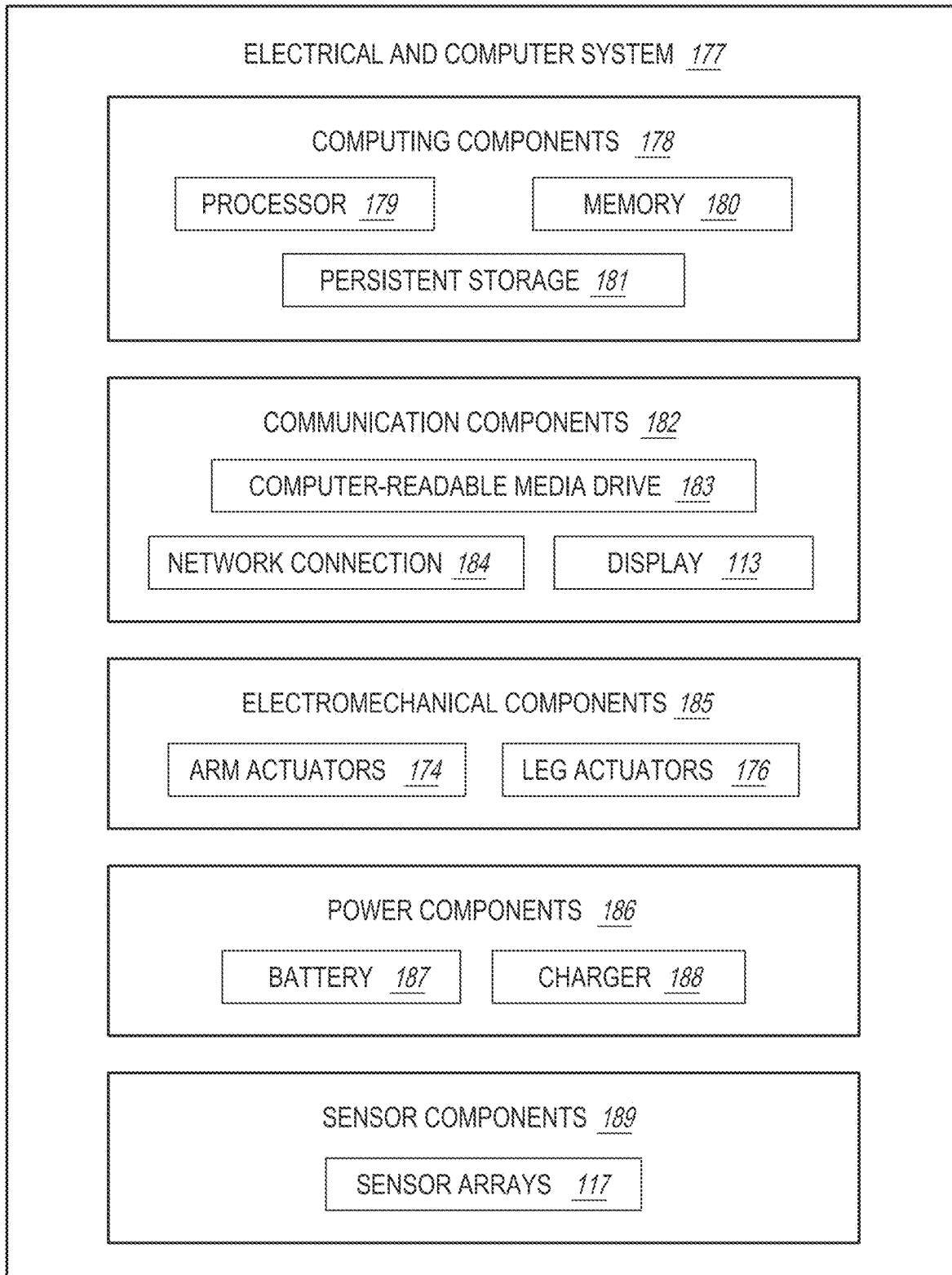
FIG. 34 is a block diagram illustrating an electrical and computer system of the robot shown in FIG. 1.

FIG. 34 is a block diagram illustrating an electrical and computer system 177 of the robot 100. When suitable, operations described elsewhere in this disclosure (e.g., movements of the robot 100) can be implemented via this electrical and computer system 177 autonomously and/or in response to instructions from a user. As shown in FIG. 34, the electrical and computer system 177 can include computing components 178. The computing components 178 can include a processor 179, such as one or more general-purpose and/or special-purpose integrated circuits including digital logic gates for executing programs and/or for otherwise processing data. The computing components 178 can further include memory 180, such as one or more integrated circuits for storing data in use. The memory 180 can include a multithreaded program, an operating system including a kernel, device drivers, etc. The computing components 178 can further include persistent storage 181, such as a hard drive for persistently storing data. Examples of data that can be stored by the persistent storage 181 include diagnostic data, sensor data, configuration data, environmental data, and current-state data. The computing components 178 can collectively define a computer configured to manage, control, receive information from, deliver information to, and/or otherwise usefully interact with other components of the electrical and computer system 177.

The electrical and computer system 177 can further include communication components 182. The communication components 182 can include a computer-readable media drive 183 for reading computer programs and/or other data stored on computer-readable media. As one example, the computer-readable media drive 183 can be a flash-memory drive. The communication components 182 can further include a network connection 184 for connecting the robot 100 to other devices and systems, such as other robots and/or other computer systems. The network connection 184 can be wired and/or wireless and can be via the Internet, a Local Area Network (LAN), a Wide Area Network (WAN), BLUETOOTH, WiFi, a cell phone network, etc. The network connection 184 can include networking hardware, such as routers, switches, transmitters, receivers, computer-readable transmission media, etc. The communication components 182 can further include the display 113 discussed above and/or other suitable components for communicating with a user. The robot 100 can use the communication components 182 for internal operations and/or to interact with devices and/or systems external to the robot 100, such as systems for providing contextual information about the environment in which the robot 100 operates and/or systems for changing operating conditions of the robot 100.

The electrical and computer system 177 can further include electromechanical components 185. The electromechanical components 185 can include the arm actuators 174 and the leg actuators 176 discussed above and/or other suitable components for implementing mechanical action within the robot 100. The electrical and computer system 177 can further include power components 186. The power components 186 can include a battery 187 and a charger 188. The battery 187 can be a lithium-ion battery, a lead-acid battery, or another suitable type. The charger 188 can include a connector (not shown) compatible with a power source (e.g., a wall outlet) and leads (also not shown) extending between the connector and the battery 187. In at least some cases, the robot 100 is configured to operate wirelessly via the battery 187 and to recharge occasionally via the charger 188.

Finally, the electrical and computer system 177 can include sensor components 189 for capturing, providing, and/or analyzing information about the robot 100 itself and/or the environment in which the robot 100 is operating. The sensor components 189 can include the sensor arrays 117 discussed above. At the sensor arrays 117 and/or at one or more other suitable locations, the robot 100 can include among the sensor components 189 a light sensor (e.g., a photoresistor), a sound sensor (e.g., a microphone), a location sensor (e.g., using the Global Positioning System), a distance sensor, and/or a proximity sensor, among other examples. Within the body 103 and/or at one or more other suitable locations, the robot 100 can include among the sensor components 189 an accelerometer, a gyroscope, a magnetometer, and/or a tilt sensor, among other examples. At the end effectors 156a, 156b and/or at one or more other suitable locations, the robot 100 can include among the sensor components 189 a contact sensor and/or a force sensor, among other examples. In at least some cases, two or more different types of sensors are incorporated into a sensor assembly. For example, an accelerometer, a gyroscope, and a magnetometer can be incorporated into an inertial measurement unit through which the robot 100 can determine acceleration, angular velocity, and orientation.

At one, some, or all of the arm and leg actuators 174, 176 and/or at one or more other suitable locations, the robot 100 can include among the sensor components 189 sensors that measure properties of the corresponding arm and leg joints 160, 162. Such properties can include position, orientation (e.g., yaw, pitch, and roll), applied force (e.g., torque), elevation, mass, velocity, and acceleration, among other examples. The measurements of these properties can be direct or indirect. As an example, of direct sensing, the robot 100 may sense a torque acting on a given one of the arm joints 160 via a torque sensor of one of the arm actuators 174 operably associated with the arm joints 160. As an example of indirect sensing, the robot 100 may sense a position of a given one of the end effectors 156a, 156b based on perception data corresponding to the given one of the end effectors 156a, 156b and other perception data corresponding to a reference. The robot 100 can include one or more sensors in a sensor system, such as a vision system, a light detection and ranging (LIDAR) system, a sound navigation and ranging (SONAR) system, etc. In at least some cases, the robot 100 monitors itself and/or its environment in real-time or in near real-time. Moreover, the robot 100 may use acquired sensor data as a basis for decision-making via the computing components 178.

Components of the electrical and computer system 177 can be connected to one another and/or to other components of the robot 100 via suitable conductors, transmitters, receivers, circuitry, etc. While the electrical and computer system 177 configured as described above may be used to support operation of the robot 100, it should be appreciated that the robot 100 may be operated using devices of various types and configurations and that such devices may have various components and levels of responsibility. For example, the robot 100 may employ individual computer systems or controllers to manage discrete aspects of its operations, such as an individual computer system or controller to perform computer vision operations, a separate computer system or controller to perform power management, etc. In some cases, the robot 100 employs the electrical and computer system 177 to control physical aspects of the robot 100 according to one or more designated rules encoded in software. For example, these rules can include minimums and/or maximums, such as a maximum degree of rotation for a joint, a maximum speed at which a component is allowed to move, a maximum acceleration rate for one or more components, etc. The robot 100 may include any number of mechanical aspects and associated rules, which may be based on or otherwise configured in accordance with the purpose of and/or functions performed by the robot 100.

Software features of the robot 100 may take the form of computer-executable instructions, such as program modules executable by the computing components 178. Generally, program modules include routines, programs, objects, components, data structures, and/or the like configured to perform particular tasks or to implement particular abstract data types and may be encrypted. Furthermore, the functionality of the program modules may be combined or distributed as desired in various examples. Moreover, control scripts may be implemented in any suitable manner, such as in C/C++ or Python. The functionality of the program modules may be combined or distributed in various embodiments, including cloud-based implementations, web applications, mobile applications for mobile devices, etc.

Furthermore, certain aspects of the present technology can be embodied in a special purpose computer or data processor, such as application-specific integrated circuits (ASIC), digital signal processors (DSP), field-programmable gate arrays (FPGA), graphics processing units (GPU), many core processors, etc. specifically programmed, configured, or constructed to perform one or more computer-executable instructions. While aspects of the present technology, such as certain functions, may be described as being performed on a single device, these aspects, when suitable, can also be practiced in distributed computing environments where functions or modules are shared among different processing devices linked through a communications network such as a Local Area Network (LAN), Wide Area Network (WAN), or the Internet. In a distributed computing environment, program modules and other components may be located in both local and remote memory storage and other devices, which may be in communication via one or more wired and/or wireless communication channels.

Aspects of the present technology may be stored or distributed on tangible computer-readable media, which can include volatile and/or non-volatile storage components, such as magnetically or optically readable computer media, hard-wired or preprogrammed chips (e.g., EEPROM semiconductor chips), nanotechnology memory, biological memory, or other computer-readable storage media. Alternatively, computer-implemented instructions, data structures, screen displays, and other data under aspects of the present technology may be distributed (encrypted or otherwise) over the Internet or over other networks (including wireless networks), on a propagated signal on a propagation medium (e.g., electromagnetic wave(s), sound wave(s), etc.) over a period of time, or they may be provided on any analog or digital network (packet switched, circuit switched, or other scheme). Furthermore, the term computer-readable storage medium does not encompass signals (e.g., propagating signals) or transitory media. One of ordinary skill in the art will recognize that various components of the robot 100 may communicate via any number of wired and/or wireless communication techniques and that elements of the robot 100 may be distributed rather than located in a single monolithic entity. Finally, electrical and computing aspects of robots in accordance with various embodiments of the present technology may operate in environments and/or according to processes other than the environments and processes described above.

Examples of Software Architecture Related to Object Manipulation

Figure 35:
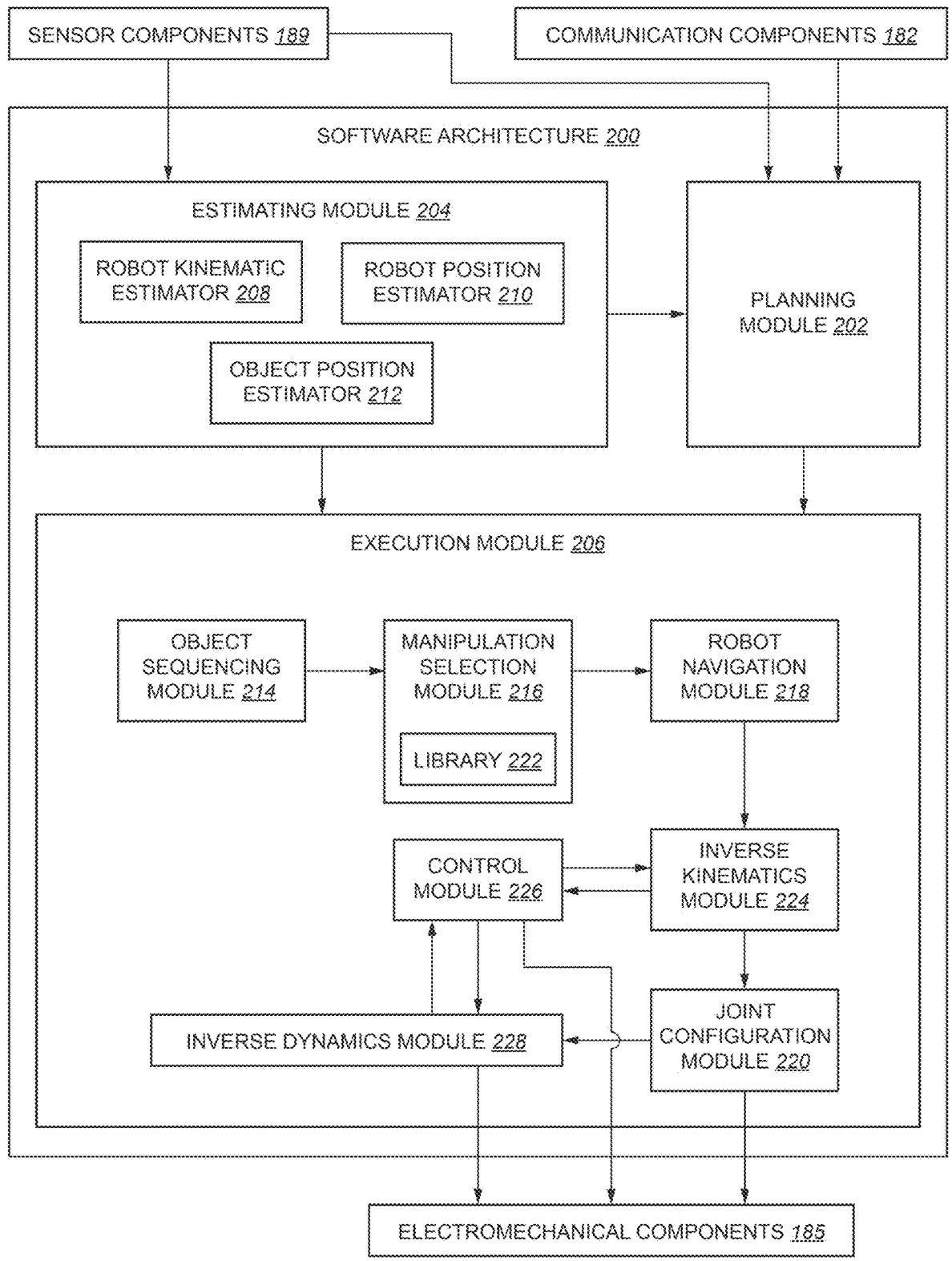
FIG. 35 is a block diagram illustrating a software architecture of the robot shown in FIG. 1.
Figure 36:
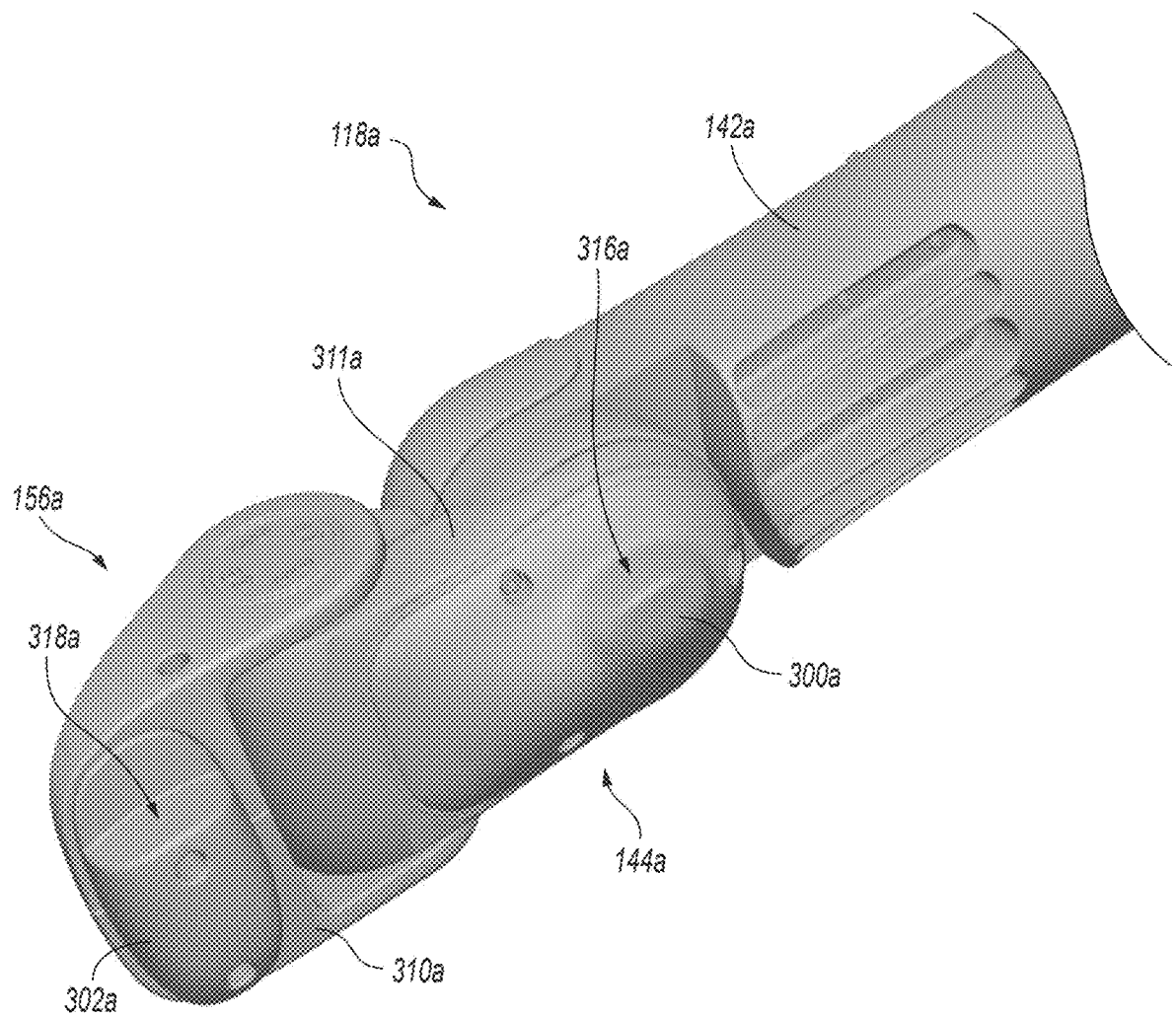
FIGS. 36-40 are, respectively, a perspective view, a first side profile view, an opposite second side profile view, a bottom plan view, and a top plan view of the distal portion of the first arm of the robot shown in FIG. 1.
Figure 37:
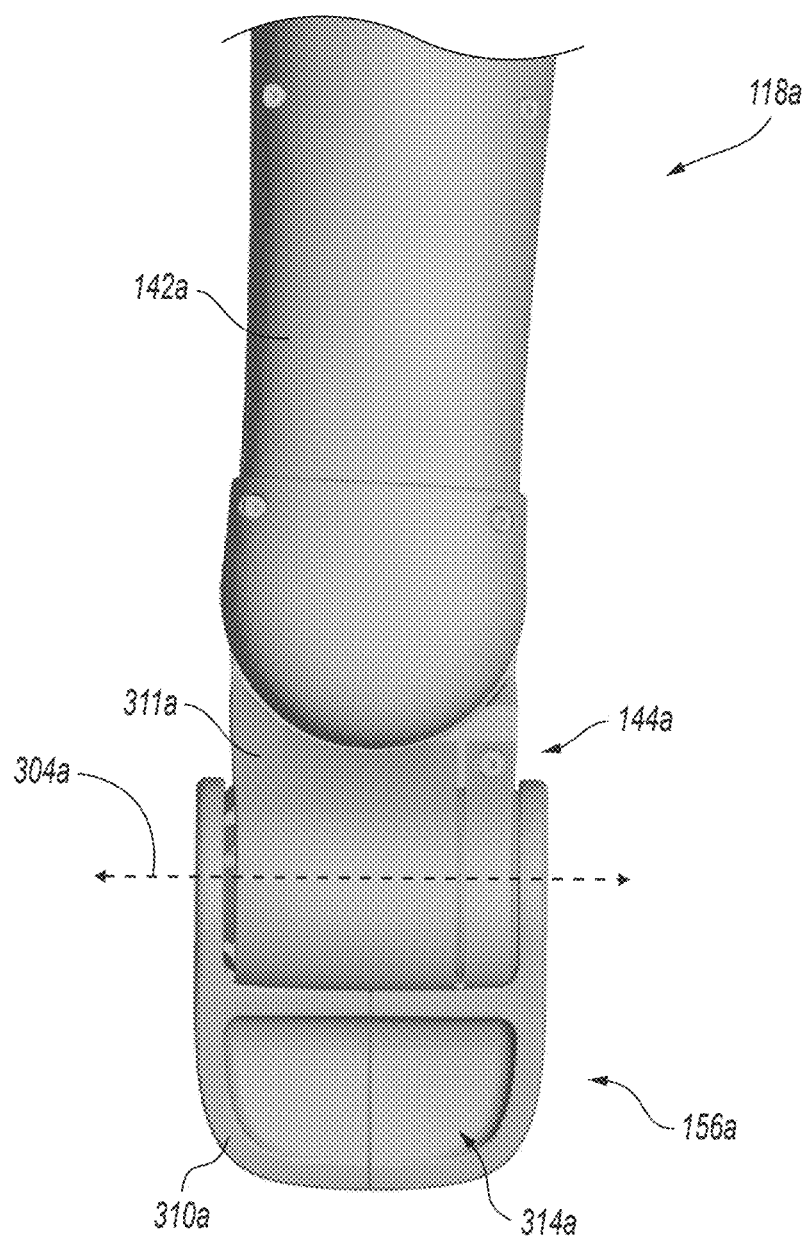
Figure 38:
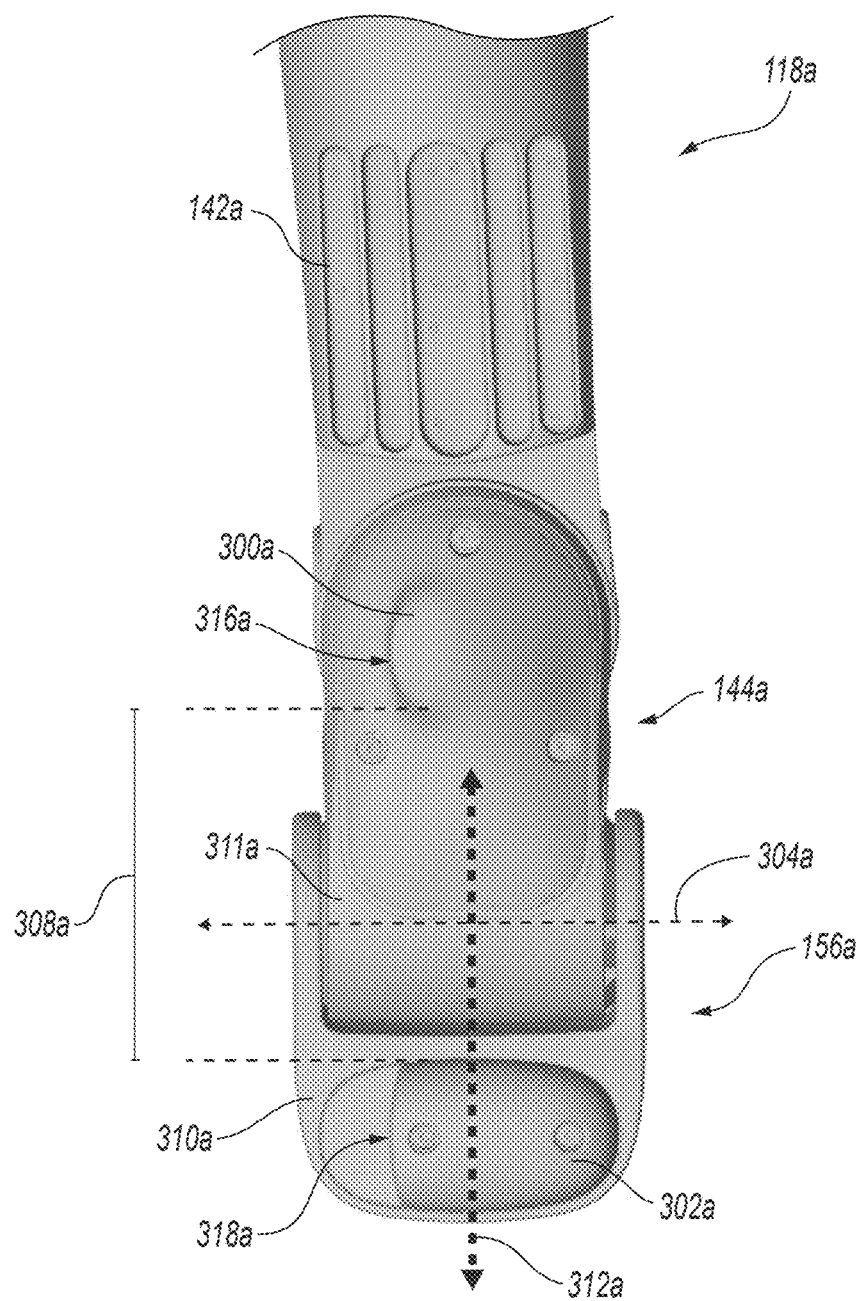
Figure 39:
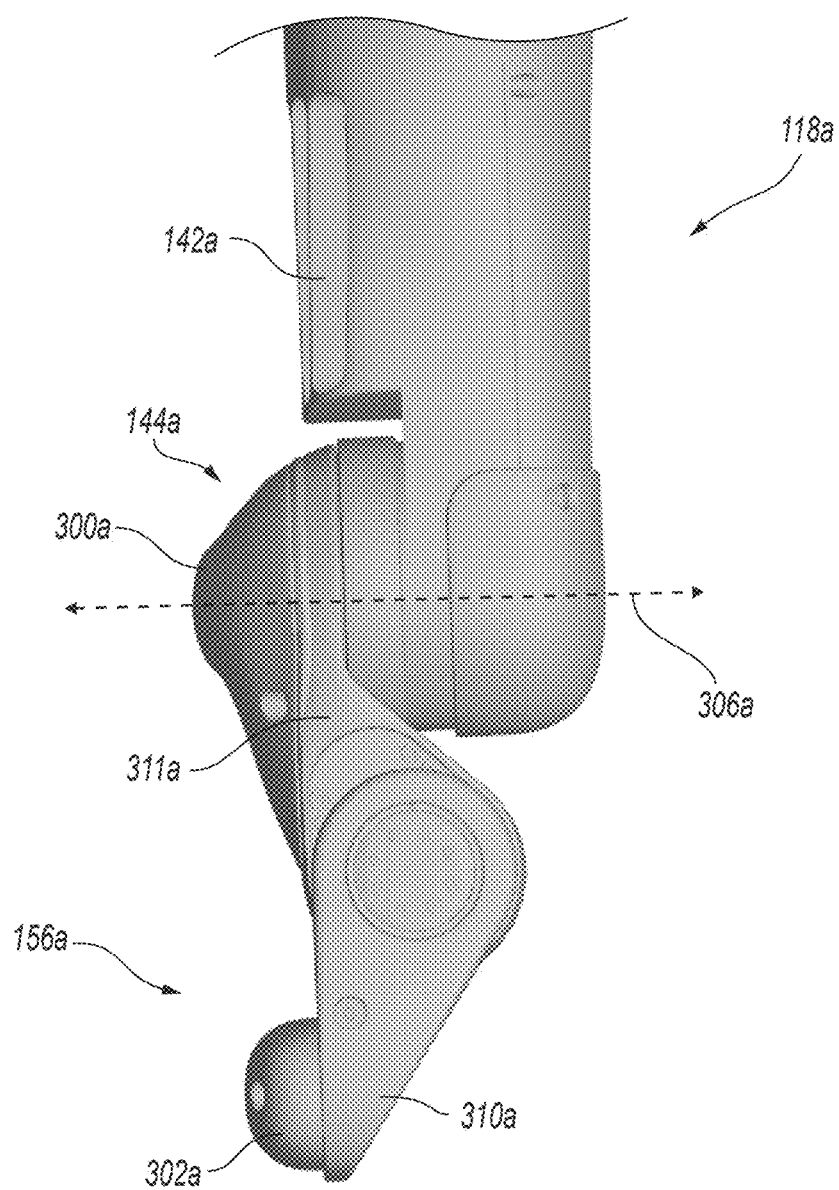
Figure 40:
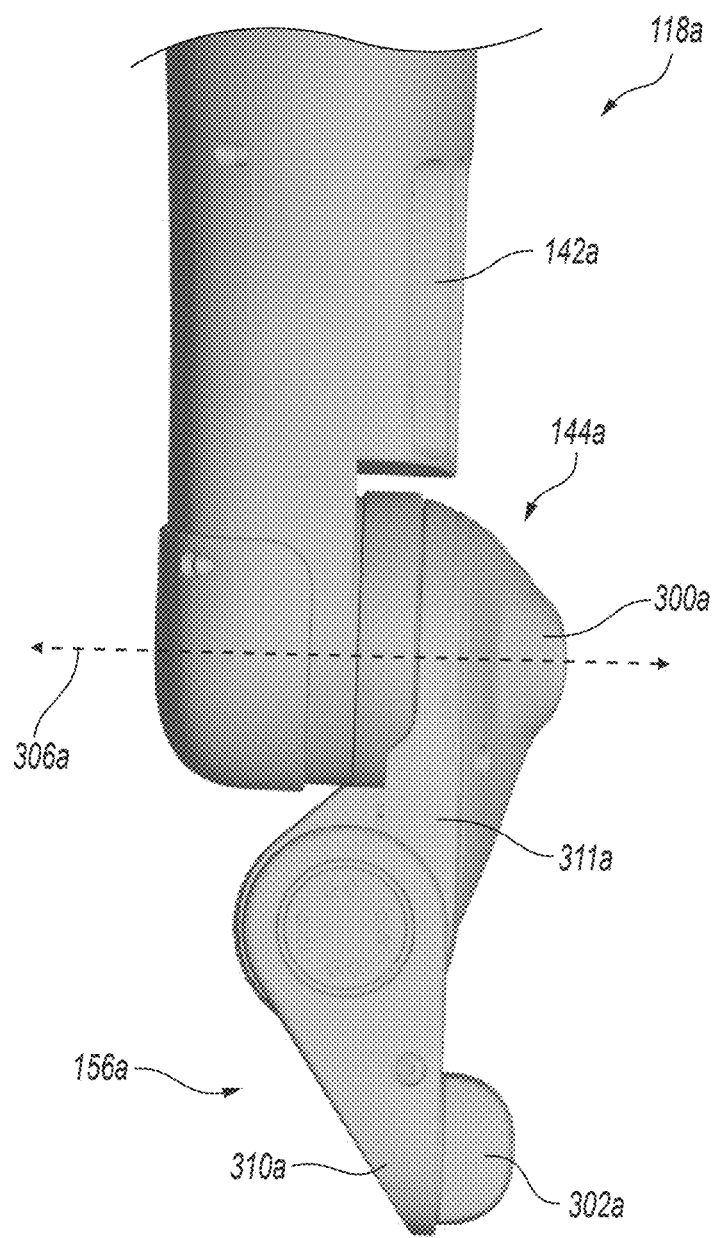

FIG. 35 is a block diagram illustrating selected portions of a software architecture 200 of the robot 100. The software architecture 200 can be within the software features of the electrical and computer system 177 described above in connection with FIG. 34. With reference to FIGS. 34 and 35 together, the software architecture 200 can include a planning module 202, an estimating module 204, and an execution module 206 operably associated with one other. The planning module 202 can be configured to relay or to generate a plan corresponding to an objective for the robot 100 (e.g., unload all objects on a shelf, retrieve an object from a first location and move the object to a second location, etc.). In at least some cases, the planning module 202 receives information from the communication components 182 and relays or generates a plan based at least partially on the received information. For example, the planning module 202 can receive a command from a user via the communication components 182 and relay the command as a plan. As another example, the planning module 202 can receive a command from a user via the communication components 182 and generate a plan related to the command. As yet another example, the planning module 202 can generate a plan without receiving a command from a user, such as at a predetermined time or in response to information about a current state of the robot 100 or the environment from the sensor components 189.

The estimating module 204 can receive information from the sensor components 189 and can generate estimates in real time or in near real time to inform generating and/or executing a plan. The estimating module 204 can include a robot kinematic estimator 208, a robot position estimator 210, and an object position estimator 212. The robot kinematic estimator 208 can generate an estimate of a current kinematic state of the robot 100 (e.g., balanced, off-balance, walking, standing, etc.) and estimates of positions of individual joints of the robot 100. The robot position estimator 210 can generate a current estimate of a position of the robot 100 within an environment. The robot position can be a set of coordinates and can be based on, for example, perception information and/or GPS information. Perception information relevant to the robot position includes, among other examples, information corresponding to distances between the robot 100 and landmarks in an environment as detected, for example, via a LIDAR system of the robot 100. The object position estimator 212 can generate estimates of the positions of relevant objects (e.g., totes to be manipulated) in an environment. As with the robot position, the object positions can be sets of coordinates and can be based on perception information. Perception information relevant to the object positions include, among other examples, information corresponding to fiducial markings carried by or otherwise associated with the objects as detected, for example, via an optical sensor of the robot 100.

The execution module 206 can be configured to receive a plan from the planning module 202 and estimates from the estimating module 204. The execution module 206 can include an object sequencing module 214, a manipulation selection module 216, a robot navigation module 218, and a joint configuration module 220. The planning module 202 can be configured to send a plan to the object sequencing module 214, to the manipulation selection module 216, to the robot navigation module 218, or to the joint configuration module 220 based on attributes of the plan. For example, when a plan includes explicit instructions for positions of the electromechanical components 185, the planning module 202 can send the plan to the execution module 206 via the joint configuration module 220. As another example, when a plan does not involve manipulating an object, the planning module 202 can send the plan to the execution module 206 via the robot navigation module 218. As yet another example, when a plan concerns only one object and the object is remote to the robot 100, the planning module 202 can send the plan to the execution module 206 via the manipulation selection module 216. As a final example, when a plan concerns multiple objects remote to the robot 100, the planning module 202 can send the plan to the execution module 206 via the object sequencing module 214.

The object sequencing module 214 can receive one or more estimates from the estimating module 204 and can generate a sequence in which multiple objects are to be manipulated. For example, when the object sequencing module 214 receives a plan to unload a shelf, the object sequencing module 214 can query the estimating module 204 for current locations of objects on the shelf. The object sequencing module 214 can then assign the objects an order, convert the order into a queue, and pass the queue to the manipulation selection module 216. The manipulation selection module 216 can include a library 222 including two or more different motion sequences that can be used to manipulate an object. Selected examples of these motion sequences are described below with reference to FIGS. 46-70. The manipulation selection module 216 can select a motion sequence for a given object based on the position of the object. For example, if the position of an object is such that locations on the object well suited for establishing a stable bimanual grasp of the object are kinematically accessible to the robot 100 (e.g., because the object is at or near the level of the torso 104 of the robot 100), the manipulation selection module 216 can select a motion sequence that includes lifting the object without first repositioning the object. In contrast, if an object is more difficult for the robot 100 to reach, the manipulation selection module 216 can select a motion sequence that includes repositioning the object to a more accessible position before lifting the object.

The robot navigation module 218 can generate targets for different parts of the robot 100 further to a plan or to a portion of a plan being executed. Examples of targets include positions of the feet 158a, 158b in the environment, positions of the end effectors 156a, 156b in the environment, etc. The robot navigation module 218 can update these targets continuously or near continuously based on information from the estimating module 204. The execution module 206 can further include an inverse kinematics module 224 that translates the targets from the robot navigation module 218 into joint configurations throughout the robot 100. The execution module 206 can also include a control module 226 that receives joint configurations from the inverse kinematics module 224 and generates joint parameters (e.g., positions, velocities, accelerations, etc.) to be executed by the robot 100 to achieve these joint configurations. Through continuous or near-continuous communication with the inverse kinematics module 224, the control module 226 can modify the joint parameters to at least partially compensate for deviations as the robot 100 executes the joint configurations. The inverse kinematics module 224 can send other joint configurations not subject to active control to the joint configuration module 220. Similar to the control module 226, the joint configuration module 220 can generate joint parameters (e.g., positions, velocities, accelerations, etc.) to be executed by the robot 100 to achieve joint configurations received from the inverse kinematics module 224 or from the planning module 202.

Finally, the execution module 206 can include an inverse dynamics module 228 that receives joint parameters from the control module 226 and from the joint configuration module 220. The inverse dynamics module 228 can track a desired wrench of the robot 100 and its relationship with objects in the environment. In at least some cases, the inverse dynamics module 228 references a map of robot positions and wrenches to joint torques. Based at least partially on the tracking, the inverse dynamics module 228 can modify the joint parameters to achieve a desired result. For example, the inverse dynamics module 228 can modify the joint parameters to maintain contact between a tote and a support as the robot 100 drags the tote toward the body 103. The inverse dynamics module 228 can then send modified joint parameters to the electromechanical components 185 for execution. For configurations that do not involve a dynamic interaction with the environment, the control module 226 and the joint configuration module 220 can send joint parameters directly to the electromechanical components 185 for execution.

Examples of Distal Arm Features

FIGS. 36-40 are, respectively, a perspective view, a first side profile view, an opposite second side profile view, a front profile view, and a top plan view of a distal portion of the arm 118a. Features of the arm 118b can correspond symmetrically about the midsagittal plane 102 (FIG. 3) to the features of the arm 118a shown in FIGS. 36-40. Accordingly, the newly introduced features in FIGS. 36-40 are assigned reference numbers appended with "a." Any corresponding features of the arm 118b are assigned reference numbers appended with "b" in the discussion of additional figures below. With reference to FIGS. 1-40 together, the arm 118a can include a proximal gripper 300a carried by the wrist link 144a. The arm 118a can further include a distal gripper 302a carried by the end effector 156a. Thus, the end effector joint 160g (FIG. 12) can be disposed between the proximal gripper 300a and the distal gripper 302a along the kinematic chain corresponding to the arm 118a. The distal gripper 302a can be rotatable relative to the proximal gripper 300a via the end effector joint 160g about an end effector axis 304a. In addition or alternatively, the proximal gripper 300a and the distal gripper 302a can be rotatable together relative to the lower arm link 142a via the wrist joint 160f (FIG. 12) about the wrist axis 306a. In the context of the arm 118a and in other contexts, the end effector axis 304a and the wrist axis 306a can be within 20 degrees of perpendicular (e.g., within 10 degrees of perpendicular and/or substantially perpendicular) to one another. Furthermore, the wrist axis 306a can extend through the proximal gripper 300a. This can be useful, for example, to reduce or eliminate extraneous movement of an object in contact with the proximal gripper 300a during actuation of the wrist joint 160f when the lower arm link 142a is stationary and the object is not in contact with the distal gripper 302a.

In some cases, the proximal gripper 300a and the distal gripper 302a are separated from one another by exactly one degree of freedom. In other cases, counterparts of the proximal gripper 300a and the distal gripper 302a can be both carried by a counterpart of the wrist link 144a, both carried by a counterpart of the end effector 156a, both carried by another suitable link of a counterpart of the arm 118a, or separately carried by a counterpart of the arm 118a in another suitable arrangement. Furthermore, counterparts of the proximal gripper 300a and the distal gripper 302a can be separated from one another by more than one degree of freedom. With reference again to FIGS. 1-40 together, the proximal gripper 300a and the distal gripper 302a can be spaced apart from one another along the arm length 122a (FIG. 8) by a spacing 308a. In at least some cases, rotating the end effector joint 160g changes the spacing 308a. In these and other cases, rotating the end effector joint 160g can change the angle relative to the wrist axis 306a of a plane through which the proximal gripper 300a and the distal gripper 302a contact a vertical or near-vertical wall of an object.

The end effector 156a can include a paddle 310a that is symmetrical about a midline plane 312a perpendicular to the end effector axis 304a. At its first side (FIG. 37), the paddle 310a can define a recess 314a. The recess 314a can be useful for weight reduction, to facilitate a scooping action, and/or for one or more other purposes. At its second side (FIG. 38), the paddle 310b can carry the distal gripper 302b. For example, the paddle 310a and the distal gripper 302a can be separately formed and joined adhesively, mechanically (e.g., with fasteners), or in another suitable manner. The wrist link 144a can include a frame 311a carrying the proximal gripper 300a. Likewise, the frame 311a and the proximal gripper 300a can be separately formed and joined adhesively, mechanically (e.g., with fasteners), or in another suitable manner.

Figure 8:
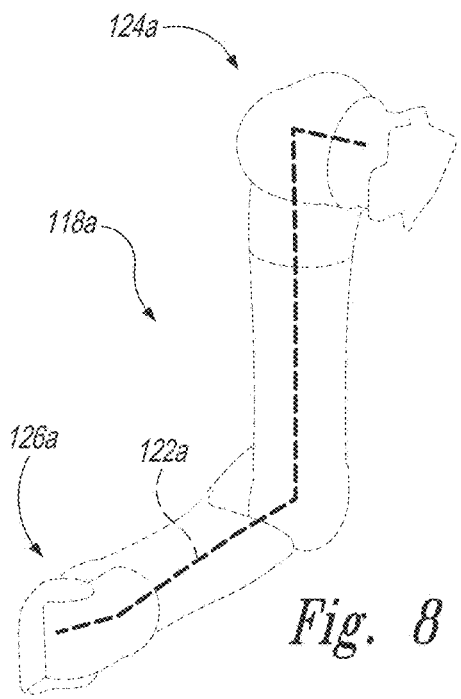
FIGS. 8-11 are silhouette views of the first arm, the second arm, the first leg, and the second leg, respectively, of the robot shown in FIG. 1 illustrating corresponding arm and leg lengths.
Figure 9:
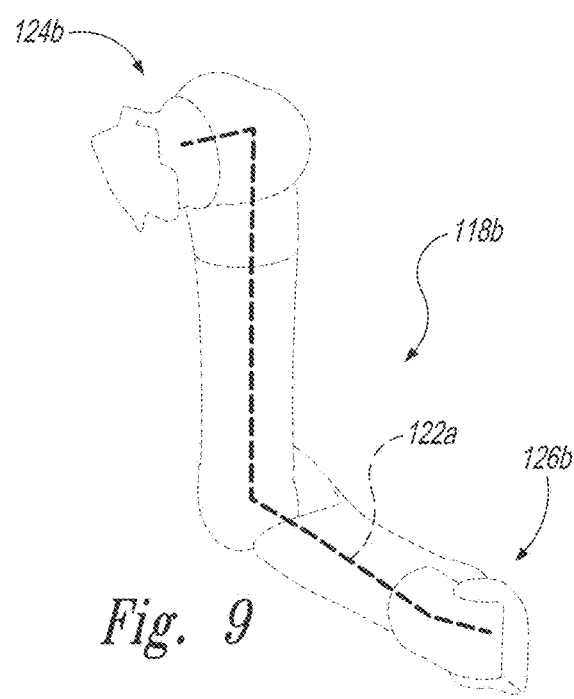
Figure 10:
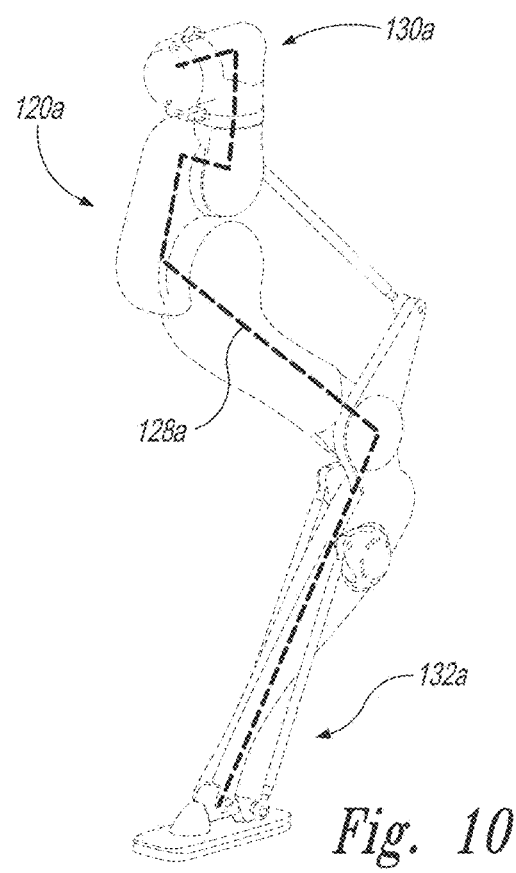
Figure 11:
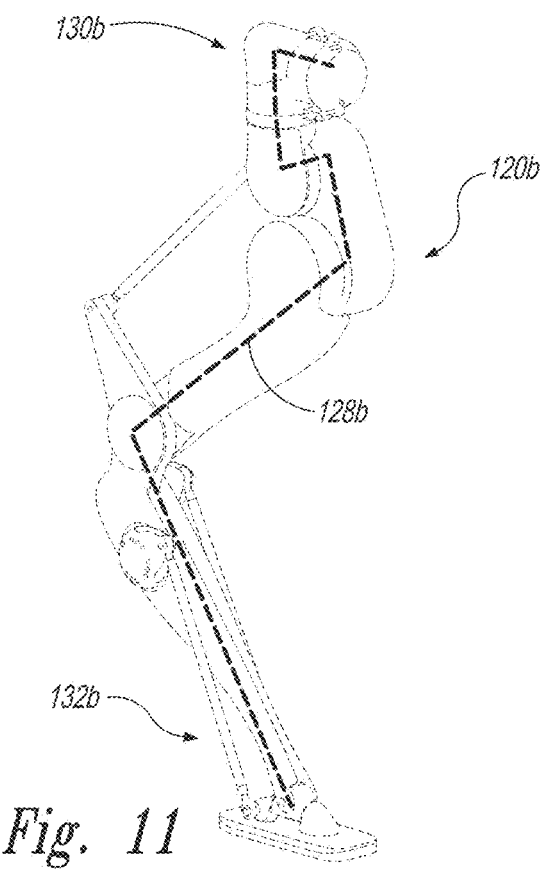
Figure 12:
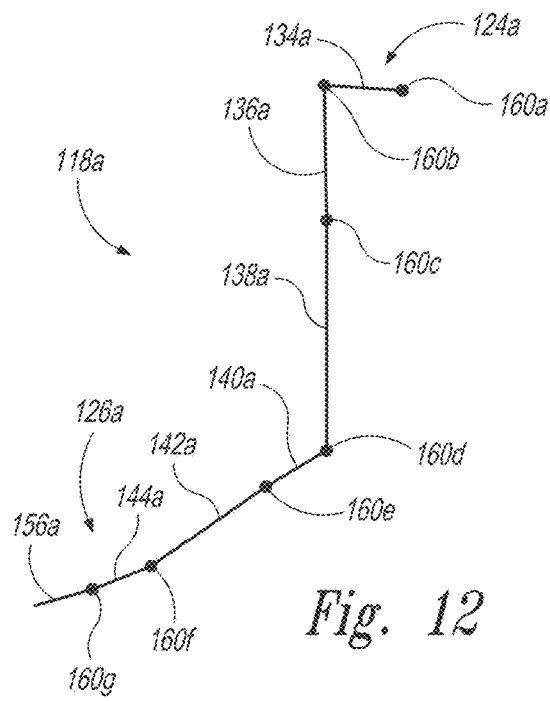
FIGS. 12-15 are partially schematic diagrams showing kinematic chains corresponding, respectively, to the first arm, the second arm, the first leg, and the second leg of the robot shown in FIG. 1.
Figure 13:
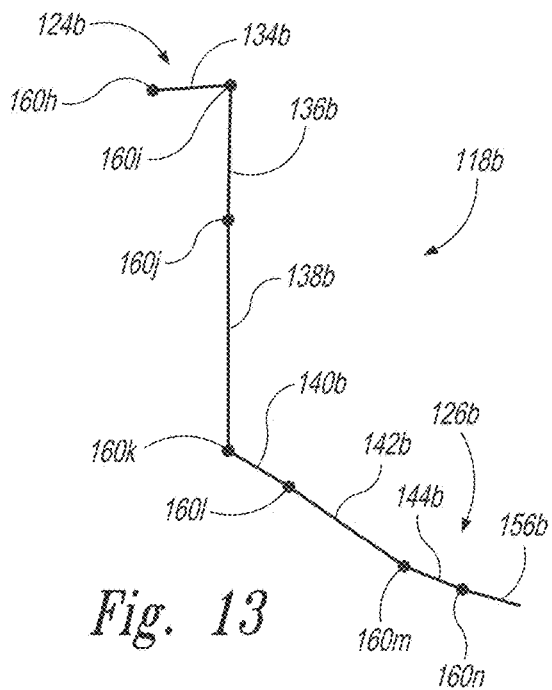
Figure 14:
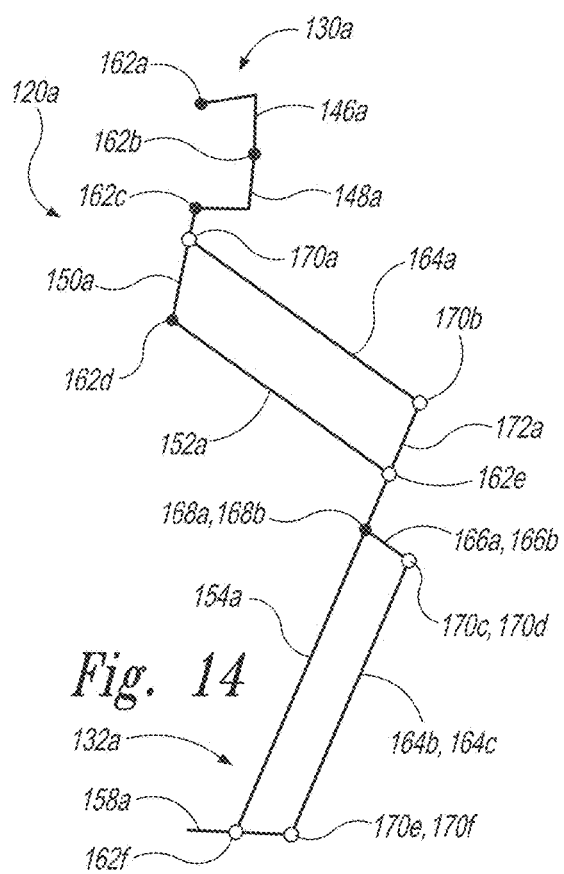
Figure 15:
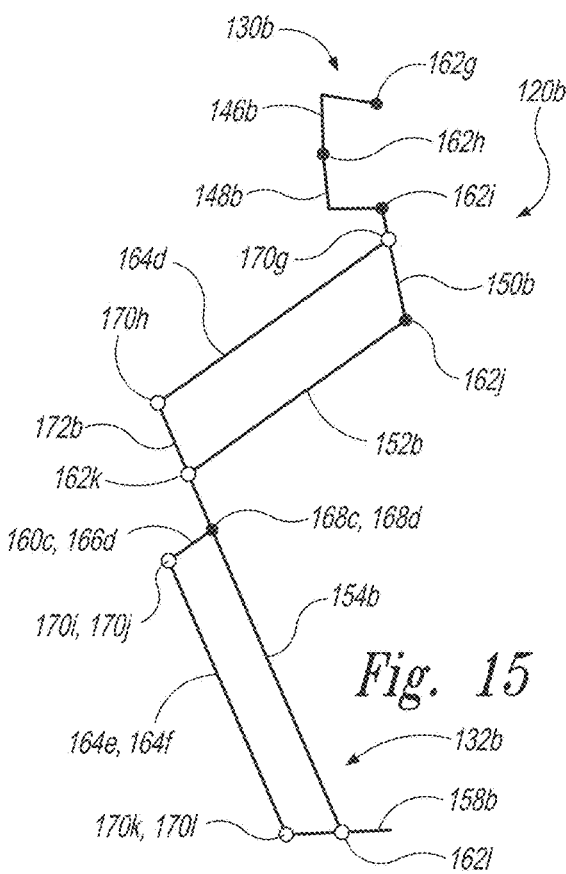

In at least some cases, the proximal gripper 300a is shaped to define a contact interface longer in a dimension parallel to the arm length 122a (FIG. 8) than in a dimension parallel to the end effector axis 304a. In these and other cases, the distal gripper 302a can be shaped to define a contact interface longer in a dimension parallel to the end effector axis 304a than in a dimension parallel to the arm length 122a (FIG. 8). These and other differences can facilitate complementary gripping properties of the proximal and distal grippers 300a, 302a and/or have one or more other benefits. Furthermore, the proximal and distal grippers 300a, 302a can respectively include proximal and distal ledges 316a, 318a. The proximal and distal ledges 316a, 318a can have slight convexity in a proximal-to-distal dimension and less convexity (e.g., concavity or no convexity) in medial-lateral dimension. These shape features can facilitate secure ledge-type interaction with an object protrusion while still allowing for some degree of controlled rotation of the object and flexibility in approach angles.

The proximal gripper 300a and the distal gripper 302a can be configured to promote frictional contact with an object. In at least some cases, proximal gripper 300a has a material composition that promotes a relatively high coefficient of friction between the proximal gripper 300a and an object. In addition or alternatively, the distal gripper 302a can have a material composition that promotes a relatively high coefficient of friction between the distal gripper 302a and an object. Suitable materials for the proximal gripper 300a and the distal gripper 302a include elastomeric materials, such as natural rubber, nitrile rubber, butyl rubber, silicone, polyurethane, and neoprene, among others. The paddle 310a and the frame 311a can be configured for strength as a higher priority than grip. Suitable materials for the paddle 310a and the frame 311a include metal (e.g., aluminum) and hard plastics (e.g., acrylonitrile butadiene styrene), among others.

Examples of Manipulation Methods

Figure 41:
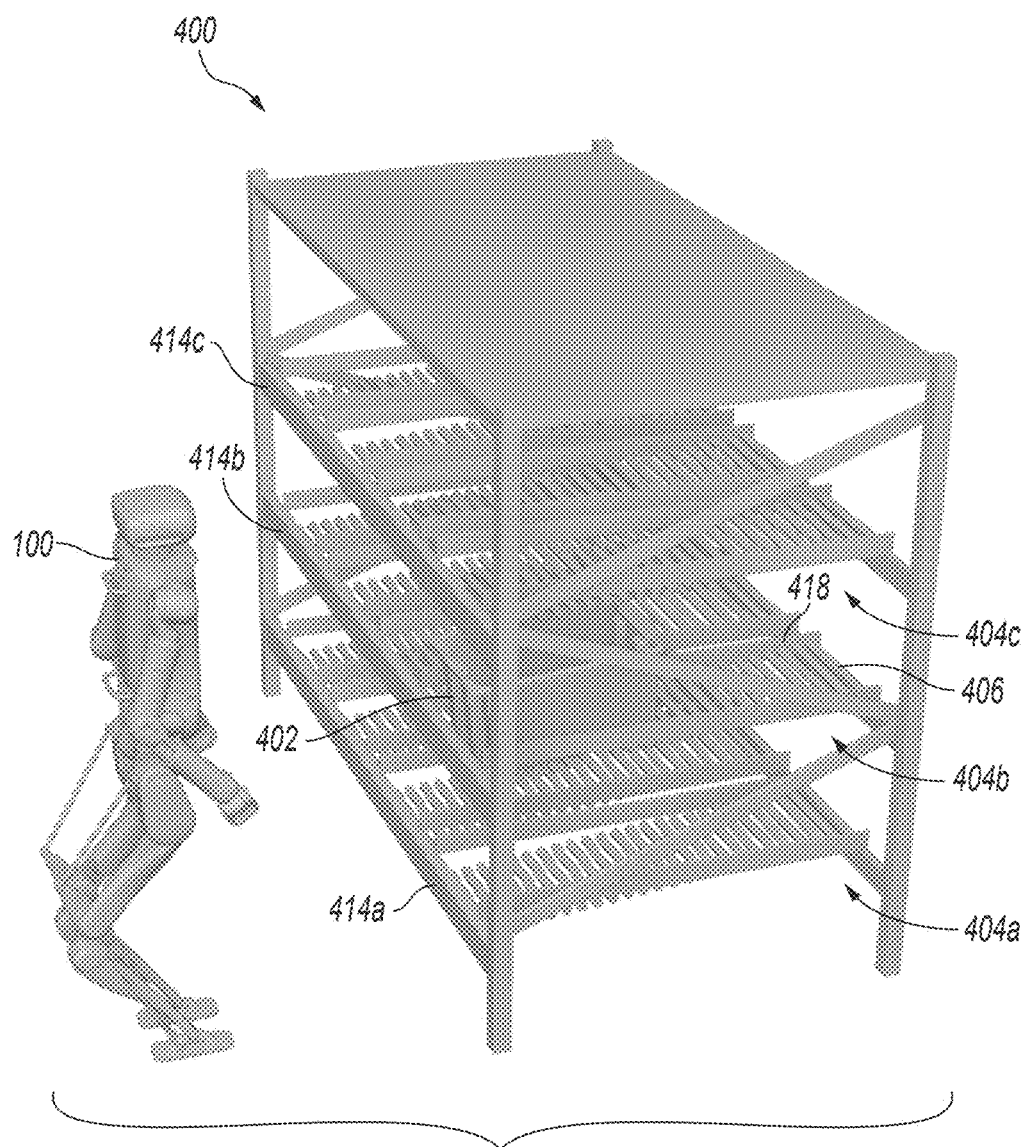
FIG. 41 is a perspective view of the robot shown in FIG. 1 and a support structure carrying an object.

The robot 100 can be configured to manipulate an object carried by a support structure. FIG. 41 is a perspective view of the robot 100 and one example of a support structure 400 carrying an object 402. FIG. 42 is a side profile view of the object 402 and selected portions of the support structure 400. FIGS. 43 and 44 are, respectively, a front profile view and a side profile view of the object 402. With reference to FIGS. 41-44 together, the support structure 400 can include tiers 404 (individually identified as tiers 404a-404c) at progressively higher elevations above a ground plane. The support structure 400 can further include supports 406 (one labeled) laterally neighboring one another at the tiers 404a-404c. The individual supports 406 can define a support depth 408 and can include a front portion 410 and a rear portion 412 spaced apart from one other along the support depth 408. Furthermore, the individual supports 406 can be sloped downward along the support depth 408 from the rear portion 412 toward the front portion 410. The support structure 400 can include stops 414 (individually identified as stops 414a-414c) at the tiers 404a-404c, respectively. The stops 414a-414c can project upward from and extend along the front portions 410 of the supports 406 at the corresponding tiers 404a-404c.

The individual supports 406 can include rollers 416 (one labeled) rotatable around respective axes perpendicular to the support depth 408. The support structure 400 can also include rails 418 (one labeled) at opposite respective sides of the individual supports 406 along respective dimensions perpendicular to the corresponding depths 408. In at least some cases, the robot 100 interacts with the object 402 at least primarily from the front portion 410 of the support 406. In FIG. 41, the robot 100 is spaced apart from the support structure 400 and generally aligned laterally with the object 402. The object 402 can be loaded onto the support 406 via the rear portion 412 of the support 406. Once loaded, the slope of the support 406 can cause the object 402 to move toward the front portion 410 of the support 406 by gravity until it contacts the stop 414b. The rails 418 on either side of the support 406 can channel this motion of the object 402.

As shown in FIGS. 43 and 44, the object 402 can define an object width 430, an object height 432, and an object depth 434. The object 402 can include a first side portion 436 and a second side portion 438 spaced apart from one another along the object width 430. The object 402 can further include a bottom portion 440 and a top portion 442 spaced apart from one another along the object height 432. The object 402 can also include a front portion 444 and a rear portion 446 spaced apart from one another along the object depth 434. As parts of the first and second side portions 436, 438, the object 402 can include first and second sidewalls 448, 450, respectively, and first and second protrusions 452, 454, respectively. The first and second protrusions 452, 454 can extend laterally outward from the first and second sidewalls 448, 450, respectively. The first and second sidewalls 448, 450 can taper inwardly along the object width 430 from the top portion 442 of the object 402 toward the bottom portion 440 of the object 402.

In the illustrated case, the support 406 is a sloped shelf and the object 402 is a tote. In other cases, counterparts of the support 406 and of the object 402 can have other suitable forms. For example, a counterpart of the support 406 can be another type of shelf, a tabletop, an upper surface of a pallet, a truck bed, or an upper surface of another manipulatable object. In these and other cases, the counterpart of the support 406 can be sloped or non-sloped. As additional examples, a counterpart of the object 402 can be a box, an unpackaged hardgood, or a tote having a different form. In a counterpart tote, counterparts of the first and second sidewalls 448, 450 can be vertical rather than tapered. In addition or alternatively, counterparts of the first and second protrusions 452, 454 can extend from the first and second sidewalls 448, 450 below rather than at the top portion 442 of the object 402. Furthermore, a counterpart of the support structure 400 can include one, two, or more than three tiers. Still further, a counterpart of the support structure 400 can have a maximum capacity of a single object or multiple objects and can be configured to carry objects with or without aligning or otherwise controlling the respective positions of the objects.

Figure 45:
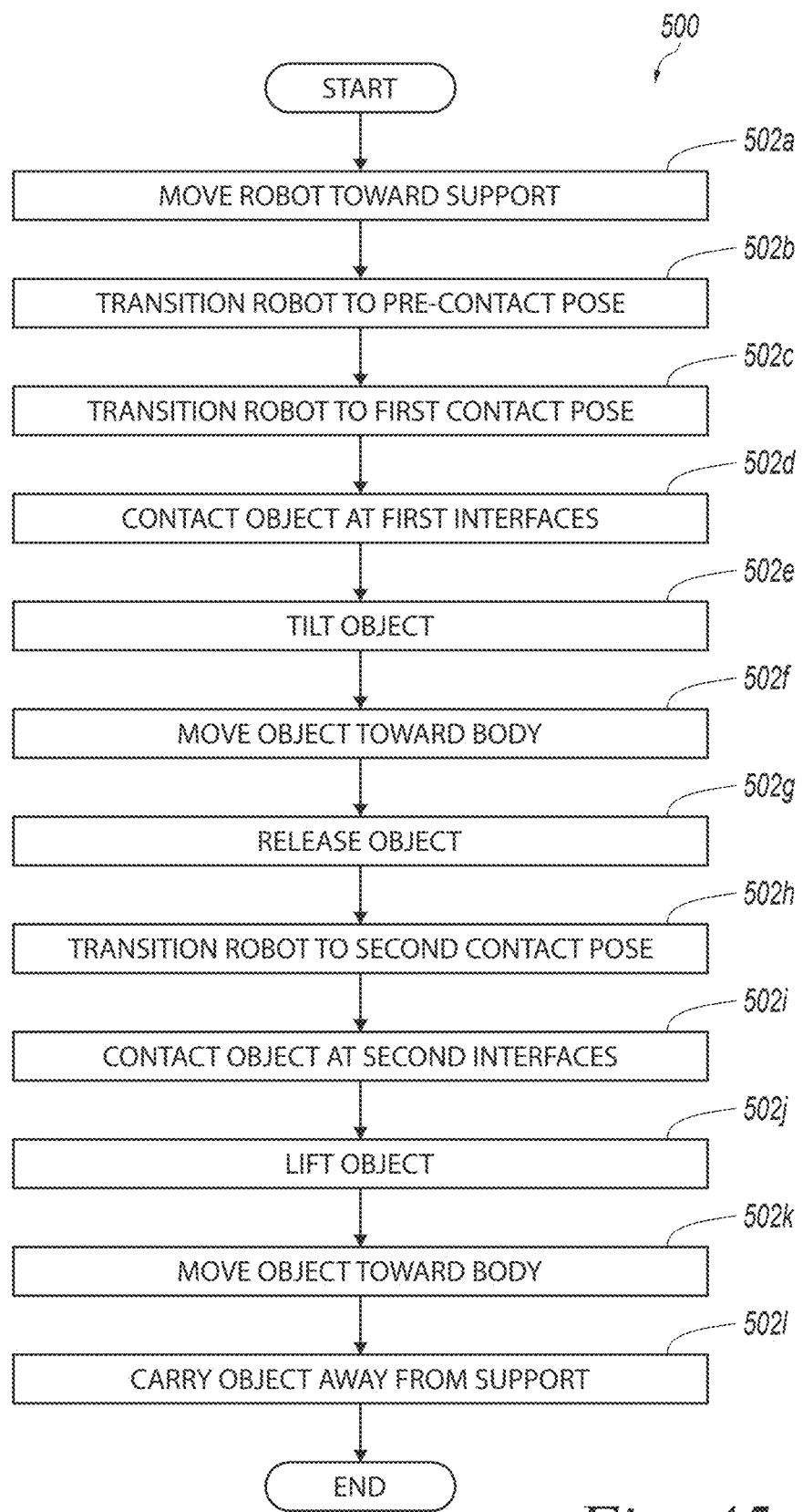
FIG. 45 is a block diagram corresponding to a method in accordance with at least some embodiments of the present technology.

FIG. 45 is a block diagram corresponding to a method 500 for manipulating the object 402 in accordance with at least some embodiments of the present technology. The diagram includes blocks 502a-502l corresponding to different respective portions of the method 500. FIGS. 46-65 are various views of the robot 100, the object 402, and selected portions of the support structure 400 during the method 500. Although the method 500 is shown and described primarily in the context of the robot 100, the object 402, and the support structure 400, the method 500 can alternatively be implemented in other contexts, such as in connection with any of the counterparts described above. With reference now to FIGS. 1-45 together, the method 500 can include moving the robot 100 toward the support structure 400 (block 502a). The robot 100 can move toward the support structure 400 with a forward trajectory resulting in lateral alignment with the object 402. The robot 100 can implement the forward trajectory based on a known position of the object 402 and a directive to retrieve the object 402. Alternatively, the robot 100 can approach the support structure 400 with a forward trajectory resulting in a nonspecific lateral alignment with the support structure 400 and then move laterally into alignment with the object 402. In at least some cases, the robot 100 moves toward the support structure 400 along a floor 600 via the legs 120a, 120b (e.g., bipedally). While the robot 100 moves toward the support structure 400, the support 406 can underlie the object 402 and carry the object 402 at an elevated position relative to the floor 600.

Figure 46:
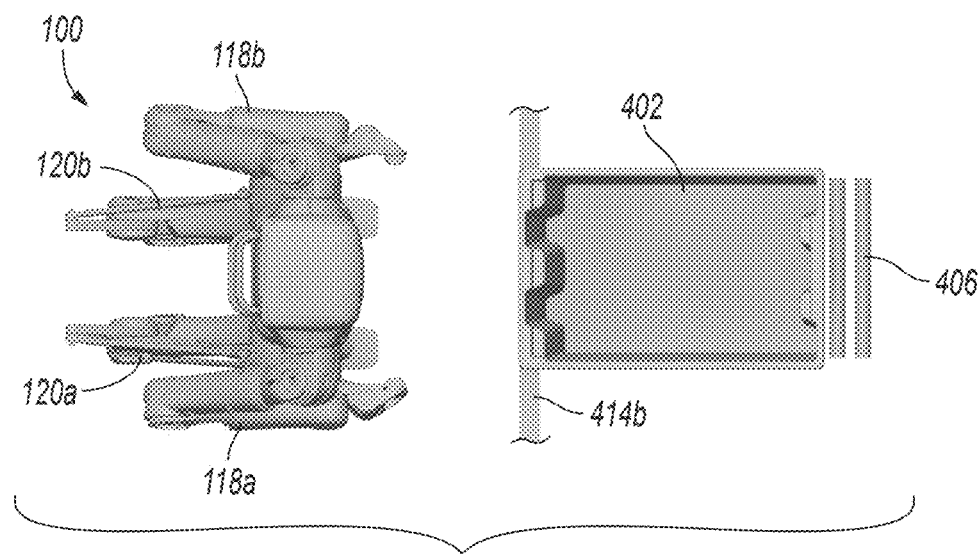
FIGS. 46-65 are sets of views of the robot shown in FIG. 1, the object shown in FIG. 41, and selected portions of the support structure shown in FIG. 41 at different respective times during the method of FIG. 45.
Figure 47:
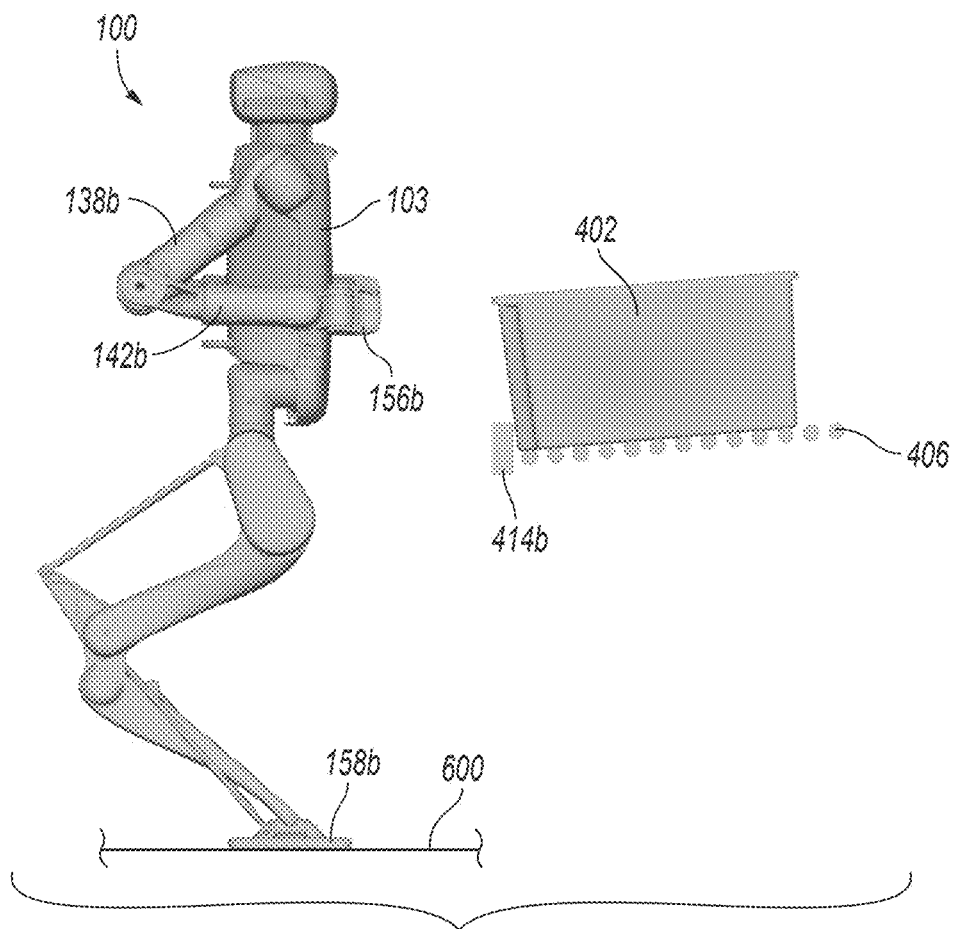

While and/or after moving toward the object 402, the robot 100 can assume a pre-contact pose as shown in FIGS. 46 and 47. In the pre-contact pose, the upper arm links 138a, 138b can extend posteriorly and inferiorly along the corresponding arm lengths 122a, 122b. The lower arm links 142a, 142b can extend anteriorly along the corresponding arm lengths 122a, 122b. Furthermore, the respective portions of the arm lengths 122a, 122b corresponding to the lower arm links 142a, 142b can be within 20 degrees of horizontal (e.g., within 10 degrees of horizontal and/or substantially horizontal). Also in the pre-contact pose, the legs 120a, 120b can be bent to a degree that generally aligns the end effectors 156a, 156b vertically with portions of the object 402 to be contacted. The pre-contact pose can enhance a horizontal range and reach of the arms 118a, 118b, increase a speed at which the arms 118a, 118b can be moved into contact with the object 402, reduce or prevent collisions between the arms 118a, 118b and the object 402 or between the arms 118a, 118b and other structures in the environment, and/or have one or more other benefits.

The method 500 can further include transitioning the robot 100 from the pre-contact pose to a first contact pose (block 502b). In the first contact pose, the upper arm links 138a, 138b can extend anteriorly and inferiorly along the corresponding arm lengths 122a, 122b. The lower arm links 142a, 142b can extend anteriorly along the corresponding arm lengths 122a, 122b. Furthermore, the respective portions of the arm lengths 122a, 122b corresponding to the lower arm links 142a, 142b can be within 20 degrees of horizontal (e.g., within 10 degrees of horizontal and/or substantially horizontal). In at least some cases, the feet 158a, 158b remain stationary while the robot 100 transitions from the pre-contact pose to the first contact pose. The method 500 can further include contacting the object 402 (block 502d) while the robot 100 is in the contact pose.

Figure 48:
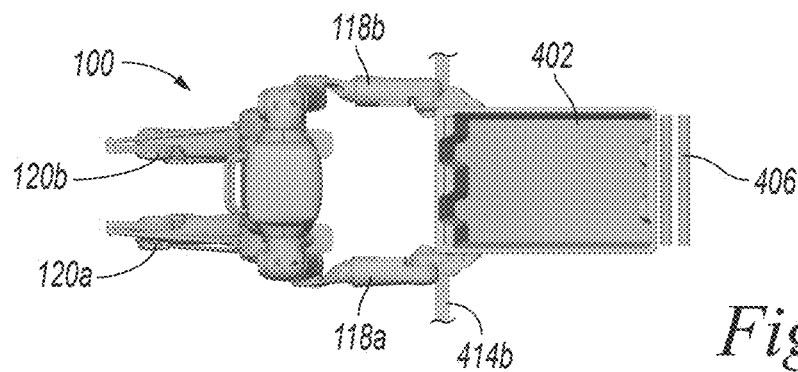
Figure 49:
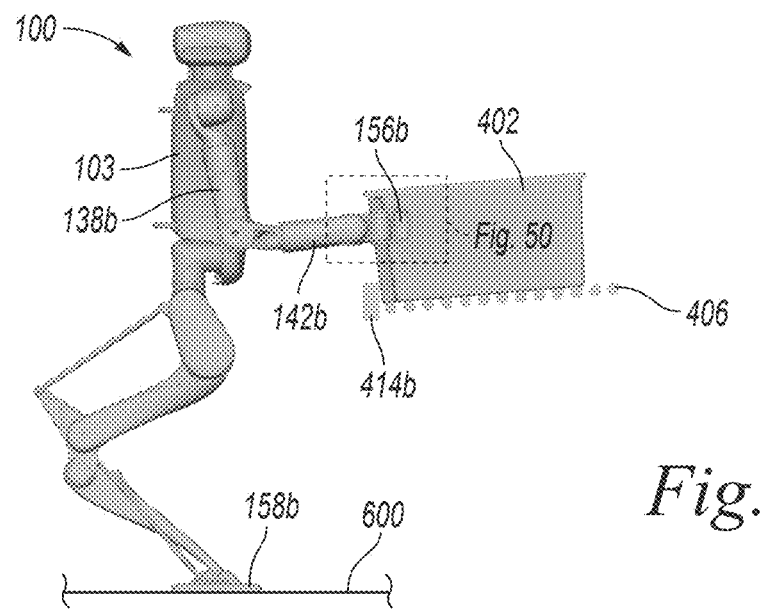
Figure 50:
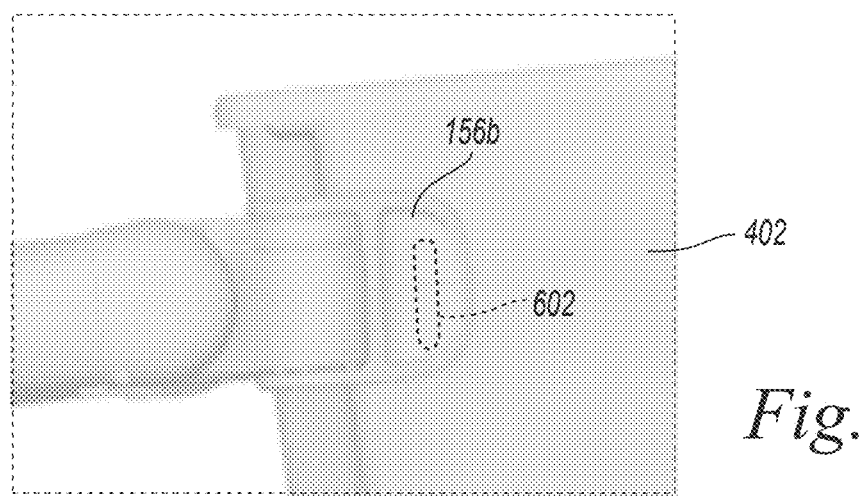

FIGS. 48 and 49 show the robot 100 and the object 402 immediately after this contact is established. FIG. 50 is an annotated enlargement of a portion of FIG. 49. As shown in FIG. 50, the contact can be at first interfaces 602 (one shown) between the arms 118a, 118b and the first and second side portions 436, 438 of the object 402, respectively.

Figure 51:
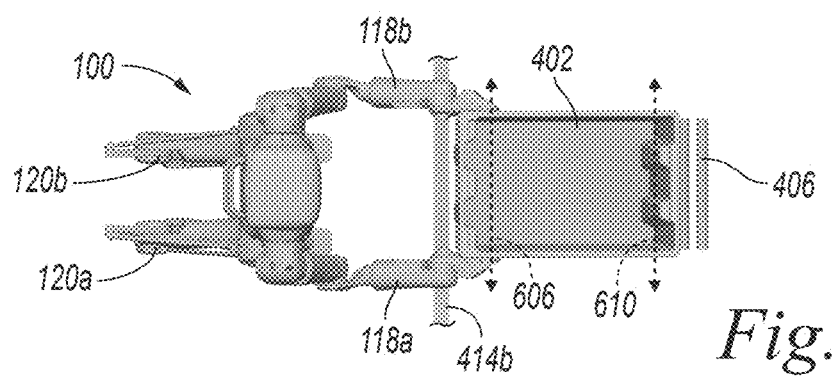
Figure 52:
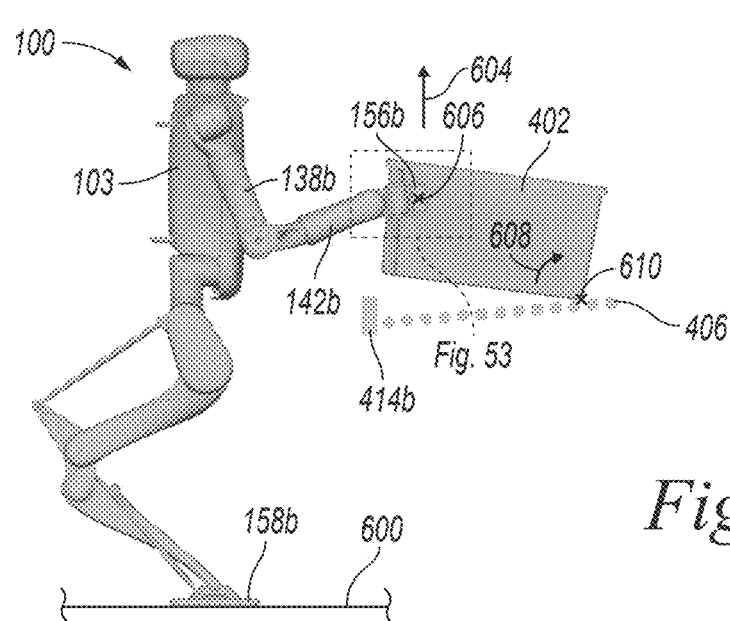
Figure 53:
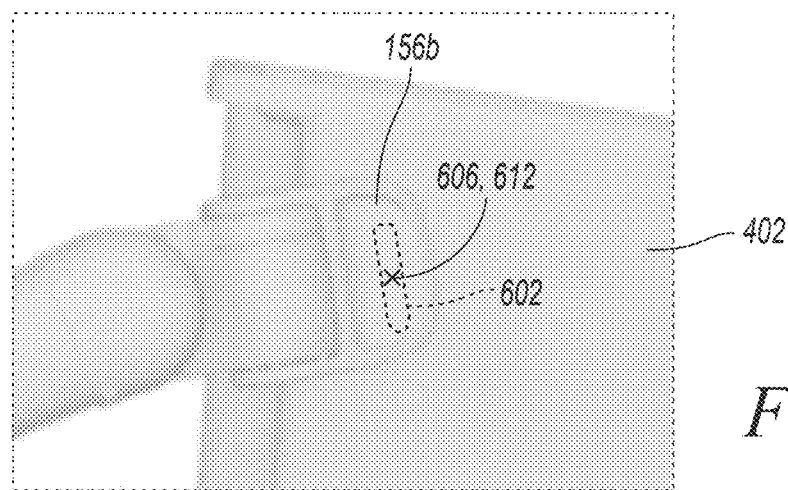

As shown in FIGS. 51-53, the method 500 can further include tilting the object 402 (block 502e). This tilting can result (e.g., entirely, substantially, or at least primarily) from exerting force on the object 402 via the first interfaces 602. Accordingly, the first interfaces 602 can also be referred to as tilting interfaces. The force can be actuated (e.g., entirely, substantially, or at least primarily) via the arm actuators 174d, 174k and/or via the arm actuators 174f, 174m. Furthermore, tilting the object 402 can be actuated (e.g., entirely, substantially, or at least primarily) via the elbow joints 160d, 160k and/or via the wrist joints 160f, 160m. In this or another suitable manner, the end effectors 156a, 156b and the front portion 410 of the object 402 can move upward in the direction of arrow 604. In at least some cases, the tilting is nonprehensile. In these and other cases, the object 402 can pivot relative to the arms 118a, 118b at the first interfaces 602 about a pivoting axis 606 during the tilting. Also during the tilting, the object 402 can be in tilting contact with the support 406 at an edge of the bottom portion 440 of the object 402 farthest from the robot 100 along the object depth 434. Correspondingly, the tilting can be away from the body 103 in the direction of arrow 608 about a tilting axis 610.

In the illustrated case, tilting the object 402 moves the object 402 from an inclined state as shown in FIG. 49 toward a reverse-inclined state as shown in FIG. 52. The reverse-inclined state can vertically stage the edge of the bottom portion 440 of the object 402 closest to the robot 100 to clear the stop 414b. In addition or alternatively, the reverse-inclined state can cause any loose contents within the object 402 to become more evenly distributed along the object depth 434 or to otherwise shift toward the rear portion 446 of the object 402. This can be useful, for example, to enhance a stability of the object 402 during manipulation, to cause the object 402 to behave more predictably during manipulation, and/or for one or more other reasons. In other cases, the tilting can move the object 402 from an inclined state toward a less-inclined state or toward a non-inclined state. In still other cases, the tilting can move the object 402 from a non-inclined state toward an inclined state.

The extent, direction, speed, and/or one or more other characteristics of the tilting can be controlled to achieve a desired result in addition to or instead of vertically staging the front portion 444 of the object 402 to clear the stop 414b. For example, if the robot 100 senses shiftable contents within the object 402 (e.g., by optically perceiving motion within the object 402 during the tilting or by sensing force changes associated with the shifting contents during the tilting) or in other (e.g., all) cases, the robot 100 can continue the tilting until the contents shift in a desired manner, such as toward the rear portion 412 of the object 402. In addition or alternatively, the tilting can include intentionally causing the front portion 444 of the object 402 to strike a portion of the support structure 400 above the object 402. Similarly, the tilting can repeat at the same or a different (e.g., greater) speed until the contents shift in a desired manner.

The control module 226, the inverse dynamics module 228, and/or other relevant portions of the software architecture 200 can determine the respective positions of the arm joints 160 based on point constraint 612 (one labeled) at the first interfaces 602, respectively. The pivoting axis 606 can extend between the point constraints 612. Accordingly, when the point constraints 612 are symmetrical about the object depth 434, the pivoting axis 606 can be parallel to the object width 430. In at least some cases, assigning only one point constraint 612 for each of the first interfaces 602 and exerting a relatively small compressive force via the first interfaces 602 causes the tilting to be nonprehensile. In these and other cases, the robot 100 can be configured to take corrective action if the contact with the object 402 at the first interfaces 602 is unexpectedly prehensile. For example, if the object 402 is unusually lightweight and the friction at the first interfaces 602 is unusually strong, the object 402 may lift entirely off the support 406 in response to upward movement of the end effectors 156a, 156b. The robot 100 can be configured to perceive this lifting (e.g., by optically detecting upward movement of the rear portion 412 of the object 402 via the sensor components 189) and to reduce compressive force at the first interfaces 602 as needed to cause the contact with the object 402 at the first interfaces 602 to become nonprehensile.

Figure 54:
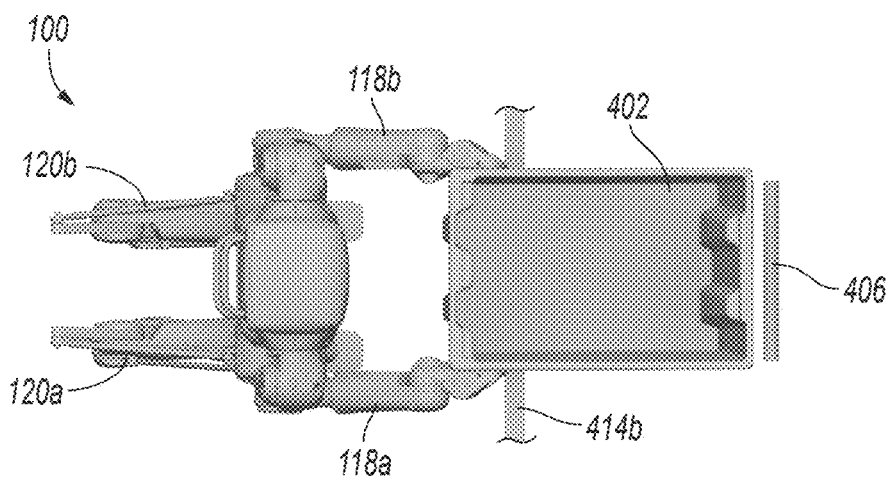
Figure 55:
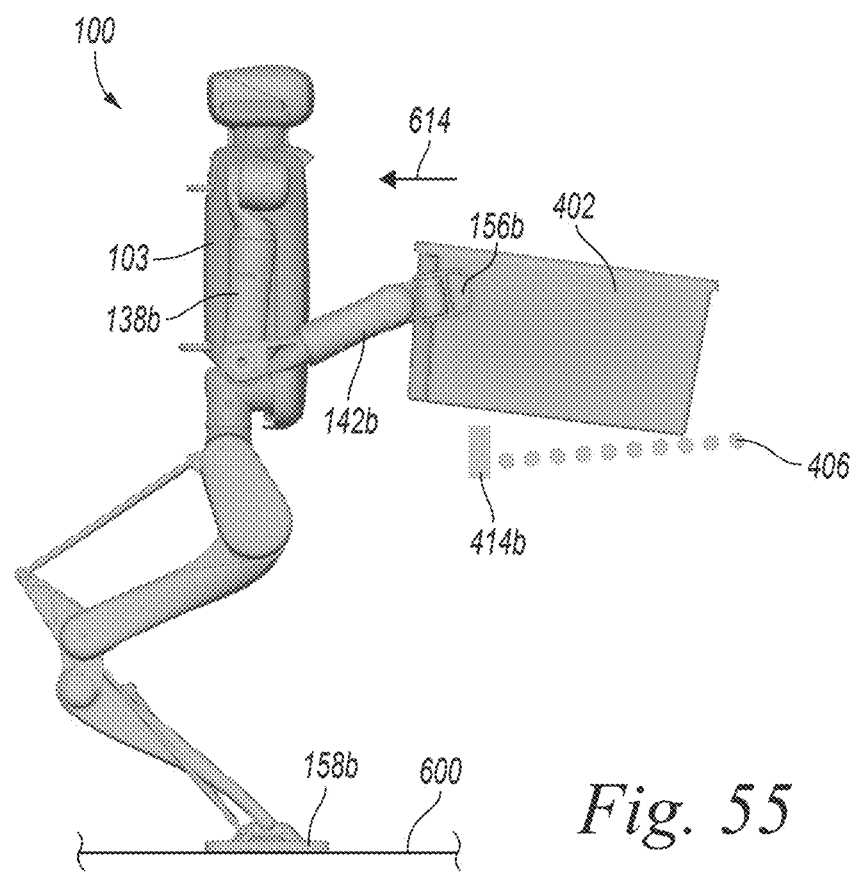

As shown in FIGS. 54 and 55, the method 500 can further include pulling or otherwise moving the object 402 toward the body 103 (block 502f) in an inward direction corresponding to arrow 614. The pivoting axis 606 and the tilting axis 610 individually can be within 20 degrees (e.g., within 10 degrees and/or substantially) perpendicular to the inward direction. Pulling the object 402 toward the body 103 can result (e.g., entirely, substantially, or at least primarily) from exerting force on the object 402 via the first interfaces 602. Accordingly, the first interfaces 602 can also be referred to as pulling interfaces. The force can be actuated (e.g., entirely, substantially, or at least primarily) via the arm actuators 174a, 174h and the proximal shoulder joints 160a, 160h. Tilting the object 402 and pulling the object 402 toward the body 103 can be entirely separate, entirely simultaneous, or partially simultaneous. Furthermore, if tilting the object 402 moves the object 402 to a less-inclined state, to a non-inclined state, or to a reverse-inclined state, the object 402 can move toward the body 103 in the same state or can change states as it moves. In these and other cases, the feet 158a, 158b can be stationary while the object 402 moves toward the body 103.

While moving toward the body 103, the object 402 can be in contact (e.g., in sliding contact) with the support 406. As with tilting the object 402, pulling the object 402 toward the body 103 can be nonprehensile. In these and other cases, the object 402 can pivot relative to the arms 118a, 118b at the first interfaces 602 about the pivoting axis 606 as it moves. The pivoting can correspond to a mismatch between an actuated path of the end effectors 156a, 156b and a slope of the support 406. Thus, the nonprehensile nature of the movement can reduce or eliminate any need to determine the slope of the support 406 and to control the end effectors 156a, 156b precisely to maintain contact between the far edge of the bottom portion 440 of the object 402 and the support 406 as the object 402 moves toward the body 103. In addition or alternatively, the nonprehensile nature of the movement can automatically compensate for any irregularities (e.g., foreign objects, broken rollers 416, etc.) at the interface between the object 402 and the support 406.

Figure 56:
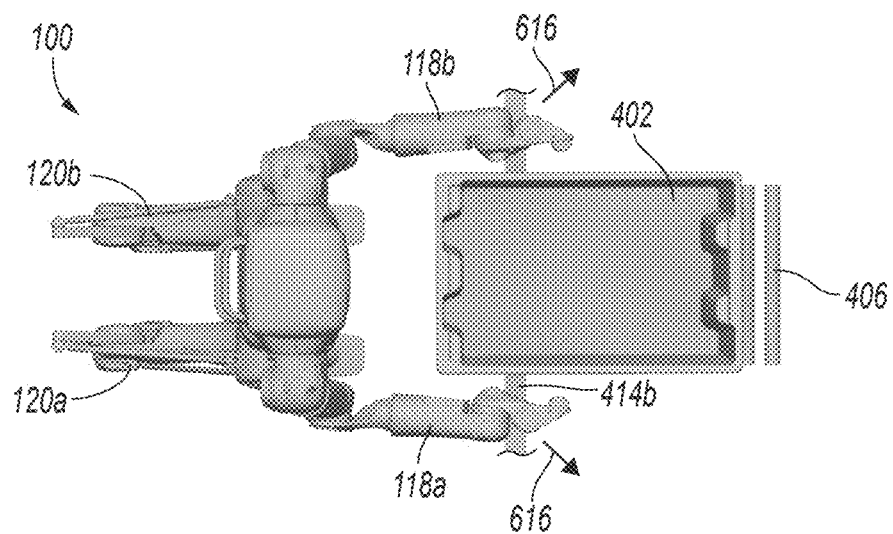
Figure 57:
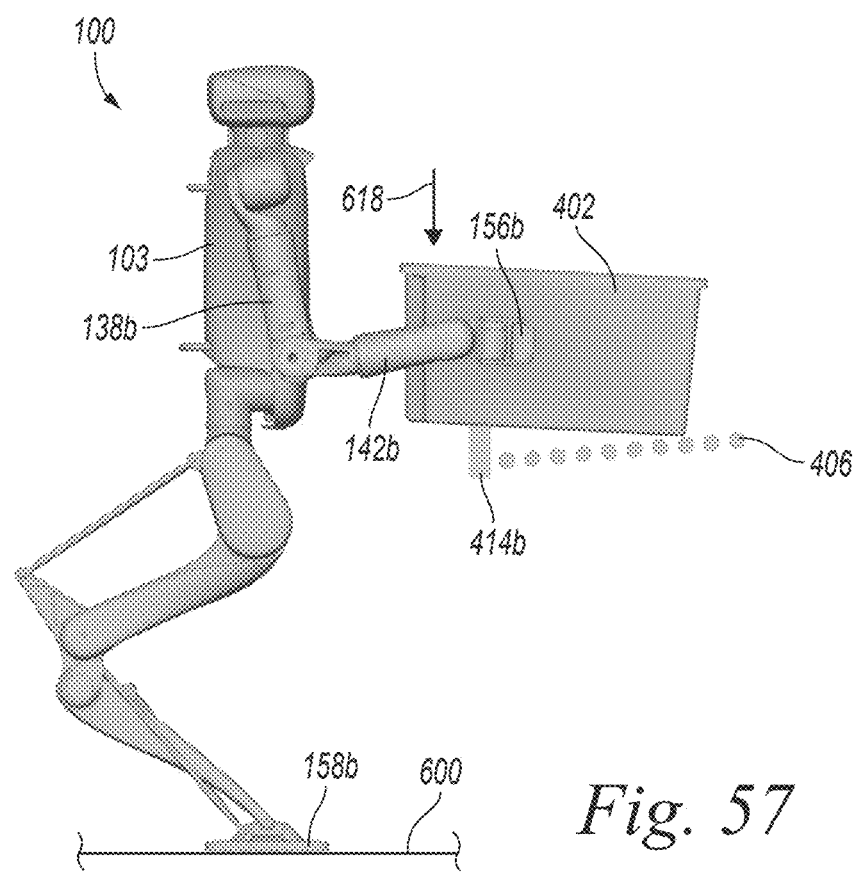

As shown in FIGS. 56 and 57, the method 500 can further include releasing the object 402 (block 502g) after pulling the object 402 toward the body 103. Releasing the object 402 can include releasing contact between the arms 118a, 118b and the first and second side portions 436, 438 of the object 402, respectively. Releasing the object 402 can be actuated (e.g., entirely, substantially, or at least primarily) via the arm actuators 174b, 174i and/or via the arm actuators 174c, 174j. Furthermore, releasing the object 402 can be actuated (e.g., entirely, substantially, or at least primarily) via the distal shoulder joints 160b, 160i and/or via the upper arm joints 160c, 160j. While or after releasing the object 402, the method 500 can include moving the end effectors 156a, 156b away from the object 402 in the direction of arrows 616. Due to the nonprehensile aspect of pulling the object 402 toward the body 103, the object 402 can be in contact with the support 406 immediately before, while, and immediately after releasing the object 402. This contact can be between the far edge of the bottom portion 440 of the object 402 along the object depth 434. In at least some cases, releasing the object 402 causes the front portion 444 of the object 402 to move downward by gravity in the direction of arrow 618 until the bottom portion 440 of the object 402 contacts the stop 414b. In this or another suitable manner, the stop 414b can serve to stage the object 402 for further manipulation.

Figure 58:
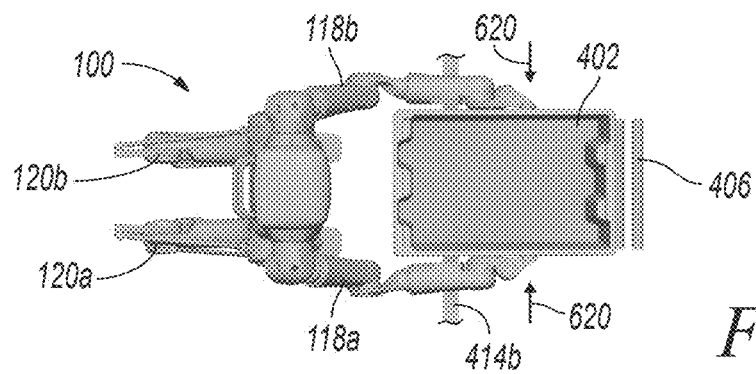
Figure 59:
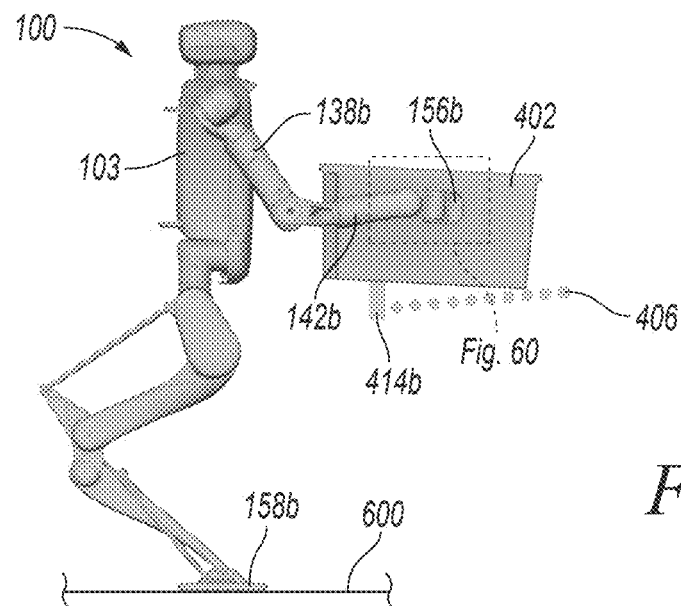
Figure 60:
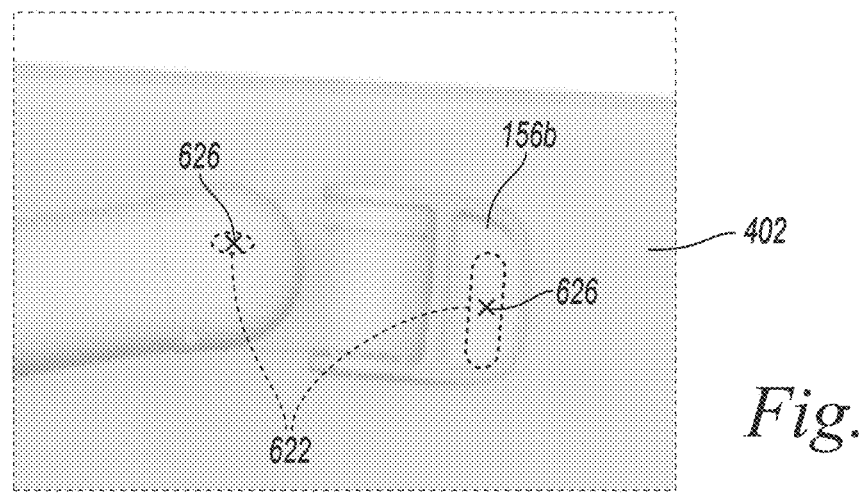

The method 500 can further include transitioning the robot 100 to a second contact pose (block 502h) after releasing the object 402. In the second contact pose, the upper arm links 138a, 138b can extend more anteriorly along the corresponding arm lengths 122a, 122b than in the first contact pose. The lower arm links 142a, 142b can remain or move to within 20 degrees of horizontal (e.g., within 10 degrees of horizontal and/or substantially horizontal). In at least some cases, the feet 158a, 158b remain stationary while the robot 100 transitions to the second contact pose after releasing the object 402. The method 500 can further include contacting the object 402 (block 502i) while the robot 100 is in the second contact pose. FIGS. 58 and 59 show the robot 100 and the object 402 immediately after this contact is established. As shown in FIG. 58, contacting the object 402 can include moving the end effectors 156a, 156b toward the object 402 in the direction of arrows 620. FIG. 60 is an annotated enlargement of a portion of FIG. 59. As shown in FIG. 60, the contact can be at second interfaces 622 (one shown) between the arms 118a, 118b and the first and second side portions 436, 438 of the object 402, respectively.

Figure 61:
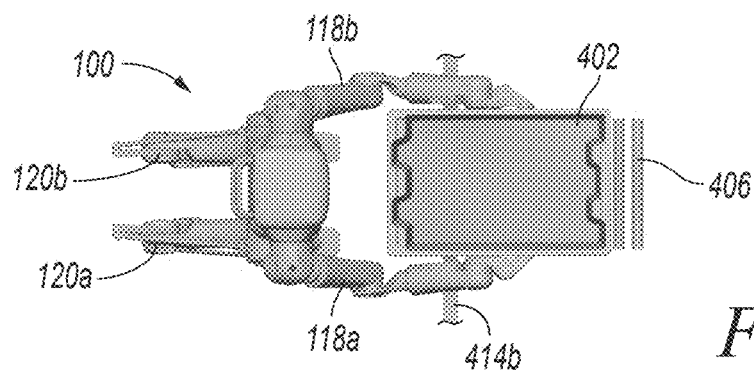
Figure 62:
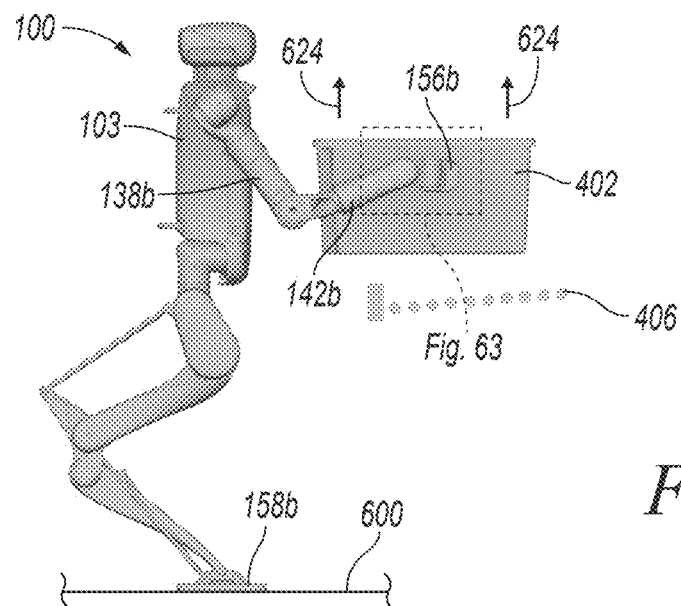
Figure 63:
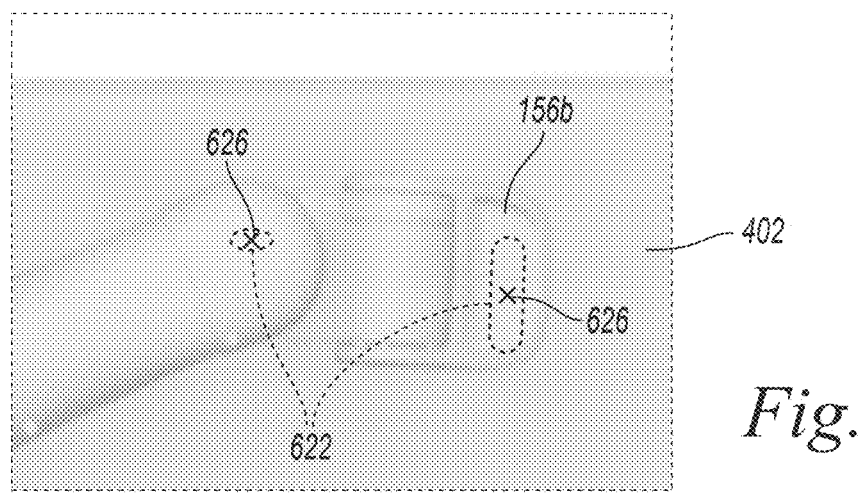

As shown in FIGS. 61-63, the method 500 can further include lifting the object 402 (block 502j) from the support 406 in the direction of arrows 624. This lifting can result (e.g., entirely, substantially, or at least primarily) from exerting force on the object 402 via the second interfaces 622. Accordingly, the second interfaces 622 can also be referred to as lifting interfaces. Lifting the object 402 can be actuated (e.g., entirely, substantially, or at least primarily) via the arm actuators 174a, 174h and/or via the arm actuators 174d, 174k. Furthermore, lifting the object 402 can be actuated (e.g., entirely, substantially, or at least primarily) via the proximal shoulder joints 160a, 160h and/or via the elbow joints 160d, 160k. In at least some cases, the object 402 overlies and is in contact with the stop 414b immediately before being lifted from the support 406. Lifting the object 402 can be prehensile in that the arms 118a, 118b fully constrain motion of the object 402. The prehensile nature of the lifting is reflected, for example, in the consistent position of the object 402 relative to the end effectors 156a, 156b in FIGS. 60 and 63 corresponding to lifting the object 402 in contrast to the inconsistent position of the object 402 relative to the end effectors 156a, 156b in FIGS. 50 and 53 corresponding to tilting the object 402.

Aspects of the second interfaces 622 and/or a force exerted by the robot 100 on the object 402 via the second interfaces 622 while lifting the object 402 can cause the lifting to be prehensile. Similarly, aspects of the first interfaces 602 and/or a force exerted by the robot 100 on the object 402 via the first interfaces 602 while tilting and pulling the object 402 can cause the tilting and pulling to be nonprehensile. With reference to FIGS. 48-63 together, a total area of contact between the arms 118a, 118b and the object 402 while tilting the object 402 can be smaller than a total area of contact between the arms 118a, 118b and the object 402 while lifting the object 402. Similarly, a total area of contact between the arms 118a, 118b and the object 402 while pulling the object 402 toward the body can be smaller than a total area of contact between the arms 118a, 118b and the object 402 while lifting the object 402. This difference in contact area can cause friction between the arms 118a, 118b and the object 402 while lifting the object 402 to be greater than friction between the arms 118a, 118b and the object 402 while tilting the object 402 and while pulling the object 402 toward the body 103.

The individual first interfaces 602 can be unitary or otherwise continuous along the object depth 434 and along the inward direction in which the robot 100 pulls the object 402 toward the body 103. In these and other cases, the individual second interfaces 622 can be nonunitary or otherwise discontinuous along the object depth 434 and along the inward direction in which the robot 100 pulls the object 402 toward the body 103. Furthermore, the robot 100 can exert greater (e.g., at least 25% greater and/or at least 50% greater) compressive force on the object 402 at the second interfaces 622 while lifting the object 402 than at the first interfaces 602 while tilting the object 402 and while pulling the object 402 toward the body 103. In at least some cases, an average distance between the second interfaces 622 and the front portion 444 of the object 402 is greater than an average distance between the first interfaces 602 and the front portion 444 of the object 402. This positioning of the second interfaces 622 can facilitate engaging the object 402 prehensilely.

The control module 226, the inverse dynamics module 228, and/or other relevant portions of the software architecture 200 can determine the respective positions of the arm joints 160 based on pairs of point constraints 626 (one pair labeled) at the second interfaces 622, respectively. In at least some cases, assigning at least two point constraint 626 for each of the second interfaces 622 and exerting a relatively large compressive force via the second interfaces 622 causes lifting the object 402 to be prehensile. In these and other cases, the robot 100 can be configured to take corrective action if the contact with the object 402 at the second interfaces 422 is unexpectedly nonprehensile. For example, if the object 402 is unusually heavy and the friction at the second interfaces 622 is unusually weak, the object 402 may shift relative to the arms 118a, 118b while or after the robot 100 lifts the object 402. The robot 100 can be configured to perceive this shifting (e.g., by optically detecting asynchronous movement of the object 402 and the arms 118a, 118b via the sensor components 189) and to increase compressive force at the second interfaces 622 as needed to cause the contact with the object 402 at the second interfaces 422 to become prehensile.

Figure 64:
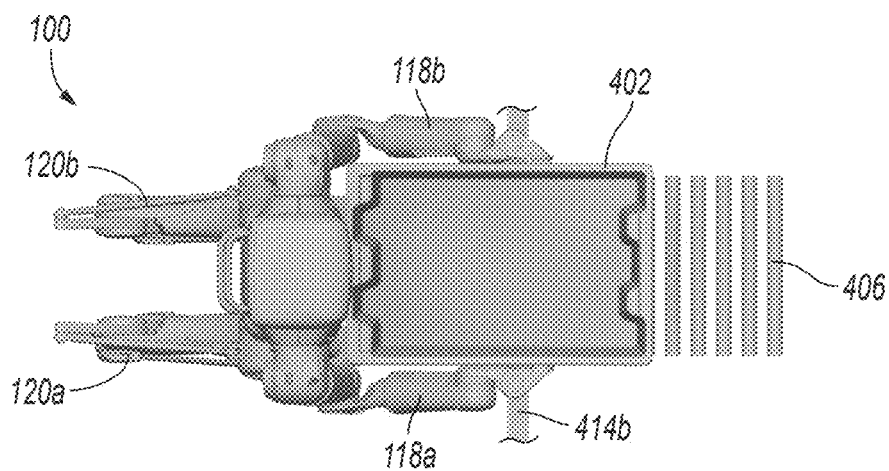
Figure 65:
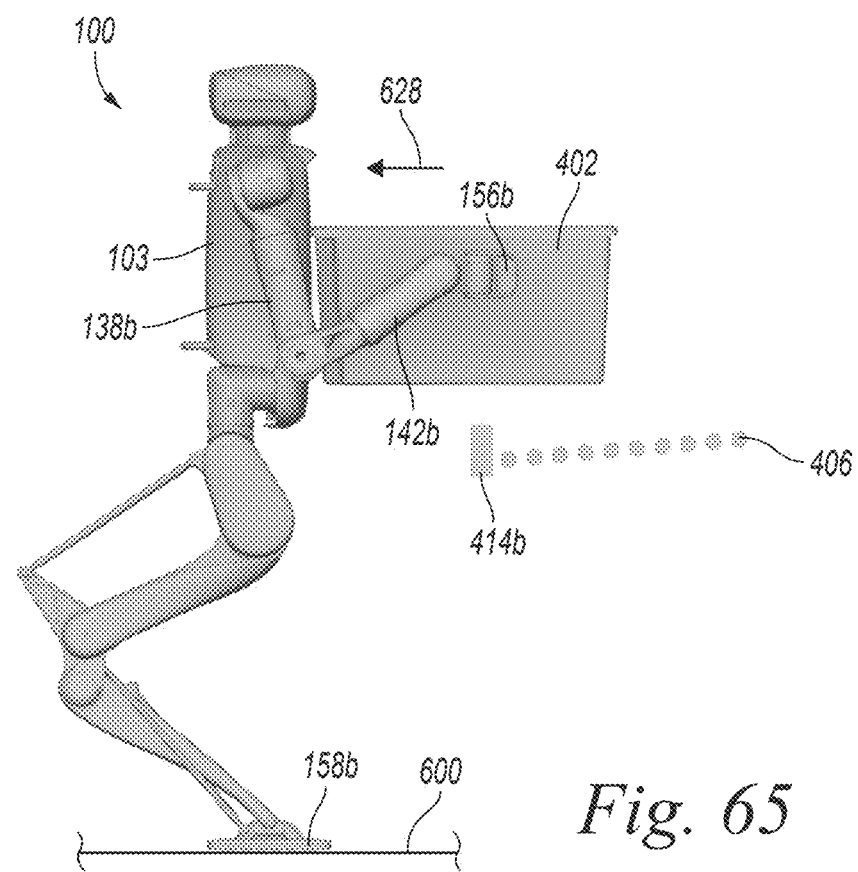

As shown in FIGS. 64 and 65, the method 500 can further include moving the object 402 toward the body 103 (block 502k) in the direction of arrow 628 after lifting the object 402. Finally, the method 500 can include carrying the object 402 away from the support 406, such as via legged locomotion of the robot 100. Moving the object 402 toward the body 103 after lifting the object 402 can be actuated (e.g., entirely, substantially, or at least primarily) via the arm actuators 174a, 174h and/or via the arm actuators 174d, 174k. Furthermore, moving the object 402 toward the body 103 after lifting the object 402 can be actuated (e.g., entirely, substantially, or at least primarily) via the proximal shoulder joints 160a, 160h and/or via the elbow joints 160d, 160k. In the illustrated case, the object 402 is near an elevation of the torso 104 immediately after the object 402 is lifted. In other cases, the object 402 can be significantly above or below this elevation. In these and other cases, the method 500 can include moving the object 402 up or down after the object 402 is fully extracted from the support structure 400. This post-lift repositioning of the object 402 can be useful, for example, to improve the stability and efficiency of the robot 100 while the robot 100 carries the object 402.

As discussed above, tilting and pre-lift pulling of the object 402 can include exerting force on the object 402 via the first interfaces 602. Similarly, lifting and post-lift pulling of the object 402 can include exerting force on the object 402 via the second interfaces 622. The force at the first interfaces 602 and/or the force at the second interfaces 622 can be exerted via friction. Alternatively or in addition, the force at the first interfaces 602 and/or the force at the second interfaces 622 can be exerted via ledge-type mechanical engagement between the arms 118a, 118b and the object 402. FIGS. 66-69 illustrate this alternative interaction between the arms 118a, 118b and the object 402 in connection with tilting and lifting the object 402. The described examples and other examples of ledge-type mechanical engagement between the arms 118a, 118b and the object 402 in accordance with at least some embodiments of the present technology can occur as a direct result of executing a predetermined control algorithm or as a result of an unpredictable condition, such as occasional failure of frictional engagement between the arms 118a, 118b and the object 402.

Figure 66:
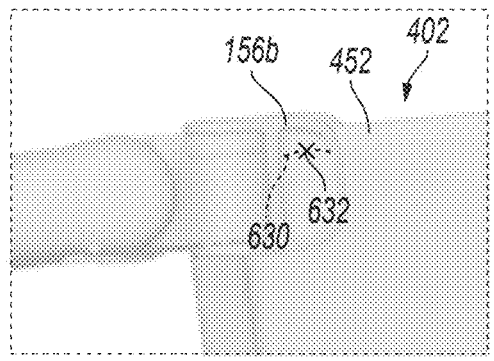
FIGS. 66 and 67 are side profile views corresponding to FIGS. 50 and 53 showing interaction between arms of the robot shown in FIG. 1 and the object shown in FIG. 41 at different respective times during a method in accordance with at least some embodiment of the present technology.
Figure 67:
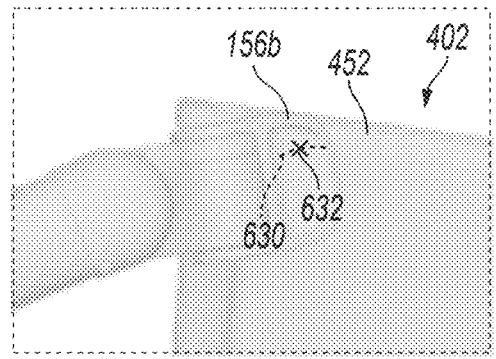
Figure 68:
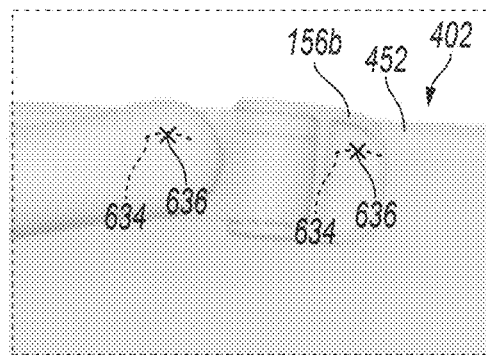
FIGS. 68 and 69 are side profile views corresponding to FIGS. 60 and 63 showing interaction between arms of the robot shown in FIG. 1 and the object shown in FIG. 41 at different respective times during a method in accordance with at least some embodiment of the present technology.
Figure 69:
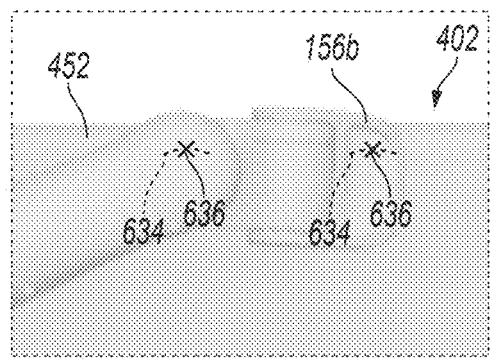

As shown in FIGS. 66 and 67, the arms 118a, 118b can contact the object 402 at tilting interfaces 630 between the distal ledges 318a, 318b (FIG. 38) and the undersides of the first and second protrusions 452, 454, respectively. This contact can begin immediately when tilting the object 402 begins or after tilting the object 402 begins, such as after an initial frictional engagement with the object fails. In connection with the ledge-type mechanical engagement, the arms 118a, 118b can define a fulcrum at the corresponding tilting interface 630. The control module 226, the inverse dynamics module 228, and/or other relevant portions of the software architecture 200 can determine the respective positions of the arm joints 160 based on point constraints 632 (one labeled) at the tilting interfaces 630, respectively. As shown in FIGS. 68 and 69, the arms 118a, 118b can contact the object 402 at lifting interfaces 634 partially between the proximal ledges 316a, 316b (FIG. 38) and the undersides of the first and second protrusions 452, 454, respectively, and partially between the distal ledges 318a, 318b and the undersides of the first and second protrusions 452, 454, respectively. Again, this contact can begin immediately when lifting the object 402 begins or after lifting the object 402 begins, such as after an initial frictional engagement with the object fails. The control module 226, the inverse dynamics module 228, and/or other relevant portions of the software architecture 200 can determine the respective positions of the arm joints 160 based on pairs of point constraints 636 (one pair labeled) at the lifting interfaces 634, respectively.

Various manipulation behaviors in accordance with embodiments of the present technology can be included in the library 222 (FIG. 35). Different manipulation behaviors can be better suited to different circumstances. For example, a manipulation behavior including repositioning the object 402 before lifting the object 402 can be appropriate when the object 402 is difficult for the robot 100 to reach. Repositioning the object 402 before lifting the object 402 in these and other cases can enhance the reliability and versatility of the overall interaction between the robot 100 and the object 402. Alternatively, a manipulation behavior that does not include repositioning the object 402 before lifting the object 402 can be appropriate when the object 402 is relatively accessible to the robot 100. Lifting the object 402 without repositioning the object 402 in these and other cases can enhance the speed of the overall interaction between the robot 100 and the object 402. As an example of the latter type of manipulation behaviors, a counterpart of the method 500 can include operations corresponding to blocks 502a, 502b and 502h-502l in FIG. 45. In other words, operations corresponding to blocks 502c-502g in FIG. 45 can be included or omitted in different manipulation behaviors in accordance with at least some embodiments of the present technology.

The robot 100 can be configured to select an appropriate manipulation behavior autonomously or semi-autonomously. FIG. 70 is a block diagram corresponding to a relevant method 700 in accordance with at least some embodiments of the present technology. The diagram includes blocks 702a-702f corresponding to different respective portions of the method 700. With reference to FIGS. 34, 35, 41 and 70 together, the method 700 can include receiving, via a computer system operably associated with the robot 100, first information corresponding to a position of a first object in a working environment. This information can include information from the sensor components 189. A position feature of the information can include coordinates for the first object, a relationship between the first object and a known position, and/or one or more other types of information related to the position of the first object. As an example, the software architecture 200 can be configured to recognize the presence of a first object at one of the supports 406, to associate the first object with an identifier, and to associate the identifier with a known location corresponding to the support 406. In particular, the robot 100 can recognize that "Object 1234" is at "Tier 1, Bay 1" of the support structure 400. The robot 100 can store a known location for Tier 1, Bay 1 and assign that location to Object 1234.

The method 700 can further include selecting a first manipulation behavior for the first object (block 702b) based at least partially on the first information. For example, the first information can indicate that the first object is at one of the tiers 404a, 404c of the support structure 400. Because the robot 100 is more kinematically constrained from reaching along the support depth 408 at the tiers 404a, 404c than at the tier 404b, the robot 100 can select, via the manipulation selection module 216, a manipulation behavior for the first object that includes repositioning the first object before lifting the first object. The method 700 can further include manipulating the first object in accordance with the selected manipulation behavior (block 702c).

The method 700 can further include receiving, via the computer system, second information corresponding to a position of a second object in the working environment. The second information can be received with the first information or separately (e.g., subsequently). Like the first information, the second information can include information from the sensor components 189. The method 700 can further include selecting a second manipulation behavior for the second object (block 702e) based at least partially on the second information. For example, the second information can indicate that the second object is at the tier 404b of the support structure 400. Because the robot 100 is less kinematically constrained from reaching along the support depth 408 at the tier 404b than at the tiers 404a, 404c, the robot 100 can select, via the manipulation selection module 216, a manipulation behavior for the second object that includes lifting the second object without first repositioning the second object. Finally, the method 700 can include manipulating the second object in accordance with the selected manipulation behavior (block 702f).

CONCLUSION

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may be disclosed herein in the context of those embodiments, other embodiments may also exhibit such advantages, and not all embodiments need necessarily exhibit such advantages or other advantages disclosed herein to fall within the scope of the present technology. This disclosure and the associated technology can encompass other embodiments not expressly shown or described herein.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Any reference herein to "the inventors" means at least one inventor of the present technology. As used herein, the terms "generally," "substantially," "about," and similar terms are used as terms of approximation and not as terms of degree, and are intended to account for the inherent variations in measured or calculated values that would be recognized by those of ordinary skill in the art. Additionally, the terms "comprising," "including," "having," and the like are used throughout this disclosure to mean including at least the recited feature(s) such that any greater number of the same feature(s) and/or one or more additional types of features are not precluded. This is the case even if a particular number of features is specified unless that specified number is preceded by the word "exactly" or another clear indication that it is intended to be closed ended. In a particular example, "comprising two arms" means including at least two arms.

Directional terms, such as "upper," "lower," "front," "back," "vertical," and "horizontal," may be used herein to express and clarify the relationship between various structures. It should be understood that such terms do not denote absolute orientation. Similarly, terms of anatomical direction, such as "distal" and "medial," may be used herein to express and clarify the relationship between various structures. In the context of the robot 100 and in the absence of a statement to the contrary, such terms refer to the robot 100 in the first state shown in FIGS. 1-3. Furthermore, terms corresponding to anatomical parts (e.g., "wrist," "elbow," "hip," "thigh," "calf," "torso," etc.) may be assigned arbitrarily and are intended to be interpreted in the context of the described embodiments rather than in the context of a human. Reference herein to "one embodiment," "an embodiment," or similar phrases means that a particular feature, structure, or operation described in connection with such phrases can be included in at least one embodiment of the present technology. Thus, such phrases as used herein are not all referring to the same embodiment. Unless preceded with the word "conventional," reference herein to "counterpart" devices, systems, methods, features, structures, or operations refers to devices, systems, methods, features, structures, or operations in accordance with at least some embodiments of the present technology that are similar to a described device, system, method, feature, structure, or operation in certain respects and different in other respects. Finally, it should be noted that various particular features, structures, and operations of the embodiments described herein may be combined in any suitable manner in additional embodiments in accordance with the present technology.

We claim:

1. A method comprising:
    moving a robot along a floor toward a support carrying an object, wherein the support is elevated relative to the floor;
    moving, by the robot, the object toward a body of the robot while the object is in contact with the support and while allowing the object to move independently relative to the robot with at least one degree of freedom, wherein the object defines a width, wherein moving the object toward the body includes exerting, by the robot, force on the object via friction at pulling interfaces between opposing arms of the robot and respective side portions of the object spaced apart from one another along the width of the object;
    lifting, by the robot, the object from the support after moving the object toward the body, wherein lifting the object from the support includes exerting, by the robot, force on the object via lifting interfaces between the arms and the respective side portions of the object, and wherein lifting the object from the support includes exerting, by the robot, force on the object via ledge-type mechanical engagement between the arms and the object at the lifting interfaces; and
    carrying, by the robot, the object away from the support after lifting the object from the support.

2. The method of claim 1, wherein:
    moving the object toward the body includes moving the object toward the body in an inward direction; and
    the method further comprises tilting, by the robot, the object about an axis within 20 degrees of perpendicular to the inward direction before lifting the object from the support and while the object is in tilting contact with the support.

3. The method of claim 2, wherein tilting the object includes tilting the object away from the body.

4. The method of claim 2, wherein:
    tilting the object includes tilting the object from an inclined state toward a less-inclined and/or reverse-inclined state; and
    moving the object toward the body includes moving the object toward the body in the less-inclined and/or reverse-inclined state.

5. The method of claim 2, wherein a total area of contact between the arms and the object while tilting the object is smaller than a total area of contact between the arms and the object while lifting the object from the support.

6. The method of claim 2, wherein tilting the object includes exerting, by the robot, force on the object via tilting interfaces between the arms and the respective side portions of the object while the object pivots relative to the arms at the tilting interfaces.

7. The method of claim 6, wherein the individual lifting interfaces are discontinuous along the inward direction.

8. The method of claim 6, wherein the individual arms include a fulcrum at the corresponding tilting interface.

9. The method of claim 2, wherein:
    tilting the object includes exerting, by the robot, force on the object via tilting interfaces between the arms and the respective side portions of the object;
    the method further comprises:
        contacting, by the robot, the arms and the object at the tilting interfaces before tilting the object and while the robot is in a contact pose; and
        transitioning the robot from a pre-contact pose to the contact pose before contacting the arms and the object at the tilting interfaces,
    the arms individually define an arm length extending from the body and individually include:
        a shoulder joint,
        an elongate upper arm link distal to the shoulder joint along a kinematic chain corresponding to the arm,
        an elbow joint distal to the elongate upper arm link along the kinematic chain, an elongate lower arm link distal to the elbow joint along the kinematic chain, and an end effector distal to the elongate lower arm link along the kinematic chain corresponding to the arm, and the upper arm links extend posteriorly and inferiorly along the corresponding arm lengths when the robot is in the pre-contact pose, and the lower arm links extend anteriorly along the corresponding arm lengths when the robot is in the pre-contact pose and when the robot is in the contact pose.

10. The method of claim 2, wherein tilting the object includes tilting the object before moving the object toward the body.

11. The method of claim 2, wherein tilting the object includes tilting the object while moving the object toward the body.

12. The method of claim 1, wherein a total area of contact between the arms and the object while moving the object toward the body is smaller than a total area of contact between the arms and the object while lifting the object from the support.

13. The method of claim 1, further comprising releasing, by the robot, contact between the arms and the respective side portions of the object after moving the object toward the body, wherein the object is in contact with the support immediately after releasing contact between the arms and the respective side portions of the object.

14. The method of claim 1, wherein an average distance between the pulling interfaces and a front edge of the object nearest to the body while moving the object toward the body is less than an average distance between the lifting interfaces and the front edge of the object.

15. The method of claim 1, wherein lifting the object from the support includes exerting, by the robot, force on the object via friction at the lifting interfaces.

16. The method of claim 1, wherein:
the side portions of the object individually include a sidewall and a protrusion extending laterally outward from the sidewall; and
the lifting interfaces are between the arms and the protrusions of the respective sidewalls.

17. The method of claim 1, wherein:
the support defines a depth and includes:
a front portion nearest to the robot while moving the object toward the body, and
a rear portion spaced apart from the front portion of the support along the depth of the support;
the support is sloped downwardly along its depth from its rear portion toward its front portion;
the support is part of a support structure including an upwardly projecting stop at the front portion of the support; and
the object overlies and is in contact with the stop immediately before lifting the object from the support.

18. The method of claim 1, wherein:
moving the robot along the floor toward the support includes moving the robot along the floor toward the support via legs of the robot;
the body includes a torso having an upper portion, a lower portion, and a middle portion therebetween;
the legs are connected to the torso via the lower portion of the torso; and
the arms are connected to the torso via the upper portion of the torso.

19. The method of claim 1, wherein:
the support underlies the object while moving the robot along the floor toward the support; and
moving the object toward the body includes moving the object toward the body while the object is in sliding contact with the support.

20. The method of claim 1, wherein lifting the object from the support includes prehensilely lifting the object from the support.

* * * * *